(12) United States Patent
Li et al.

(10) Patent No.: US 12,219,400 B2
(45) Date of Patent: *Feb. 4, 2025

(54) METHOD FOR DETERMINING DATA BUFFER STATUS, AND APPARATUS

(71) Applicant: HUAWEI TECHNOLOGIES CO., LTD., Guangdong (CN)

(72) Inventors: Yunbo Li, Shenzhen (CN); Ming Gan, Shenzhen (CN); Yuchen Guo, Shenzhen (CN); Yifan Zhou, Shenzhen (CN); Yiqing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

This patent is subject to a terminal disclaimer.

(21) Appl. No.: 17/891,785

(22) Filed: Aug. 19, 2022

(65) Prior Publication Data

US 2022/0394556 A1    Dec. 8, 2022

Related U.S. Application Data

(63) Continuation of application No. PCT/CN2021/080254, filed on Mar. 11, 2021.

(30) Foreign Application Priority Data

Mar. 13, 2020 (CN) .......................... 202010180304.6

(51) Int. Cl.
   *H04W 28/14*         (2009.01)
   *H04W 28/02*         (2009.01)
   *H04W 52/02*         (2009.01)

(52) U.S. Cl.
   CPC ....... *H04W 28/14* (2013.01); *H04W 28/0278* (2013.01); *H04W 52/0209* (2013.01);
(Continued)

(58) Field of Classification Search
None
See application file for complete search history.

(56) References Cited

U.S. PATENT DOCUMENTS 10,791,516 B1 * 9/2020 Chu ................. H04W 52/0216
2005/0018624 A1    1/2005 Meier et al.
(Continued)

FOREIGN PATENT DOCUMENTS

CN       104144512 B     9/2017
CN       107396433 A     11/2017
(Continued)

OTHER PUBLICATIONS

Alexander Min et al, Multi-link power save operation, IEEE 802.11-19/1544r5, Jan. 16, 2010, 18 pages.
(Continued)

*Primary Examiner* — Jutai Kao

(57) ABSTRACT

Embodiments of this application disclose a method for determining a data buffer status, and an apparatus. The method includes: A first MLD receives first indication information from a second MLD, and determines, based on the first indication information and a correspondence between an association identifier of the first MLD and a data type supported by the first MLD, a buffer status of bufferable data that corresponds to the at least one data type and that is in the second MLD, where the first indication information is used to indicate the buffer status of the bufferable data. According to the embodiments of this application, a data buffer status in a data type dimension can be determined. The embodiments of this application may be applied to a wireless local area network system that supports a next-generation Wi-Fi EHT protocol of the IEEE 802.11, that is, the 802.11 protocol such as 802.11be.

18 Claims, 15 Drawing Sheets

(52) U.S. Cl.
CPC ... *H04W 52/0222* (2013.01); *H04W 52/0229* (2013.01); *H04W 52/0235* (2013.01)

(56) References Cited

U.S. PATENT DOCUMENTS

| | | | |
|---|---|---|---|
| 2016/0021680 A1* | 1/2016 | Choi | H04W 74/002 370/329 |
| 2016/0374093 A1 | 12/2016 | Asterjadhi et al. | |
| 2017/0230964 A1* | 8/2017 | Park | H04W 72/21 |
| 2019/0268221 A1 | 8/2019 | Xiao et al. | |
| 2020/0120603 A1* | 4/2020 | Seok | H04W 52/0222 |
| 2020/0137612 A1* | 4/2020 | Li | H04W 28/0221 |
| 2021/0258877 A1* | 8/2021 | Chitrakar | H04W 52/0216 |
| 2022/0369229 A1* | 11/2022 | Kim | H04W 84/12 |

FOREIGN PATENT DOCUMENTS

| | | |
|---|---|---|
| CN | 110191449 A | 8/2019 |
| JP | 2010062743 A | 3/2010 |

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

Liwen Chu et al, Multi-Link Power Save, IEEE 802.11-19/1617r2, Sep. 9, 2019, 10 pages.

Ming Gan et al, Power Save for Multi-link, IEEE 802.11-19/1988-01-00be, Nov. 11, 2019, 18 pages.

Doc.: IEEE 802.11-19/1544r5, Alexander Min et al., Multi-link power save operation, Jan. 2020, 18 pages, XP068165413.

* cited by examiner

Bufferable data corresponding to the data type a

Bufferable data corresponding to the data type b

METHOD FOR DETERMINING DATA BUFFER STATUS, AND APPARATUS

CROSS-REFERENCE TO RELATED APPLICATIONS

This application is a continuation of International Application No. PCT/CN2021/080254, filed on Mar. 11, 2021, which claims priority to Chinese Patent Application No. 202010180304.6, filed on Mar. 13, 2020. The disclosures of the aforementioned applications are hereby incorporated by reference in their entireties.

TECHNICAL FIELD

This application relates to the field of communications technologies, and in particular, to a method for determining a data buffer status, and an apparatus.

BACKGROUND

A goal of development and evolution of a cellular network and a wireless local area network (WLAN) is to continuously increase a throughput. To achieve an extremely high throughput, the next-generation standard IEEE 802.11be uses a multi-link (ML) as one of key technologies. A multi-link device (MLD) having a capability of sending and receiving data in a multi-band (multi-band) may transmit data by using a larger bandwidth. This significantly increases a throughput. The MLD includes a plurality of stations (STAs), and each station may establish a link to one station in another MLD for communication.

Anon-access point (non-AP) station may be in an active state or a doze state. When the non-AP station is in the active state, a link corresponding to the non-AP station is also in the active state, and data can be transmitted between the non-AP station and an AP station through the link. When the non-AP station is in the doze state, a link corresponding to the non-AP station is also in the doze state, and data cannot be transmitted between the non-AP station and an AP station.

When the non-AP station is in the doze state, an AP MLD may buffer a data service to be sent to the non-AP station, and when the non-AP station is in the active state, sends the bufferable data service to the non-AP station through the link corresponding to the non-AP station.

However, a non-AP MLD cannot learn a buffer status of bufferable data corresponding to the non-AP MLD on the AP MLD. This is not conducive for the non-AP MLD to accurately determine an operating status of an associated link. Therefore, how to determine the buffer status of the bufferable data corresponding to the non-AP MLD on the AP MLD becomes an urgent technical problem to be resolved.

SUMMARY

Embodiments of this application provide a method for determining a data buffer status, and an apparatus, to determine a data buffer status in a data type dimension.

According to a first aspect, an embodiment of this application provides a method for determining a data buffer status. The method includes: A first multi-link device MLD receives first indication information from a second MLD, where the first indication information is used to indicate a buffer status of bufferable data that corresponds to an association identifier of the first MLD and that is in the second MLD; and the first MLD determines, based on the first indication information and a correspondence between the association identifier of the first MLD and a data type supported by the first MLD, a buffer status of bufferable data that corresponds to the at least one data type and that is in the second MLD.

In this technical solution, the buffer status of the bufferable data that corresponds to the at least one data type supported by the first MLD and that is in the second MLD can be determined.

In an implementation, the first MLD may have a plurality of stations. The method may further include: The first MLD determines an operating status of at least one station in the plurality of stations based on the buffer status of the bufferable data that corresponds to the at least one data type and that is in the second MLD, where the operating status is an active state or a doze state.

In this technical solution, a more appropriate operating status is determined for the station in the first MLD based on the data type of the bufferable data. This helps reduce power consumption.

In an implementation, the method may further include: The first MLD receives second indication information from the second MLD, where the second indication information is used to determine the correspondence between the association identifier of the first MLD and the data type supported by the first MLD.

In an implementation, the second indication information indicates at least one association identifier, and the at least one association identifier corresponds to the at least one data type.

In this technical solution, the at least one association identifier (associate identifier, AID) corresponding to the at least one data type is indicated by using the second indication information, so that an AID can be more flexibly allocated to the first MLD.

In an implementation, the first MLD supports a plurality of data types. The second indication information indicates a first association identifier, and the first association identifier corresponds to a first data type in the plurality of data types. The method may further include: The first MLD determines, based on the first association identifier corresponding to the first data type, an association identifier corresponding to a data type in the plurality of data types other than the first data type.

In this technical solution, an AID is indicated in the second indication information. This can effectively reduce signaling overheads.

According to a second aspect, an embodiment of this application provides another method for determining a data buffer status. The method includes: A second multi-link device MLD determines a buffer status of bufferable data that corresponds to at least one data type supported by a first MLD and that is in the second MLD; determines, based on the buffer status of the bufferable data that corresponds to the at least one data type and that is in the second MLD and a correspondence between an association identifier of the first MLD and the supported data type, a buffer status of bufferable data that corresponds to the association identifier and that is in the second MLD; and sends first indication information to the first MLD, where the first indication information is used to indicate the buffer status of the bufferable data that corresponds to the association identifier of the first MLD and that is in the second MLD.

In this technical solution, the buffer status of the bufferable data that corresponds to the association identifier of the first MLD and that is in the second MLD is indicated. This helps the first MLD determine, based on the correspondence between the association identifier and the supported data type, the buffer status of the bufferable data that corresponds to the at least one data type and that is in the second MLD.

In an implementation, the method may further include: The second MLD sends second indication information to the first MLD, where the second indication information is used to determine the correspondence between the association identifier of the first MLD and the data type supported by the first MLD.

In an implementation, the second indication information indicates at least one association identifier, and the at least one association identifier corresponds to the at least one data type.

In this technical solution, the at least one association identifier (AID) corresponding to the at least one data type is indicated by using the second indication information, so that an AID can be more flexibly allocated to the first MLD.

In an implementation, the first MLD supports a plurality of data types. The second indication information indicates a first association identifier, and the first association identifier corresponds to a first data type in the plurality of data types.

In this technical solution, an AID is indicated in the second indication information. This can effectively reduce signaling overheads.

According to a third aspect, an embodiment of this application provides still another method for determining a data buffer status. The method includes: A first multi-link device MLD receives bufferable data from a second MLD over a first link, where the bufferable data includes third indication information, the third indication information is used to indicate whether bufferable data corresponding to at least one second data type is buffered in the second MLD, and the second data type is any data type mapped to the first link; and the first MLD determines, based on the third indication information, whether the bufferable data corresponding to the at least one second data type is buffered in the second MLD.

In this technical solution, whether the bufferable data corresponding to the at least one second data type is buffered in the second MLD may be determined based on the third indication. In other words, whether bufferable data may be transmitted to the first MLD over the first link may be determined based on the third indication information.

In an implementation, the first MLD has a plurality of stations. The method further includes: The first MLD determines an operating status of a station corresponding to the first link in the plurality of stations based on whether the bufferable data corresponding to the at least one second data type is buffered in the second MLD, where the operating status is an active state or a doze state.

In this technical solution, a more appropriate operating status is determined for the station corresponding to the first link based on whether the bufferable data corresponding to the at least one second data type is buffered in the second MLD.

In an implementation, a specific implementation in which the first MLD determines an operating status of a station corresponding to the first link in the plurality of stations based on whether the bufferable data corresponding to the at least one second data type is buffered in the second MLD may be: If the bufferable data corresponding to the at least one second data type is buffered in the second MLD, the first MLD determines the operating status of the station corresponding to the first link in the plurality of stations as the active state; or if bufferable data corresponding to any second data type is not buffered in the second MLD, the first MLD determines the operating status of the station corresponding to the first link in the plurality of stations as the active state or the doze state.

In this technical solution, when the bufferable data corresponding to the at least one second data type is buffered in the second MLD, the operating status of the station corresponding to the first link is the active state. If bufferable data cannot be transmitted due to link congestion (or a case such as interference) on a link 1, and a data type of to-be-transmitted bufferable data on the link 1 is also mapped to the first link, before the bufferable data corresponding to the data type is sent completely, the station corresponding to the first link is in the active state, that is, the link 1 is in the doze state. Therefore, the second MLD may schedule the to-be-transmitted bufferable data on the link 1 to the first link for transmission. In this way, a more appropriate operating status is determined for the station, and the bufferable data in the second MLD is successfully sent to the first MLD.

In an implementation, the third indication information indicates that the bufferable data corresponding to the at least one second data type is buffered in the second MLD. The method further includes: The first MLD receives fourth indication information from the second MLD, where the fourth indication information is used to indicate that the bufferable data corresponding to the any second data type is not buffered in the second MLD.

In this technical solution, the fourth indication information may be a quality of service null (QoS Null) frame. When the second MLD cannot send the bufferable data to the second MLD over the first link, and cannot indicate, by using the third indication information in the bufferable data, that the bufferable data corresponding to the any second data type is not buffered in the second MLD, either, the first MLD may determine, based on the fourth indication information from the second MLD, that the bufferable data corresponding to the any second data type is not buffered in the second MLD.

According to a fourth aspect, an embodiment of this application provides still another method for determining a data buffer status. The method includes: A second multi-link device MLD determines whether bufferable data corresponding to at least one second data type is buffered in the second MLD, where the second data type is any data type mapped to a first link; and the second MLD sends bufferable data to a first MLD over the first link, where the bufferable data includes third indication information, and the third indication information is used to indicate whether the bufferable data corresponding to the at least one second data type is buffered in the second MLD.

In this technical solution, whether the bufferable data corresponding to the at least one second data type is buffered in the second MLD may be indicated by using the third indication information. In other words, whether bufferable data may be transmitted to the first MLD over the first link may be indicated by using the third indication information.

In an implementation, the third indication information indicates that the bufferable data corresponding to the at least one second data type is buffered in the second MLD. The method may further include: The second MLD sends fourth indication information to the first MLD, where the fourth indication information is used to indicate that bufferable data corresponding to any second data type is not buffered in the second MLD.

In this technical solution, the fourth indication information may be a QoS Null frame. When the second MLD cannot send the bufferable data to the second MLD over the first link, and cannot indicate, by using the third indication information in the bufferable data, that the bufferable data corresponding to the any second data type is not buffered in the second MLD, either, the second MLD may indicate, by sending the fourth indication information to the first MLD, that the bufferable data corresponding to the any second data type is not buffered in the second MLD.

According to a fifth aspect, an embodiment of this application provides still another method for determining a data buffer status. The method includes: A first multi-link device MLD receives, from a second MLD, bufferable data corresponding to a third data type, where the bufferable data includes fifth indication information, and the fifth indication information is used to indicate whether the bufferable data corresponding to the third data type is buffered in the second MLD; and the first MLD determines, based on the fifth indication information, whether the bufferable data corresponding to the third data type is buffered in the second MLD.

In this technical solution, whether the bufferable data corresponding to the third data type is buffered in the second MLD may be determined based on the fifth indication information in the bufferable data corresponding to the third data type.

In an implementation, the first MLD has a plurality of stations. The method further includes: The first MLD determines an operating status of a station corresponding to a second link in the plurality of stations based on whether the bufferable data corresponding to the third data type is buffered in the second MLD, where the third data type is mapped to the second link, and the operating status is an active state or a doze state.

In this technical solution, a more appropriate operating status is determined for the station corresponding to the second link based on whether the bufferable data corresponding to the third data type is buffered in the second MLD.

In an implementation, the method further includes: The first MLD determines whether a data type other than the third data type is mapped to the second link. A specific implementation in which the first MLD determines an operating status of a station corresponding to a second link in the plurality of stations based on whether the bufferable data corresponding to the third data type is buffered in the second MLD may be: The first MLD determines the operating status of the station corresponding to the second link in the plurality of stations based on whether the bufferable data corresponding to the third data type is buffered in the second MLD and whether the data type other than the third data type is mapped to the second link.

In an implementation, the fifth indication information indicates that the bufferable data corresponding to the third data type is not buffered in the second MLD. The bufferable data corresponding to the third data type that is received by the first MLD from the second MLD may further include sixth indication information, where the sixth indication information is used to indicate whether bufferable data corresponding to at least one fourth data type is buffered in the second MLD, and the fourth data type is any data type other than the third data type in data types supported by the first MLD.

In this technical solution, whether the bufferable data corresponding to the at least one fourth data type is buffered in the second MLD may be determined based on the sixth indication information. That is, a buffer status of bufferable data that corresponds to a data type other than the third data type and that is in the second MLD may be determined based on the sixth indication information, and the first MLD may learn of a more detailed buffer status. This helps determine a more appropriate operating status for the station in the first MLD.

In an implementation, a priority of the fourth data type is higher than a priority of the third data type.

According to a sixth aspect, an embodiment of this application provides still another method for determining a data buffer status. The method includes: A second multi-link device MLD determines whether bufferable data corresponding to a third data type is buffered in the second MLD; and the second MLD sends the bufferable data corresponding to the third data type to a first MLD, where the bufferable data includes fifth indication information, and the fifth indication information is used to indicate whether the bufferable data corresponding to the third data type is buffered in the second MLD.

In this technical solution, whether the bufferable data corresponding to the third data type is buffered in the second MLD may be determined based on the fifth indication information in the bufferable data corresponding to the third data type.

In an implementation, the fifth indication information indicates that the bufferable data corresponding to the third data type is not buffered in the second MLD. The bufferable data corresponding to the third data type that is sent by the second MLD to the first MLD further includes sixth indication information, where the sixth indication information is used to indicate whether bufferable data corresponding to at least one fourth data type is buffered in the second MLD, and the fourth data type is any data type other than the third data type in data types supported by the first MLD.

In this technical solution, whether the bufferable data corresponding to the at least one fourth data type is buffered in the second MLD may be indicated by using the sixth indication information. That is, a buffer status of bufferable data that corresponds to a data type other than the third data type and that is in the second MLD may be indicated by using the sixth indication information.

In an implementation, a priority of the fourth data type is higher than a priority of the third data type.

According to a seventh aspect, an embodiment of this application provides still another method for determining a data buffer status. The method includes: A first multi-link device MLD receives seventh indication information from a second MLD, where the seventh indication information is used to indicate that bufferable data corresponding to a fifth data type is not buffered in the second MLD, and the fifth data type is any one of data types supported by the first MLD; and the first MLD determines, based on the seventh indication information, that the bufferable data corresponding to the fifth data type is not buffered in the second MLD.

In this technical solution, when the bufferable data corresponding to the fifth data type is not buffered in the second MLD, the second MLD cannot send the bufferable data corresponding to the fifth data type to the first MLD. The first MLD cannot determine, based on a "more data (More Data)" subfield in the bufferable data corresponding to the fifth data type, that the bufferable data corresponding to the fifth data type is not buffered in the second MLD, either. In this case, the first MLD may determine, based on the seventh indication information from the second MLD, that the bufferable data corresponding to the fifth data type is not buffered in the second MLD.

In an implementation, the first MLD has a plurality of stations. The method further includes: The first MLD determines an operating status of a station corresponding to a third link in the plurality of stations based on that the bufferable data corresponding to the fifth data type is not buffered in the second MLD, where the fifth data type is mapped to the third link, and the operating status is an active state or a doze state.

In this technical solution, a more appropriate operating status is determined for the station corresponding to the third link based on that the bufferable data corresponding to the fifth data type is not buffered in the second MLD.

According to an eighth aspect, an embodiment of this application provides still another method for determining a data buffer status. The method includes: A second multi-link device MLD determines that bufferable data corresponding to a fifth data type is not buffered in the second MLD, where the fifth data type is any one of data types supported by a first MLD; and the second MLD sends seventh indication information to the first MLD, where the seventh indication information is used to indicate that the bufferable data corresponding to the fifth data type is not buffered in the second MLD.

In this technical solution, when the bufferable data corresponding to the fifth data type is not buffered in the second MLD, the second MLD cannot send the bufferable data corresponding to the fifth data type to the first MLD; and cannot indicate, by using a More Data subfield in the bufferable data corresponding to the fifth data type, that the bufferable data corresponding to the fifth data type is not buffered in the second MLD, either. In this case, the second MLD may determine, by sending the seventh indication information to the first MLD, that the bufferable data corresponding to the fifth data type is not buffered in the second MLD.

According to a ninth aspect, an embodiment of this application provides still another method for determining a data buffer status. The method includes: A first multi-link device MLD receives eighth indication information from a second MLD through a fourth link, where the eighth indication information is used to indicate that bufferable data corresponding to any data type mapped to the fourth link is not buffered in the second MLD; and the first MLD determines, based on the eighth indication information, that the bufferable data corresponding to the any data type mapped to the fourth link is not buffered in the second MLD.

In this technical solution, the first MLD may determine, based on the eighth indication information, that the bufferable data corresponding to the any data type mapped to the fourth link is not buffered in the second MLD, that is, may determine that the second MLD does not send data to the first MLD through the fourth link subsequently.

In an implementation, the first MLD has a plurality of stations. The method further includes: The first MLD determines an operating status of a station corresponding to the fourth link in the plurality of stations based on that the bufferable data corresponding to the any data type mapped to the fourth link is not buffered in the second MLD, where the operating status is an active state or a doze state.

In this technical solution, a more appropriate operating status is determined for the station corresponding to the fourth link based on that the bufferable data corresponding to the any data type mapped to the fourth link is not buffered in the second MLD.

According to a tenth aspect, an embodiment of this application provides still another method for determining a data buffer status. The method includes: A second multi-link device MLD determines that bufferable data corresponding to any data type mapped to a fourth link is not buffered in the second MLD; and the second MLD sends eighth indication information to a first MLD through the fourth link, where the eighth indication information is used to indicate that the bufferable data corresponding to the any data type mapped to the fourth link is not buffered in the second MLD.

In this technical solution, the second MLD may indicate, by sending the eighth indication information to the first MLD, that the bufferable data corresponding to the any data type mapped to the fourth link is not buffered in the second MLD, that is, indicate that the second MLD does not send data to the first MLD through the fourth link subsequently.

According to an eleventh aspect, an embodiment of this application provides still another method for determining a data buffer status. The method includes: A first multi-link device MLD receives ninth indication information from a second MLD, where the ninth indication information is used to indicate a buffer status of bufferable data that corresponds to at least one data type supported by the first MLD and that is in the second MLD; and the first MLD determines, based on the ninth indication information, the buffer status of the bufferable data that corresponds to the at least one data type and that is in the second MLD.

In this technical solution, the first MLD may determine, based on the ninth indication information, a buffer status of bufferable data that corresponds to more than one data type and that is in the second MLD.

In an implementation, the first MLD has a plurality of stations. The method further includes: The first MLD determines an operating status of at least one station in the plurality of stations based on the buffer status of the bufferable data that corresponds to the at least one data type and that is in the second MLD, where the operating status is an active state or a doze state.

In this technical solution, a more appropriate operating status is determined for the station in the first MLD based on the buffer status of the bufferable data that corresponds to the at least one data type and that is in the second MLD.

According to a twelfth aspect, an embodiment of this application provides still another method for determining a data buffer status. The method includes: A second multi-link device MLD determines a buffer status of bufferable data that corresponds to at least one data type supported by a first MLD and that is in the second MLD; and the second MLD sends ninth indication information to the first MLD, where the ninth indication information is used to indicate the buffer status of the bufferable data that corresponds to the at least one data type supported by the first MLD and that is in the second MLD.

In this technical solution, the second MLD may indicate, to the first MLD by using the ninth indication information, a buffer status of bufferable data that corresponds to more than one data type and that is in the second MLD.

According to a thirteenth aspect, an embodiment of this application provides still another method for determining a data buffer status. The method includes: A first multi-link device MLD receives tenth indication information from a second MLD, where the tenth indication information is used to indicate a buffer status of bufferable data that corresponds to at least one data type mapped to at least one link corresponding to the first MLD and that is in the second MLD; and the first MLD determines, based on the tenth indication information, the buffer status of the bufferable data that corresponds to the at least one data type mapped to the at least one link and that is in the second MLD.

In this technical solution, the buffer status of the bufferable data that corresponds to the at least one data type mapped to the at least one link and that is in the second MLD may be determined based on the tenth indication information. In this way, the buffer status of the bufferable data in the second MLD may be determined in more detail.

In an implementation, the first MLD has a plurality of stations. The method further includes: The first MLD determines an operating status of at least one station in the plurality of stations based on the buffer status of the bufferable data that corresponds to the at least one data type mapped to the at least one link and that is in the second MLD, where the operating status is an active state or a doze state.

In this technical solution, a more appropriate operating status is determined for the station in the first MLD based on the buffer status of the bufferable data that corresponds to the at least one data type mapped to the at least one link and that is in the second MLD.

According to a fourteenth aspect, an embodiment of this application provides still another method for determining a data buffer status. The method includes: A second multi-link device MLD determines a buffer status of bufferable data that corresponds to at least one data type mapped to at least one link corresponding to a first MLD and that is in the second MLD; and the second MLD sends tenth indication information to the first MLD, where the tenth indication information is used to indicate the buffer status of the bufferable data that corresponds to the at least one data type mapped to the at least one link corresponding to the first MLD and that is in the second MLD.

In this technical solution, the second MLD may indicate, to the first MLD by using the tenth indication information, the buffer status of the bufferable data that corresponds to the at least one data type mapped to the at least one link and that is in the second MLD. In this way, the buffer status of the bufferable data in the second MLD may be indicated in more detail.

According to a fifteenth aspect, an embodiment of this application provides a communications apparatus. The communications apparatus has a part or all of functions of implementing the first MLD in the method example according to the first aspect, the third aspect, the fifth aspect, the seventh aspect, the ninth aspect, the eleventh aspect, or the thirteenth aspect. For example, the communications apparatus may have functions of implementing a part or all of the embodiments of this application, or may have a function of independently implementing any embodiment of this application. The function may be implemented by hardware, or may be implemented by hardware executing corresponding software. The hardware or the software includes one or more units or modules corresponding to the function.

In an implementation, a structure of the communications apparatus may include a processing unit and a communications unit. The processing unit is configured to support the communications apparatus in performing a corresponding function in the foregoing method. The communications unit is configured to support communication between the communications apparatus and another device. The communications apparatus may further include a storage unit. The storage unit is configured to be coupled to the processing unit and a communications unit, and the storage unit stores a computer program and data that are necessary for the communications apparatus.

In an implementation, when the communications apparatus has a part or all of functions of implementing the first MLD in the method example according to the first aspect, the communications apparatus includes:

a communications unit, configured to receive first indication information from a second MLD, where the first indication information is used to indicate a buffer status of bufferable data that corresponds to an association identifier of the communications apparatus and that is in the second MLD; and a processing unit, configured to determine, based on the first indication information and a correspondence between the association identifier of a first MLD and a data type supported by the first MLD, a buffer status of bufferable data that corresponds to the at least one data type and that is in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the first aspect, the communications apparatus includes:

a transceiver, configured to receive first indication information from a second MLD, where the first indication information is used to indicate a buffer status of bufferable data that corresponds to an association identifier of the communications apparatus and that is in the second MLD; and a processor, configured to determine, based on the first indication information and a correspondence between the association identifier of a first MLD and a data type supported by the first MLD, a buffer status of bufferable data that corresponds to the at least one data type and that is in the second MLD.

In an implementation, when the communications apparatus has a part or all of functions of implementing the first MLD in the method example according to the third aspect, the communications apparatus includes:

a communications unit, configured to receive bufferable data from a second MLD over a first link, where the bufferable data includes third indication information, the third indication information is used to indicate whether bufferable data corresponding to at least one second data type is buffered in the second MLD, and the second data type is any data type mapped to the first link; and a processing unit, configured to determine, based on the third indication information, whether the bufferable data corresponding to the at least one second data type is buffered in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the third aspect, the communications apparatus includes:

a transceiver, configured to receive bufferable data from a second MLD over a first link, where the bufferable data includes third indication information, the third indication information is used to indicate whether bufferable data corresponding to at least one second data type is buffered in the second MLD, and the second data type is any data type mapped to the first link; and a processor, configured to determine, based on the third indication information, whether the bufferable data corresponding to the at least one second data type is buffered in the second MLD.

In an implementation, when the communications apparatus has a part or all of functions of implementing the first MLD in the method example according to the fifth aspect, the communications apparatus includes:

a communications unit, configured to receive, from a second MLD, bufferable data corresponding to a third data type, where the bufferable data includes fifth indication information, and the fifth indication information is used to indicate whether the bufferable data corresponding to the third data type is buffered in the second MLD; and a processing unit, configured to determine, based on the fifth indication information, whether the bufferable data corresponding to the third data type is buffered in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the fifth aspect, the communications apparatus includes:

a transceiver, configured to receive, from a second MLD, bufferable data corresponding to a third data type, where the bufferable data includes fifth indication information, and the fifth indication information is used to indicate whether the bufferable data corresponding to the third data type is buffered in the second MLD; and a processor, configured to determine, based on the fifth indication information, whether the bufferable data corresponding to the third data type is buffered in the second MLD.

In an implementation, when the communications apparatus has a part or all of functions of implementing the first MLD in the method example according to the seventh aspect, the communications apparatus includes:

a communications unit, configured to receive seventh indication information from a second MLD, where the seventh indication information is used to indicate that bufferable data corresponding to a fifth data type is not buffered in the second MLD, and the fifth data type is any one of data types supported by the communications apparatus; and a processing unit, configured to determine, based on the seventh indication information, that the bufferable data corresponding to the fifth data type is not buffered in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the seventh aspect, the communications apparatus includes:

a transceiver, configured to receive seventh indication information from a second MLD, where the seventh indication information is used to indicate that bufferable data corresponding to a fifth data type is not buffered in the second MLD, and the fifth data type is any one of data types supported by the communications apparatus; and a processor, configured to determine, based on the seventh indication information, that the bufferable data corresponding to the fifth data type is not buffered in the second MLD.

In an implementation, when the communications apparatus has a part or all of functions of implementing the first MLD in the method example according to the ninth aspect, the communications apparatus includes:

a communications unit, configured to receive eighth indication information from a second MLD through a fourth link, where the eighth indication information is used to indicate that bufferable data corresponding to any data type mapped to the fourth link is not buffered in the second MLD; and a processing unit, configured to determine, based on the eighth indication information, that the bufferable data corresponding to the any data type mapped to the fourth link is not buffered in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the ninth aspect, the communications apparatus includes:

a transceiver, configured to receive eighth indication information from a second MLD through a fourth link, where the eighth indication information is used to indicate that bufferable data corresponding to any data type mapped to the fourth link is not buffered in the second MLD; and a processor, configured to determine, based on the eighth indication information, that the bufferable data corresponding to the any data type mapped to the fourth link is not buffered in the second MLD.

In an implementation, when the communications apparatus has a part or all of functions of implementing the first MLD in the method example according to the eleventh aspect, the communications apparatus includes:

a communications unit, configured to receive ninth indication information from a second MLD, where the ninth indication information is used to indicate a buffer status of bufferable data that corresponds to at least one data type supported by the communications apparatus and that is in the second MLD; and a processing unit, configured to determine, based on the ninth indication information, the buffer status of the bufferable data that corresponds to the at least one data type and that is in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the eleventh aspect, the communications apparatus includes:

a transceiver, configured to receive ninth indication information from a second MLD, where the ninth indication information is used to indicate a buffer status of bufferable data that corresponds to at least one data type supported by the communications apparatus and that is in the second MLD; and a processor, configured to determine, based on the ninth indication information, the buffer status of the bufferable data that corresponds to the at least one data type and that is in the second MLD.

In an implementation, when the communications apparatus has a part or all of functions of implementing the first MLD in the method example according to the thirteenth aspect, the communications apparatus includes:

a communications unit, configured to receive tenth indication information from a second MLD, where the tenth indication information is used to indicate a buffer status of bufferable data that corresponds to at least one data type mapped to at least one link corresponding to the communications apparatus and that is in the second MLD; and a processing unit, configured to determine, based on the tenth indication information, the buffer status of the bufferable data that corresponds to the at least one data type mapped to the at least one link and that is in the second MLD.

For example, the processing unit may be a processor, the communications unit may be a transceiver or a communications interface, and the storage unit may be a memory.

In an implementation, when the communications apparatus has a part or all of functions of implementing the first MLD in the method example according to the thirteenth aspect, the communications apparatus includes:

a transceiver, configured to receive tenth indication information from a second MLD, where the tenth indication information is used to indicate a buffer status of bufferable data that corresponds to at least one data type mapped to at least one link corresponding to the communications apparatus and that is in the second MLD; and a processor, configured to determine, based on the tenth indication information, the buffer status of the bufferable data that corresponds to the at least one data type mapped to the at least one link and that is in the second MLD.

According to a sixteenth aspect, an embodiment of this application provides another communications apparatus. The communications apparatus has a part or all of functions of implementing the second MLD in the method example according to the second aspect, the fourth aspect, the sixth aspect, the eighth aspect, the tenth aspect, the twelfth aspect, or the fourteenth aspect. For example, the communications apparatus may have functions of implementing a part or all of the embodiments of this application, or may have a function of independently implementing any embodiment of this application. The function may be implemented by hardware, or may be implemented by hardware executing corresponding software. The hardware or the software includes one or more units or modules corresponding to the function.

In an implementation, a structure of the communications apparatus may include a processing unit, a storage unit, and a communications unit. The processing unit is configured to support the communications apparatus in performing a corresponding function in the foregoing method. The communications unit is configured to support communication between the communications apparatus and another device. The storage unit is configured to be coupled to the processing unit and a communications unit, and the storage unit stores a computer program and data that are necessary for the communications apparatus. The storage unit is configured to store bufferable data.

In an implementation, when the communications apparatus has a part or all of functions of implementing the second MLD in the method example according to the second aspect, the communications apparatus includes:

a processing unit, configured to: determine a buffer status of bufferable data that corresponds to at least one data type supported by a first MLD and that is in a storage unit; and determine, based on the buffer status of the bufferable data that corresponds to the at least one data type and that is in the storage unit and a correspondence between an association identifier of the first MLD and the supported data type, a buffer status of bufferable data that corresponds to the association identifier and that is in the storage unit; and a communications unit, configured to send first indication information to the first MLD, where the first indication information is used to indicate the buffer status of the bufferable data that corresponds to the association identifier of the first MLD and that is in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the second aspect, the communications apparatus includes:

a processor, configured to: determine a buffer status of bufferable data that corresponds to at least one data type supported by a first MLD and that is in a memory; and determine, based on the buffer status of the bufferable data that corresponds to the at least one data type and that is in the memory and a correspondence between an association identifier of the first MLD and the supported data type, a buffer status of bufferable data that corresponds to the association identifier and that is in the memory; and a transceiver, configured to send first indication information to the first MLD, where the first indication information is used to indicate the buffer status of the bufferable data that corresponds to the association identifier of the first MLD and that is in the memory.

In an implementation, when the communications apparatus has a part or all of functions of implementing the second MLD in the method example according to the fourth aspect, the communications apparatus includes:

a processing unit, configured to determine whether bufferable data corresponding to at least one second data type is buffered in a storage unit, where the second data type is any data type mapped to a first link; and a communications unit, configured to send bufferable data to a first MLD over the first link, where the bufferable data includes third indication information, and the third indication information is used to indicate whether the bufferable data corresponding to the at least one second data type is buffered in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the fourth aspect, the communications apparatus includes:

a processor, configured to determine whether bufferable data corresponding to at least one second data type is buffered in a memory, where the second data type is any data type mapped to a first link; and a transceiver, configured to send bufferable data to a first MLD over the first link, where the bufferable data includes third indication information, and the third indication information is used to indicate whether the bufferable data corresponding to the at least one second data type is buffered in the memory.

In an implementation, when the communications apparatus has a part or all of functions of implementing the second MLD in the method example according to the sixth aspect, the communications apparatus includes:

a processing unit, configured to determine whether bufferable data corresponding to a third data type is buffered in a storage unit; and a communications unit, configured to send, to a first MLD, the bufferable data corresponding to the third data type, where the bufferable data includes fifth indication information, and the fifth indication information is used to indicate whether the bufferable data corresponding to the third data type is buffered in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the sixth aspect, the communications apparatus includes:
- a processor, configured to determine whether bufferable data corresponding to a third data type is buffered in a memory; and
- a transceiver, configured to send, to a first MLD, the bufferable data corresponding to the third data type, where the bufferable data includes fifth indication information, and the fifth indication information is used to indicate whether the bufferable data corresponding to the third data type is buffered in the memory.

In an implementation, when the communications apparatus has a part or all of functions of implementing the second MLD in the method example according to the eighth aspect, the communications apparatus includes:
- a processing unit, configured to determine that bufferable data corresponding to a fifth data type is not buffered in a storage unit, where the fifth data type is any one of data types supported by a first MLD; and
- a communications unit, configured to send seventh indication information to the first MLD, where the seventh indication information is used to indicate that the bufferable data corresponding to the fifth data type is not buffered in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the eighth aspect, the communications apparatus includes:
- a processor, configured to determine that bufferable data corresponding to a fifth data type is not buffered in a memory, where the fifth data type is any one of data types supported by a first MLD; and
- a transceiver, configured to send seventh indication information to the first MLD, where the seventh indication information is used to indicate that the bufferable data corresponding to the fifth data type is not buffered in the memory.

In an implementation, when the communications apparatus has a part or all of functions of implementing the second MLD in the method example according to the tenth aspect, the communications apparatus includes:
- a processing unit, configured to determine that bufferable data corresponding to any data type mapped to a fourth link is not buffered in a storage unit; and
- a communications unit, configured to send eighth indication information to a first MLD through the fourth link, where the eighth indication information is used to indicate that the bufferable data corresponding to the any data type mapped to the fourth link is not buffered in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the tenth aspect, the communications apparatus includes:
- a processor, configured to determine that bufferable data corresponding to any data type mapped to a fourth link is not buffered in a memory; and
- a transceiver, configured to send eighth indication information to a first MLD through the fourth link, where the eighth indication information is used to indicate that the bufferable data corresponding to the any data type mapped to the fourth link is not buffered in the memory.

In an implementation, when the communications apparatus has a part or all of functions of implementing the second MLD in the method example according to the twelfth aspect, the communications apparatus includes:
- a processing unit, configured to determine a buffer status of bufferable data that corresponds to at least one data type supported by a first MLD and that is in a storage unit; and
- a communications unit, configured to send ninth indication information to the first MLD, where the ninth indication information is used to indicate the buffer status of the bufferable data that corresponds to the at least one data type supported by the first MLD and that is in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the twelfth aspect, the communications apparatus includes:
- a processor, configured to determine a buffer status of bufferable data that corresponds to at least one data type supported by a first MLD and that is in a memory; and
- a transceiver, configured to send ninth indication information to the first MLD, where the ninth indication information is used to indicate the buffer status of the bufferable data that corresponds to the at least one data type supported by the first MLD and that is in the memory.

In an implementation, when the communications apparatus has a part or all of functions of implementing the second MLD in the method example according to the fourteenth aspect, the communications apparatus includes:
- a processing unit, configured to determine a buffer status of bufferable data that corresponds to at least one data type mapped to at least one link corresponding to a first MLD and that is in a storage unit; and
- a communications unit, configured to send tenth indication information to the first MLD, where the tenth indication information is used to indicate the buffer status of the bufferable data that corresponds to the at least one data type mapped to the at least one link corresponding to the first MLD and that is in the storage unit.

For example, the processing unit may be a processor, the communications unit may be a transceiver or a communications interface, and the storage unit may be a memory.

In an implementation, when the communications apparatus has a part or all of functions of implementing the second MLD in the method example according to the fourteenth aspect, the communications apparatus includes:
- a processor, configured to determine a buffer status of bufferable data that corresponds to at least one data type mapped to at least one link corresponding to a first MLD and that is in a memory; and a transceiver, configured to send tenth indication information to the first MLD, where the tenth indication information is used to indicate the buffer status of the bufferable data that corresponds to the at least one data type mapped to the at least one link corresponding to the first MLD and that is in the memory.

According to a seventeenth aspect, an embodiment of the present invention provides a computer-readable storage medium, configured to store a computer program to be used by the first MLD. When the computer program is run, the first MLD performs the method according to the first aspect, the third aspect, the fifth aspect, the seventh aspect, the ninth aspect, the eleventh aspect, or the thirteenth aspect.

According to an eighteenth aspect, an embodiment of the present invention provides a computer-readable storage medium, configured to store a computer program to be used by the second MLD. When the computer program is run, the second MLD performs the method according to the second aspect, the fourth aspect, the sixth aspect, the eighth aspect, the tenth aspect, the twelfth aspect, or the fourteenth aspect.

According to a nineteenth aspect, this application further provides a computer program product including a computer program. When the computer program product runs on a computer, the computer is enabled to perform the method according to the first aspect, the third aspect, the fifth aspect, the seventh aspect, the ninth aspect, the eleventh aspect, or the thirteenth aspect.

According to a twentieth aspect, this application further provides a computer program product including a computer program. When the computer program product runs on a computer, the computer is enabled to perform the method according to the second aspect, the fourth aspect, the sixth aspect, the eighth aspect, the tenth aspect, the twelfth aspect, or the fourteenth aspect.

According to a twenty-first aspect, this application provides a chip system. The chip system includes at least one processor and an interface, configured to support a first MLD in implementing a function in the first aspect, the third aspect, the fifth aspect, the seventh aspect, the ninth aspect, the eleventh aspect, or the thirteenth aspect, for example, a function of determining or processing at least one of data and information in the foregoing method. In a possible design, the chip system further includes a memory, and the memory is configured to store a computer program and data that are necessary for the first MLD. The chip system may include a chip, or may include a chip and another discrete device.

According to a twenty-second aspect, this application provides a chip system. The chip system includes at least one processor, at least one memory, and an interface, configured to support a second MLD in implementing a function in the second aspect, the fourth aspect, the sixth aspect, the eighth aspect, the tenth aspect, the twelfth aspect, or the fourteenth aspect, for example, a function of determining or processing at least one of data and information in the foregoing method. The memory is configured to store bufferable data, and a computer program and data that are necessary for the second MLD. The chip system may include a chip, or may include a chip and another discrete device.

DESCRIPTION OF EMBODIMENTS

Figure 1:
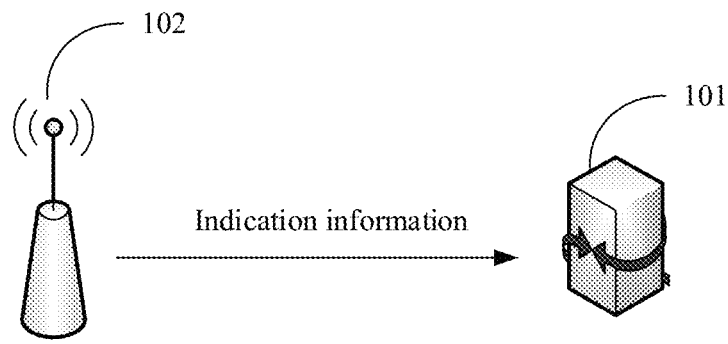
FIG. 1 is a schematic diagram of an architecture of a communications system according to an embodiment of this application.

For ease of understanding, terms in this application are first described.

1. Traffic Indication Map (Traffic Indication Map, TIM) Field

The TIM field may be included in a TIM element carried in an 802.11 beacon (Beacon) frame. An AP MLD may periodically send an 802.11 beacon frame to one or more non-AP MLDs, and a buffer status of bufferable data that corresponds to each station included in each non-AP MLD and that is on the AP MLD may be determined based on a TIM element carried in the beacon frame. A buffer status of bufferable data that corresponds to a station and that is on the AP MLD may refer to whether data to be sent to the station is buffered on the AP MLD.

A non-AP station may have two operating modes: a non-energy-saving mode and an energy-saving mode. In the non-energy-saving mode, the non-AP station is in an active state regardless of whether data needs to be transmitted between the non-AP station and an AP station. In the energy-saving mode, when data needs to be transmitted between the non-AP station and the AP station, the non-AP station may be in an active state. When no data needs to be transmitted between the non-AP station and the AP station, the non-AP station may be in a doze state, so that power consumption of the non-AP MLD can be reduced.

The non-AP station in the energy-saving mode may be periodically woken up (that is, be in the active state) and receive the beacon frame sent by the AP MLD, to determine whether data to be sent to the non-AP station is buffered on the AP MLD. If the data corresponding to the non-AP station is not buffered on the AP MLD, the non-AP station may be switched to the doze state. If data corresponding to the non-AP station is buffered on the AP MLD, the non-AP station may be switched to the active state to receive the corresponding data.

The 802.11 beacon frame may include a TIM beacon frame or a delivery traffic indication map (DTIM) beacon frame. The TIM beacon frame and the DTIM beacon frame each carry a TIM element. Fields included in the TIM element may be shown in Table 1.

TABLE 1

| | | | Fields included in a TIM element | | |
|---|---|---|---|---|---|
| Element identifier | Length | Delivery traffic indication map count | Delivery traffic indication map period | Bitmap control | Partial virtual bitmap |

The element identifier (ID) field is used to identify that the element is a TIM element. The length field is used to indicate a quantity of bytes occupied by the TIM element. The DTIM count field is used to indicate how many TIM beacon frames are present before a next DTIM beacon frame arrives. The DTIM period field indicates an interval between arrival of two adjacent DTIM beacon frames. The element ID field, the length field, the DTIM count field, the DTIM period field, and the bitmap control field each may occupy 1 byte. A bit 0 in the bitmap control field may indicate whether there is a downlink multicast data service when an AP sends a DTIM beacon frame, and bits 1 to 7 in the bitmap control field may indicate an offset of the partial virtual bitmap, where the offset is in a unit of byte (that is, 8 bits). A part of virtual bits are a TIM field, and each bit in the TIM field corresponds to one association identifier (AID). For example, if the offset is 0, the partial virtual bitmap may start from an AID 1; if the offset is 1, the partial virtual bitmap may start from an AID 9.

2. Access Category (AC)

Enhanced distributed channel access (EDCA) is a channel contention mechanism. The EDCA classifies data packets into four ACs. An AC with a higher priority has a greater opportunity of occupying a channel than an AC with a lower priority. The EDCA allows a packet with a higher priority to be preferentially sent and to occupy more bandwidth. The four ACs are voice (AC_VO), video (AC_VI), background (AC_BK), and best effort (AC_BE) in descending order of priorities.

3. Traffic Identifier (TID)

An upper-layer entity may distinguish, by using a TID, quality of service (QoS) supported by a MAC service data unit (MSDU) at a medium access control (MAC) layer. The EDCA may support eight TIDs, and the eight TIDs are a TID 0 to a TID 7. There is a correspondence between an AC and a TID. One AC may correspond to one or more TIDs, and one TID corresponds to one AC.

4. Management Frame

The management frame may be used to manage a data packet, control a network, and the like. The management frame may include but is not limited to a beacon frame, a probe request frame, a probe response frame, an independent basic service set (IBSS) announcement traffic indication message (ATIM) frame, a disassociation frame, a deauthentication frame, an association request frame, a reassociation request frame, an authentication frame, and an action frame. The management frame mentioned in the embodiments of this application may be any one or more of the foregoing management frames.

The beacon frame may be used to declare that a network exists. A mobile workstation may scan an area in which the mobile workstation is located for a specific 802.11 network by using a probe request frame. If the network checked by using the probe request frame is compatible with the probe request frame, the network responds with the probe request frame. An IBSS station buffers a frame for a receiver in the doze state. During transmission, the IBSS station sends an IBSS ATIM frame to notify the receiver that a message is to be transmitted. The disassociation frame and the deauthentication frame each may be used to terminate an authentication relationship. After the mobile workstation finds a compatible network and authentication succeeds, the mobile workstation sends an association request frame to attempt to access the network. When a mobile station that is located in a same extended service area but moves between different basic service areas uses a distributed system again, the mobile station is reassociated with a network by using a reassociation request frame. The action frame is used to trigger a measurement action.

To better understand a method for determining a data buffer status disclosed in the embodiments of this application, the following first describes a communications system to which the embodiments of this application are applicable.

An embodiment of this application provides a communication method applied to a wireless communications system. The wireless communications system may be a wireless local area network (WLAN) or a cellular network, and the method may be implemented by a communications device in the wireless communications system or a chip or a processor in the communications device. The communications device may be a wireless communications device that supports parallel transmission over a plurality of links, for example, the wireless communications device is referred to as a multi-link device or a multi-band device. Compared with a device that supports only single-link transmission, the multi-link device has higher transmission efficiency and a higher throughput.

The multi-link device includes one or more affiliated stations (affiliated STAs). The affiliated STA is a logical station and may operate on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device. A multi-link device whose affiliated station is a non-AP STA may be referred to as a multi-link STA, a multi-link STA device, or a STA multi-link device. For ease of description, that "the multi-link device includes an affiliated STA" is also briefly described as that "the multi-link device includes a STA" in the embodiments of this application.

It should be noted that the multi-link device includes a plurality of logical stations, and each logical station operates on one link, but the plurality of logical stations are allowed to operate on a same link. A link identifier mentioned below represents one station operating on one link. In other words, if there is more than one station on one link, more than one link identifier is required to represent the more than one station. A link mentioned below sometimes also represents a station operating on the link.

When data is to be transmitted between the multi-link AP device and the multi-link STA, a link identifier may be used to identify a link or a station on a link. Before communication, the multi-link AP device and the multi-link STA device may first negotiate or communicate with each other about a correspondence between a link identifier and a link or a station on a link. Therefore, during data transmission, a link identifier is carried without a need to transmit a large amount of signaling information to indicate a link or a station on a link. This reduces signaling overheads and improves transmission efficiency.

The multi-link device may implement wireless communication according to 802.11 family standards. For example, a station complying with an extremely high throughput (EHT), or a station complying with 802.11be or compatible with a station supporting 802.11be implements communication with another device. Certainly, the another device may be a multi-link device, or may not be a multi-link device.

For example, the multi-link device in this embodiment of this application may be a single-antenna device, or may be a multi-antenna device. For example, the device may be a device with more than two antennas. A quantity of antennas included in the multi-link device is not limited in this embodiment of this application. In this embodiment of this application, the multi-link device may allow services of a same access type to be transmitted on different links, and even allow a same data packet to be transmitted on different links; or may not allow services of a same access type to be transmitted on different links, but allow services of different access types to be transmitted on different links.

The multi-link device can operate in a frequency band of sub 1 GHz, 2.4 GHz, 5 GHz, 6 GHz, and a high frequency band of 60 GHz.

For example, the multi-link device is an apparatus having a wireless communication function. The apparatus may be an integrated device, or may be a chip, a processing system, or the like installed on the integrated device. The device on which the chip or the processing system is installed may be controlled by the chip or the processing system to implement methods and functions in the embodiments of this application. For example, the multi-link STA in this embodiment of this application has a wireless transceiving function, can support the 802.11 family standards, and can communicate with a multi-link AP, another multi-link STA, or a single-link device. For example, the multi-link STA is any user communications device that allows a user to communicate with an AP and further communicate with a WLAN. For example, the multi-link STA may be user equipment that can access a network, for example, a tablet computer, a desktop computer, a laptop computer, a notebook computer, an ultra-mobile personal computer (UMPC), a handheld computer, a netbook, a personal digital assistant (PDA), or a mobile phone, or may be an internet of things node in the internet of things, an in-vehicle communications apparatus in the internet of vehicles, or the like. The multi-link STA may alternatively be a chip or a processing system in the foregoing terminals. The multi-link AP in this embodiment of this application is an apparatus that provides a service for the multi-link STA, and can support the 802.11 family standards. For example, the multi-link AP may be a communications entity such as a communications server, a router, a switch, or a bridge, or the multi-link AP may include various forms of macro base stations, micro base stations, relay stations, and the like. Certainly, the multi-link AP may alternatively be a chip or a processing system in the devices in various forms, to implement the methods and functions in the embodiments of this application. In addition, the multi-link device can support high-rate and low-latency transmission. With continuous evolution of wireless local area network application scenarios, the multi-link device may also be applied to more scenarios, for example, a sensor node in a smart city (for example, a smart water meter, a smart electricity meter, or a smart air detection node), a smart device in a smart home (for example, a smart camera, projector, display, television, stereo, refrigerator, or washing machine), a node in the internet of things, an entertainment terminal (for example, a wearable device such as AR or VR), a smart device in smart office (for example, a printer or a projector), an internet of vehicles device in the internet of vehicles, and infrastructure in a daily life scenario (for example, a vending machine, a self-service navigation machine in a supermarket, a self-service cash register device, or a self-service ordering machine). Specific forms of the multi-link STA and the multi-link AP are not specifically limited in this embodiment of this application, and are merely examples for description herein. The 802.11 protocol may be a protocol that supports 802.11be or is compatible with 802.11be.

Although the embodiments of this application are mainly described by using a network in which IEEE 802.11 is deployed as an example, a person skilled in the art easily understands that various aspects of this application can be extended to other networks that use various standards or protocols, for example, BLUETOOTH, a high performance radio LAN (HIPERLAN) (a wireless standard that is similar to the IEEE 802.11 standard, and is mainly used in Europe), a wide area network (WAN), a wireless local area network (WLAN), a personal area network (PAN), or another known or later developed network. Therefore, the various aspects provided in this application are applicable to any suitable wireless network regardless of coverage and a wireless access protocol.

The following describes the embodiments of this application, and the embodiments of this application do not limit the protection scope and applicability of the claims. A person skilled in the art may adaptively change functions and deployments of elements in this application, or omit, replace, or add various processes or components as appropriate without departing from the scope of the embodiments of this application.

FIG. 1 is a schematic diagram of an architecture of a communications system according to an embodiment of this application. The communications system may include but is not limited to one first MLD and one second MLD. A quantity and a form of devices shown in FIG. 1 are used as an example but do not constitute a limitation on this embodiment of this application. In actual application, two or more first MLDs and two or more second MLDs may be included. For example, the communications system shown in FIG. 1 includes one first MLD 101 and one second MLD 102.

The second MLD 102 may be configured to: determine a buffer status of bufferable data that corresponds to at least one data type supported by the first MLD 101 and that is in the second MLD 102; and send indication information to the first MLD 101, where the indication information may be used to indicate the buffer status of the bufferable data that corresponds to the at least one data type supported by the first MLD 101 and that is in the second MLD 102.

After receiving the indication information from the second MLD 102, the first MLD 101 may determine, based on the indication information, the buffer status of the bufferable data that corresponds to the at least one data type supported by the first MLD 101 and that is in the second MLD 102.

In this embodiment of this application, the data type supported by the first MLD 101 may include at least one of a service type and a management frame, where the service type may be an AC or a TID. The first MLD 101 may support one or more data types. For example, the data type supported by the first MLD 101 is a data type 1. A buffer status of bufferable data that corresponds to the data type 1 and that is in the second MLD 102 may refer to whether bufferable data to be sent to the first MLD 101 is buffered in the second MLD 102, where a data type of the bufferable data is the data type 1. In this embodiment of this application, the data type supported by the first MLD 101 may be determined in a process of establishing a connection between the first MLD 101 and the second MLD 102.

Data types supported by different first MLDs 101 may be the same or different. When the communications system shown in FIG. 1 includes a plurality of first MLDs 101, the second MLD 102 may determine a buffer status of bufferable data that corresponds to at least one data type supported by each first MLD 101 and that is in the second MLD 102; and send indication information to each first MLD 101. It should be noted that the second MLD may broadcast the indication information to each first MLD. In this case, the indication information received by all the first MLDs is the same. The indication information may indicate the buffer status of the bufferable data that corresponds to the at least one data type supported by each first MLD 101 and that is in the second MLD 102. Alternatively, the second MLD may separately send the indication information to each first MLD. In this case, the indication information received by all the first MLDs is different. The indication information received by each first MLD is used to indicate the buffer status of the bufferable data that corresponds to the at least one data type supported by the first MLD 101 and that is in the second MLD 102. It should be noted that "at least one" mentioned in this embodiment of this application may be described as "one or more".

When the communications system shown in FIG. 1 includes a plurality of second MLDs 102, each of the second MLDs 102 (for example, a second MLD-a and a second MLD-b) may determine a buffer status of bufferable data that corresponds to at least one data type supported by the first MLD 101 and that is in the second MLD 102; and send indication information to the first MLD 101. Indication information received by the first MLD 101 from the second MLD-a may indicate a buffer status of bufferable data that corresponds to the at least one data type supported by the first MLD 101 and that is in the second MLD-a. Similarly, indication information received by the first MLD 101 from the second MLD-b may indicate a buffer status of bufferable data that corresponds to the at least one data type supported by the first MLD 101 and that is in the second MLD-b.

It may be understood that the communications system described in the embodiments of this application is intended to describe the technical solutions in the embodiments of this application more clearly, but does not constitute a limitation on the technical solutions provided in the embodiments of this application. A person of ordinary skill in the art may learn that, with evolution of a system architecture and emergence of a new service scenario, the technical solutions provided in the embodiments of this application are also applicable to a similar technical problem.

A method for determining a data buffer status, and an apparatus that are provided in this application are described in detail in the following with reference to the accompanying drawings.

Figure 2:
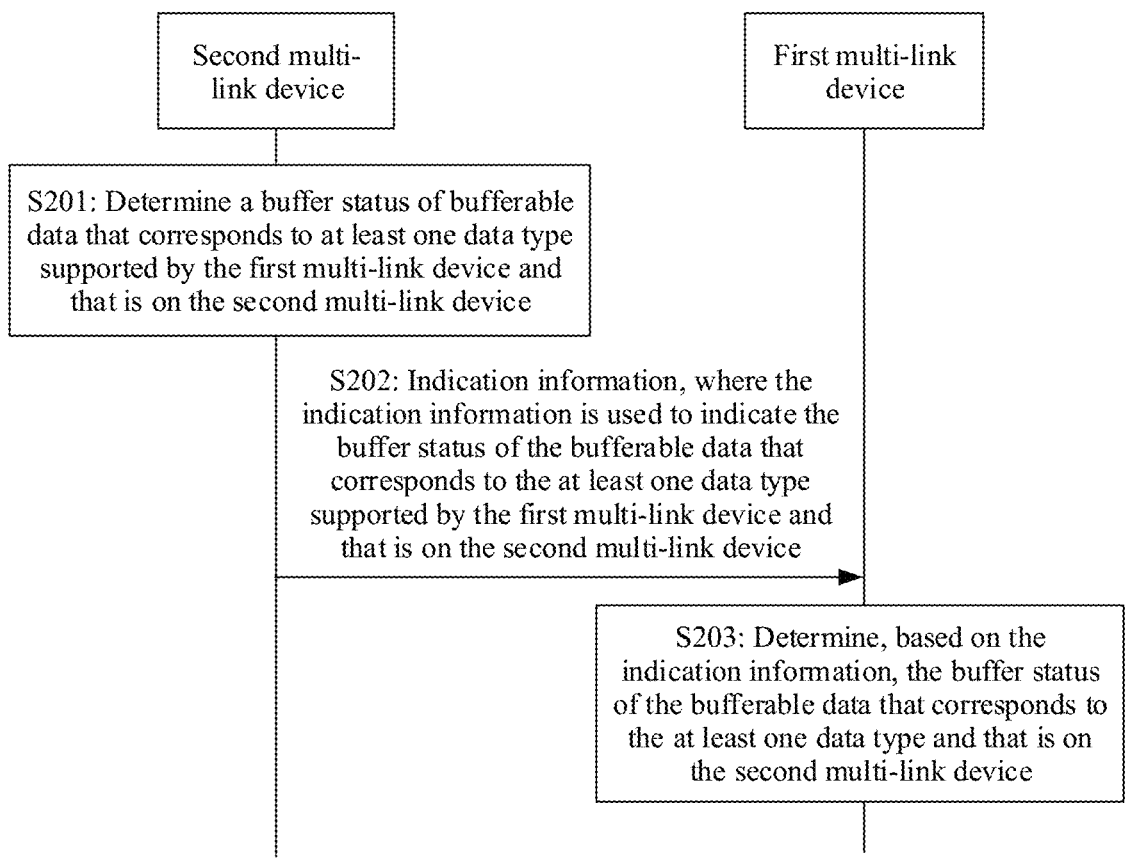
FIG. 2 is a schematic flowchart of a method for determining a data buffer status according to an embodiment of this application.

FIG. 2 is a schematic flowchart of a method for determining a data buffer status according to an embodiment of this application. The method describes in detail how a first MLD determines, based on indication information from a second MLD, a buffer status of bufferable data that corresponds to at least one data type and that is in the second MLD. Step S201 and step S202 are performed by the second MLD or a chip in the second MLD, and step S203 is performed by the first MLD or a chip in the first MLD. An example in which the second MLD and the first MLD perform the method for determining a data buffer status is used for description in the following. As shown in FIG. 2, the method may include but is not limited to the following steps.

Step S201: The second multi-link device MLD determines a buffer status of bufferable data that corresponds to at least one data type supported by the first MLD and that is in the second MLD.

In this embodiment of this application, the second MLD may determine whether the bufferable data corresponding to the at least one data type supported by the first MLD is buffered in the second MLD. When the first MLD supports one data type, the second MLD may determine whether data to be sent to the first MLD is buffered in the second MLD, where a data type of the bufferable data is the data type supported by the first MLD.

When the first MLD supports a plurality of data types, the second MLD may determine whether bufferable data corresponding to each data type supported by the first MLD is buffered in the second MLD. For example, when the first MLD supports three data types (a data type 1, a data type 2, and a data type 3), the second MLD may determine whether bufferable data corresponding to each of the data type 1, the data type 2, and the data type 3 is buffered in the second MLD. In another implementation, the second MLD may determine whether bufferable data corresponding to the data type 1 is buffered in the second MLD, and determine whether bufferable data corresponding to at least one of the data type 2 and the data type 3 is buffered in the second MLD. For example, in the second MLD, when the bufferable data corresponding to the data type 1 is buffered in a buffer area a, and the bufferable data corresponding to at least one of the data type 2 and the data type 3 is buffered in a buffer area b, if the second MLD detects that a bufferable unit (bufferable unit, BU) exists in the buffer area a, it indicates that the bufferable data corresponding to the data type 1 is buffered in the second MLD; if the second MLD detects that no bufferable unit exists in the buffer area a, it indicates that the bufferable data corresponding to the data type 1 is not buffered in the second MLD. Similarly, if the second MLD detects that a bufferable unit exists in the buffer area b, it indicates that the bufferable data corresponding to the at least one of the data type 2 and the data type 3 is buffered in the second MLD; if the second MLD detects that no bufferable unit exists in the buffer area b, it indicates that neither the bufferable data corresponding to the data type 2 nor the bufferable data corresponding to the data type 3 is buffered in the second MLD.

It should be noted that the buffer areas that are occupied by the bufferable data corresponding to the data type 1, the data type 2, and the data type 3 and that are in the second MLD are merely examples, but do not constitute a limitation on this embodiment of this application. How the bufferable data corresponding to the at least one data type supported by the first MLD is buffered in the second MLD is not limited in this embodiment of this application. In an implementation, the second MLD may buffer, in a common buffer area, the bufferable data corresponding to the at least one data type supported by the first MLD. Alternatively, the second MLD may buffer, in a separate buffer area, the bufferable data corresponding to each data type supported by the first MLD. Alternatively, the second MLD may buffer, in combination with a common buffer manner and a separate buffer manner, the bufferable data corresponding to the data type supported by the first MLD. Alternatively, the second MLD may buffer bufferable data corresponding to a service type supported by the first MLD in a buffer area, and buffer bufferable data corresponding to a management frame in another buffer area. The first MLD and the second MLD may be connected through a plurality of links. In an implementation, the second MLD may determine a link through which the bufferable data corresponding to the at least one data type supported by the first MLD is to be transmitted to the first MLD. Further, the second MLD may buffer bufferable data to be transmitted through the same link in a separate buffer area. It should be further noted that the second MLD may send the bufferable data to the first MLD through a station, and the station in the second MLD may schedule the bufferable data from one or more buffer areas and send the bufferable data to the first MLD.

It should be further noted that, when the second MLD has a connection relationship with a plurality of first MLDs, the second MLD may determine a buffer status of bufferable data that corresponds to at least one data type supported by each first MLD and that is in the second MLD.

Step S202: The second MLD sends indication information to the first MLD, where the indication information is used to indicate the buffer status of the bufferable data that corresponds to the at least one data type supported by the first MLD and that is in the second MLD.

Specifically, the second MLD may send the indication information to the first MLD after determining the buffer status of the bufferable data that corresponds to the at least one data type supported by the first MLD and that is in the second MLD. Each bit in the indication information may correspond to one or more data types supported by the first MLD, and a value of each bit may indicate whether bufferable data of a data type corresponding to the bit is buffered in the second MLD. In this embodiment of this application, the indication information may also be referred to as ninth indication information.

In an implementation, the indication information may refer to a bit occupied by a control type a in an EHT A-control field in a MAC frame. The EHT A-control field may support eight control types, that is, information about the eight control types may be carried by using bits corresponding to the EHT A-control field. Related information of the eight control types may be shown in Table 2. It should be noted that the EHT A-control field is merely an example. Alternatively, an HT control field in which the EHT A-control field or an HE A-control field is located may be used as an example. With evolution of a standard version, a name of the field may change, the field falls within the scope of the embodiments of this application, provided that the field indicates a corresponding function.

TABLE 2

| Information about eight control types | | |
|---|---|---|
| Control identifier (control ID) | Meaning | Length of a control information subfield (unit: bit) |
| 0 | Triggered response scheduling (triggered response scheduling, TRS) | 26 |
| 1 | Operating mode (operating mode, OM) | 12 |
| 2 | High efficiency link adaptation (high efficiency link adaptation, HLA) | 26 |
| 3 | Buffer status report (buffer status report, BSR) | 26 |
| 4 | Uplink power headroom (uplink power headroom, UPH) | 8 |
| 5 | Bandwidth query report (bandwidth query report, BQR) | 10 |
| 6 | Command and status (command and status, CAS) | 8 |
| 7 | More data per TID (More Data per TID) | 9 |

In Table 2, a type (More Data Per TID) whose control ID is 7 is newly added. It should be noted that a value and a name of the control ID in Table 2 are merely used as an example, and do not constitute a limitation on this embodiment of this application. It should be further noted that the newly added type is More Data Per TID, and that data types supported by the first MLD include a service type and a management frame and the service type is a TID is used as an example. When the service type is an AC, the newly added type in Table 2 may be more data per AC (More Data Per AC). Correspondingly, in this case, the More Data Per AC may occupy 5 bits, where each of 4 bits corresponds to one AC, and the other bit corresponds to the management frame.

In this embodiment of this application, an example in which the newly added type is More Data Per TID is used for description. The More Data Per TID subfield may include 9 bits, where 8 bits correspond to eight TIDs, each of the 8 bits corresponds to one TID, and the other one bit corresponds to the management frame. When a bit that corresponds to a TID and that is in the More Data Per TID subfield is set to 1, it may indicate that bufferable data corresponding to the TID is buffered in the second MLD. When the bit is set to 0, it may indicate that the bufferable data corresponding to the TID is not buffered in the second MLD. When the bit that corresponds to the management frame and that is in the More Data Per TID subfield is set to 1, it may indicate that bufferable data of the management frame is buffered in the second MLD. When the bit is set to 0, it may indicate that the bufferable data of the management frame is not buffered in the second MLD.

In an implementation, one bit in the More Data Per TID subfield may correspond to one or more TIDs. In this case, a quantity of bits occupied by the More Data Per TID may be less than 9. For example, a bit in the More Data Per TID subfield may correspond to a TID 1 and a TID 2. When the bit is set to 1, it may indicate that bufferable data corresponding to at least one of the TID 1 and the TID 2 is buffered in the second MLD. When the bit is set to 0, it may indicate that neither bufferable data corresponding to the TID1 nor bufferable data corresponding to the TID2 is buffered in the second MLD.

In an implementation, the second MLD may send indication information to a plurality of first MLDs, where the indication information may indicate a buffer status of bufferable data that corresponds to at least one data type supported by each first MLD and that is in the second MLD. For example, when the second MLD sends indication information to a first MLD-a and a first MLD-b, a part of bits in the indication information may correspond to at least one data type supported by the first MLD-a. To be specific, values of the part of bits are used to indicate a buffer status of bufferable data that corresponds to the at least one data type supported by the first MLD-a and that is in the second MLD. Another part of bits in the indication information may correspond to at least one data type supported by the first MLD-b. To be specific, values of the another part of bits are used to indicate a buffer status of bufferable data that corresponds to the at least one data type supported by the first MLD-b and that is in the second MLD.

In this embodiment of this application, data is to be transmitted between the second MLD and the first MLD over a link, and each link is established between one station in the first MLD and one station in the second MLD. If a station in the first MLD or the second MLD is in a doze state, a link corresponding to the station is also in the doze state. In this case, data cannot be transmitted through the link, and the station corresponding to the link in the first MLD cannot receive data, either. In this embodiment of this application, a station in the second MLD may schedule bufferable data in the second MLD, and send the bufferable data to a corresponding station in the first MLD. When the station in the first MLD is in the doze state, the station cannot receive data.

In an implementation, the indication information may be carried in the bufferable data sent by the second MLD to the first MLD. In this case, the indication information may be used to indicate whether the bufferable data (buffered in the second MLD) corresponding to the at least one data type supported by the first MLD is sent completely. Specifically, the indication information may be included in an EHT A-control field in a MAC frame. In another implementation, the second MLD may periodically send indication information to a first MLD to which a station in an energy-saving mode belongs. In this case, the indication information may indicate whether bufferable data to be sent to the station in the energy-saving mode in the first MLD is buffered on the second MLD in a process in which the station is in the doze state. The indication information may be received by a station in an active state in the first MLD. The indication information may be carried in a control frame or a management frame.

Step S203: The first MLD determines, based on the indication information, the buffer status of the bufferable data that corresponds to the at least one data type and that is in the second MLD.

After receiving the indication information from the second MLD, the first MLD may determine, based on the indication information, the buffer status of the bufferable data that corresponds to the at least one data type and that is in the second MLD.

Specifically, if a value of a bit in the indication information is a first value (for example, 1), the first MLD may determine that bufferable data of a data type corresponding to the bit is buffered in the second MLD; if the value of the bit is a second value (for example, 0), the first MLD may determine that the bufferable data of the data type corresponding to the bit is not buffered in the second MLD. For example, the indication information includes two bits (a bit 1 and a bit 2), the first MLD supports three data types (a data type 1, a data type 2, and a data type 3), the bit 1 corresponds to the data type 1, and the bit 2 corresponds to the data type 2 and the data type 3. If a value of the bit 1 is 1, the first MLD may determine that bufferable data corresponding to the data type 1 is buffered in the second MLD. If the value of the bit 1 is 0, the first MLD may determine that the bufferable data corresponding to the data type 1 is not buffered in the second MLD. If a value of the bit 2 is 1, the first MLD may determine that bufferable data corresponding to at least one data type of the data type 2 or the data type 3 is buffered in the second MLD. If the value of the bit 2 is 0, the first MLD may determine that neither bufferable data corresponding to the data type 2 nor bufferable data corresponding to the data type 3 is buffered in the second MLD. That the first value is 1 and the second value is 0 is merely used as an example, but does not constitute a limitation on this embodiment of this application. Optionally, the first value may be 0, and the second value may be 1.

It should be noted that, when only bufferable data corresponding to a part of data types in data types supported by the first MLD is buffered in the second MLD, a bit in the indication information may correspond to only the part of data types in the data types supported by the first MLD. For example, when the first MLD supports three data types (a data type 1, a data type 2, and a data type 3), and bufferable data corresponding to the data type 1 is buffered in the second MLD, but bufferable data corresponding to the data type 2 and bufferable data corresponding to the data type 3 are not buffered in the second MLD, the indication information may include a bit corresponding to the data type 1, but does not include a bit corresponding to the data type 2 and/or the data type 3. In this case, after the first MLD receives the indication information, if the bit corresponding to the data type 1 in the indication information is 1, it may indicate that the bufferable data corresponding to the data type 1 is buffered in the second MLD; if the bit corresponding to the data type 1 in the indication information is 0, it may indicate that the bufferable data corresponding to the data type 1 is not buffered in the second MLD. If the indication information does not include the bit corresponding to the data type 2 and/or the data type 3, the first MLD may determine that neither the bufferable data corresponding to the data type 2 nor the bufferable data corresponding to the data type 3 is buffered in the second MLD.

In an implementation, the first MLD may have a plurality of stations. After determining the buffer status of the bufferable data that corresponds to the at least one supported data type and that is in the second MLD, the first MLD may determine an operating status of at least one station in the plurality of stations in the first MLD based on the buffer status of the bufferable data that corresponds to the at least one data type and that is in the second MLD. The operating status may be an active state or a doze state.

Specifically, the first MLD may determine, by determining a data type corresponding to a bit whose value is 1 in the indication information, that bufferable data corresponding to the data type is buffered in the second MLD. Then, the first MLD may determine, based on a mapping relationship between a supported data type and a link that corresponds to the first MLD, a link to which the data type corresponding to the bufferable data is mapped.

In an implementation, the first MLD may determine all operating statuses of stations corresponding to links to which the data type corresponding to the bufferable data is mapped as the active state. For example, the bufferable data corresponding to the data type 1 supported by the first MLD is buffered in the second MLD, the data type 1 is mapped to a link 1 and a link 2, and the link 1 and the link 2 respectively correspond to a station 1 and a station 2 in the first MLD. In this case, the first MLD may determine both operating statuses of the station 1 and the station 2 as the active state. When a station in the second MLD remains in the active state, an operating status of a station (a station in the first MLD) corresponding to the link to which the data type corresponding to the bufferable data is mapped is determined as the active state, so that the link to which the data type corresponding to the bufferable data is mapped can be in the active state. Further, the second MLD can send the bufferable data to the first MLD through the link.

The link corresponding to the first MLD is a link between the first MLD and the second MLD. It should be noted that, that the data type 1 supported by the first MLD is mapped to the link 1 may indicate that the bufferable data corresponding to the data type 1 is mapped to the link 1, that is, the bufferable data corresponding to the data type 1 is transmitted to the first MLD through the link 1. A management frame may be mapped to one or more links, and one service type may be mapped to one or more links. One or more service types may be mapped to each link, and a management frame may further be mapped to each link. A mapping relationship between a service type supported by the first MLD (or a management frame to be sent to the first MLD) and a link corresponding to the first MLD may be determined through negotiation between the first MLD and the second MLD. For example, the mapping relationship is determined in a process of establishing a connection between the first MLD and the second MLD. When the service type is a TID, the mapping relationship between the service type supported by the first MLD and the link corresponding to the first MLD may be referred to as TID-to-link mapping. When the service type is an AC, a correspondence (that is, AC-to-link mapping) between an AC supported by the first MLD and a link corresponding to the first MLD may be determined based on the TID-to-link mapping and a correspondence between the AC and the TID that are supported by the first MLD.

In another implementation, after determining the links to which the data type corresponding to the bufferable data is mapped, the first MLD may determine, based on current battery level information of the first MLD, a link that needs to be switched to the active state from the links to which the data type corresponding to the bufferable data is mapped, that is, determine a station that needs to be switched to the active state from the stations corresponding to the links to which the data type corresponding to the bufferable data is mapped. The battery level information may include but is not limited to one or more of a remaining battery level and whether the first MLD is in a charging mode. For example, if bufferable data corresponding to AC_VO supported by the first MLD is buffered in the second MLD, AC_VO is mapped to a link 1, a link 2, and a link 3, and a current remaining battery level of the first MLD is relatively low, the first MLD may select to determine operating statuses of a part of the link 1, the link 2, and the link 3 as the active state, and determine operating statuses of the other part of the link 1, the link 2, and the link 3 as the doze state. This can ensure reception of data, and help reduce power consumption.

In still another implementation, the first MLD may determine, based on service requirement information of the first MLD, a link that needs to be switched to the active state from the links to which the data type corresponding to the bufferable data is mapped. For example, if bufferable data corresponding to AC_VO supported by the first MLD and bufferable data corresponding to AC_VI supported by the first MLD are buffered in the second MLD, AC_VO and AC_VI are respectively mapped to a link 1 and a link 2, and for the first MLD, a priority of the bufferable data corresponding to AC_VO is higher than a priority of the bufferable data corresponding to AC_VI, the first MLD may determine a status of the link 1 as the active state, and determine a status of the link 2 as the doze state. This can ensure reception of high-priority data. For another example, if bufferable data corresponding to a management frame of the first MLD and bufferable data corresponding to AC_VO supported by the first MLD are buffered in the second MLD, the management frame and AC_VO are respectively mapped to a link 1 and a link 2, and for the first MLD, a priority of the bufferable data corresponding to the management frame is higher than a priority of the bufferable data corresponding to AC_VO, the first MLD may determine a status of the link 1 as the active state, and determine a status of the link 2 as the doze state. This can ensure reception of high-priority data.

In still another implementation, the first MLD may determine, based on current battery level information and service requirement information of the first MLD, a link that needs to be switched to the active state from the links to which the data type corresponding to the bufferable data is mapped. In the foregoing example, if a current remaining battery level of the first MLD is relatively high, or the first MLD is in a charging mode, the first MLD may determine both statuses of the link 1 and the link 2 as the active state, to receive data in time. If the current remaining battery level of the first MLD is relatively low, and/or the first MLD is not in the charging mode, the first MLD may determine a status of the link 1 as the active state, and determine a status of the link 2 as the doze state, to ensure reception of high-priority data.

It should be noted that service requirements of different devices may be the same or different. For the first MLD, the priority of the bufferable data corresponding to AC_VO is higher than the priority of the bufferable data corresponding to AC_VI. This is merely used as an example, but does not constitute a limitation on this embodiment of this application. In another case or for another MLD device, the priority of the bufferable data corresponding to AC_VO may be lower than the priority of the bufferable data corresponding to AC_VI. Based on at least one of the battery level information or the service requirement information, operating statues of a part of links in the links to which the data type corresponding to the bufferable data is mapped may be determined as the active state, and an operating status of a remaining link may be determined as the doze state. This helps reduce power consumption.

It should be further noted that the priority of the bufferable data corresponding to the management frame is higher than the priority of the bufferable data corresponding to AC_VO, and this is merely used as an example, but does not constitute a limitation on this embodiment of this application. Priorities of the management frame and bufferable data corresponding to each service type are not limited in this embodiment of this application. Optionally, the priority of the bufferable data corresponding to the management frame may be higher than priorities of bufferable data corresponding to all service types. Alternatively, the priority of the bufferable data corresponding to the management frame may be higher than priorities of bufferable data corresponding to a part of service types. Alternatively, the priority of the bufferable data corresponding to the management frame may be lower than a priority of bufferable data corresponding to any service type. In this embodiment of this application, the priority of the bufferable data corresponding to the management frame and the priority of the bufferable data corresponding to each service type may be agreed upon according to a standard, or may be determined through negotiation between the first MLD and the second MLD. This is not limited in this embodiment of this application.

In an implementation, when bufferable data of any data type that is mapped to a link is not buffered in the second MLD, an operating status of the link is not limited in this embodiment of this application. The first MLD may determine the operating status of the link as the doze state or the active state. For example, when a remaining battery level of the first MLD is relatively high or the first MLD is in a charging mode, the first MLD may determine the operating status of the link as the active state. For another example, when the remaining battery level of the first MLD is relatively low, and/or the first MLD is not in the charging mode, the first MLD may determine the operating status of the link as the doze state. This helps reduce power consumption.

In this embodiment of this application, that the first MLD determines an operating status of a link is equivalent to that the first MLD determines an operating status of a station corresponding to the link in the first MLD as the same operating status. In this embodiment of this application, after determining a station whose operating status is the active state, the first MLD may send an indication message to the second MLD, where the indication message may indicate the station in the active state. After receiving the indication message, the second MLD may determine a link in the active state based on the station in the active state. Further, the second MLD may schedule bufferable data to the corresponding link in the active state based on a mapping relationship between a data type supported by the first MLD and a link corresponding to the first MLD, to send the bufferable data to the first MLD.

According to this embodiment of this application, the buffer status of the bufferable data that corresponds to the at least one data type supported by the first MLD and that is in the second MLD can be determined. Further, a more appropriate operating status is determined for the station based on the data type of the bufferable data. This helps reduce power consumption.

Figure 3A:
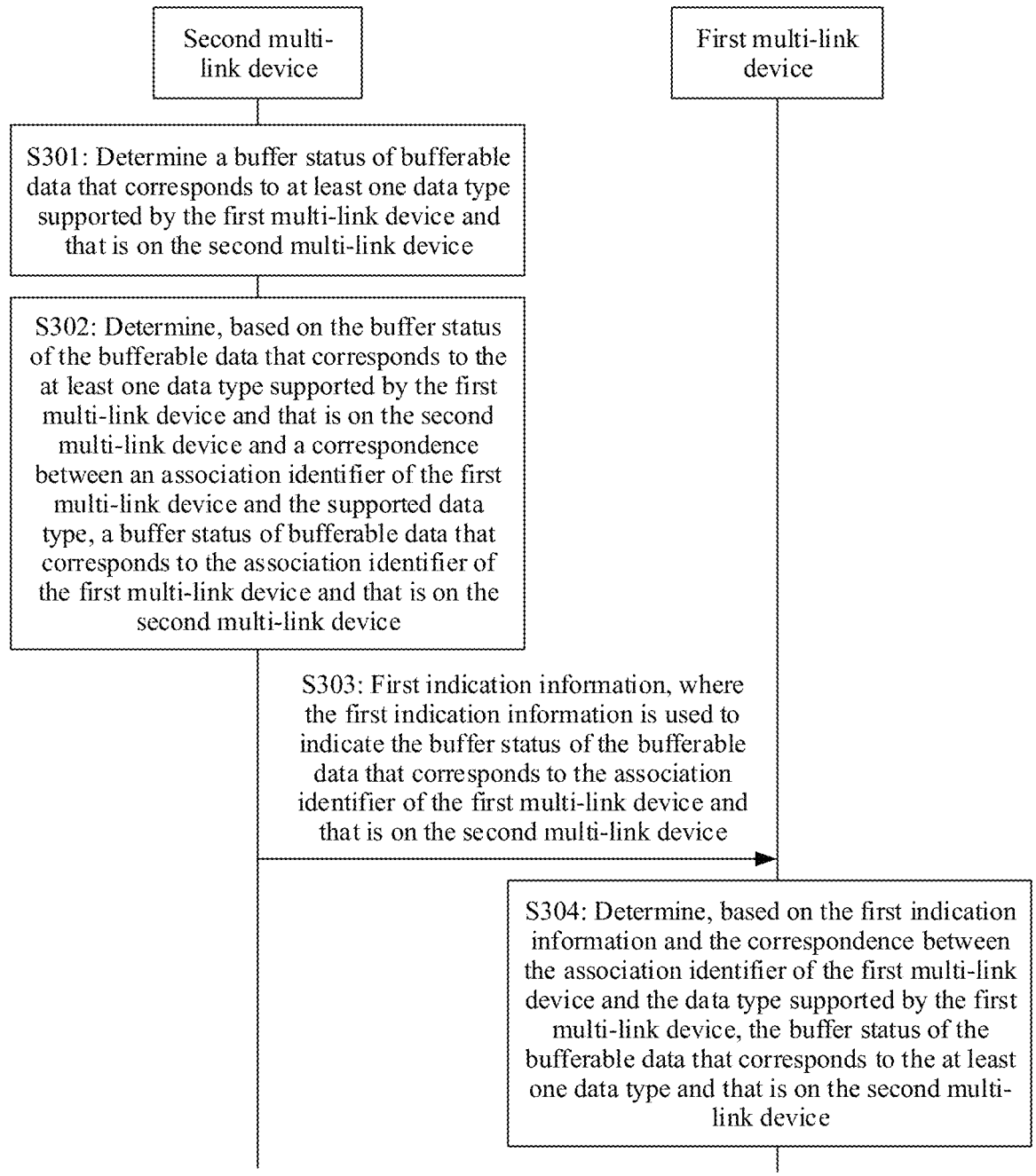
FIG. 3a is a schematic flowchart of another method for determining a data buffer status according to an embodiment of this application.

FIG. 3a is a schematic flowchart of a method for determining a data buffer status according to an embodiment of this application. The method describes in detail how a first MLD determines, based on first indication information and a correspondence between an association identifier of the first MLD and a supported data type, a buffer status of bufferable data that corresponds to at least one data type and that is in a second MLD. Step S301 and step S303 are performed by the second MLD or a chip in the second MLD, and step S304 is performed by the first MLD or a chip in the first MLD. An example in which the second MLD and the first MLD perform the method for determining a data buffer status is used for description in the following. As shown in FIG. 3a, the method may include but is not limited to the following steps.

Step S301: The second MLD determines a buffer status of bufferable data that corresponds to at least one data type supported by the first MLD and that is in the second MLD.

It should be noted that, for a process of performing step S301, refer to the specific description of step S201 in FIG. 2. Details are not described herein again.

Step S302: The second MLD determines, based on the buffer status of the bufferable data that corresponds to the at least one data type supported by the first MLD and that is in the second MLD and a correspondence between an association identifier of the first MLD and the supported data type, a buffer status of bufferable data that corresponds to the association identifier of the first MLD and that is in the second MLD.

Specifically, after determining the buffer status of the bufferable data that corresponds to the at least one data type supported by the first MLD and that is in the second MLD, the second MLD may determine, based on the correspondence between the AID of the first MLD and the supported data type, the buffer status of the bufferable data that corresponds to the AID of the first MLD and that is in the second MLD. In this embodiment of this application, the first MLD may have one or more association identifiers (AIDs). One AID of the first MLD may correspond to one or more data types supported by the first MLD.

TABLE 3

Correspondence between an AID and an AC of the first MLD

| AID | AC |
|---|---|
| AID 0 | AC_VO |
| AID 1 | AC_VI |
| AID 2 | AC_BK |
| AID 3 | AC_BE |

For example, data types supported by the first MLD include a service type and a management frame, and the service type is an AC. Four ACs supported by the first MLD are AC_VO, AC_VI, AC_BK, and AC_BE, bufferable data of the management frame of the first MLD, bufferable data corresponding to AC_VO supported by the first MLD, and bufferable data corresponding to AC_VI supported by the first MLD are buffered in the second MLD, the first MLD have five AIDS: the AID 0 to the AID 4, the AID 4 corresponds to the management frame of the first MLD, and a correspondence between other AIDS and other ACs of the first MLD is shown in Table 3. In this case, the second MLD may determine that bufferable data corresponding to the AID 0, bufferable data corresponding to the AID 1, and bufferable data corresponding to the AID 4 are buffered in the second MLD.

Step S303: The second MLD sends first indication information to the first MLD, where the first indication information is used to indicate the buffer status of the bufferable data that corresponds to the association identifier of the first MLD and that is in the second MLD.

The second MLD may send the first indication information to the first MLD after determining the buffer status of the bufferable data that corresponds to the AID of the first MLD and that is in the second MLD. In the embodiment shown in FIG. 2, each bit in the indication information sent by the second MLD to the first MLD may correspond to one or more data types supported by the first MLD, and a value of each bit may indicate whether bufferable data of a data type corresponding to the bit is buffered in the second MLD. In this embodiment of this application, each bit in the first indication information sent by the second MLD to the first MLD may correspond to one AID of the first MLD. A value of each bit in the first indication information may indicate an AID corresponding to the bit, and whether corresponding bufferable data is buffered in the second MLD. The first MLD may further determine, based on a correspondence between the AID and a supported data type, a buffer status of bufferable data that corresponds to the at least one supported data type and that is in the second MLD. The first indication information may be a TIM field in a beacon frame.

Step S304: The first MLD determines, based on the first indication information and the correspondence between the association identifier of the first MLD and the data type supported by the first MLD, the buffer status of the bufferable data that corresponds to the at least one data type and that is in the second MLD.

Specifically, after receiving the first indication information from the second MLD, the first MLD may determine, based on the first indication information and the correspondence between the association identifier (AID) of the first MLD and the data type supported by the first MLD, the buffer status of the bufferable data that corresponds to the at least one data type and that is in the second MLD. If a value of a bit in the TIM field is 1, and the bit corresponds to the AID 1, it may indicate that the bufferable data corresponding to the AID 1 is buffered in the second MLD. If the AID 1 corresponds to a data type 1 supported by the first MLD, it may indicate that bufferable data corresponding to the data type 1 is buffered in the second MLD. If a value of a bit in the TIM field is 0, and the bit corresponds to the AID 2, it may indicate that the bufferable data corresponding to the AID 2 is not buffered in the second MLD. If the AID 2 corresponds to a data type 2 supported by the first MLD, it may indicate that bufferable data corresponding to the data type 2 is not buffered in the second MLD.

The correspondence between the AID of the first MLD and the data type supported by the first MLD may be determined based on second indication information sent by the second MLD to the first MLD. The second indication information may be used to determine the correspondence between the AID of the first MLD and the data type supported by the first MLD, and the second indication information may be included in an association response frame. It should be noted that this embodiment of this application does not limit a sequence in which the second MLD sends the first indication information and the second indication information, and a sequence in which the first MLD receives the first indication information and the second indication information, provided that the first MLD can determine, based on the first indication information and the second indication information, the buffer status of the bufferable data that corresponds to the at least one data type supported by the first MLD and that is in the second MLD. Preferably, the second MLD may send the second indication information to the first MLD before sending the first indication information. Correspondingly, a moment at which the first MLD receives the second indication information is earlier than a moment at which the first MLD receives the first indication information.

In an implementation, the second indication information received by the first MLD may indicate at least one AID, and the at least one AID may correspond to at least one data type supported by the first MLD. For example, when data types include a management frame and an AC, and the first MLD supports four ACs, the second indication information may include five AIDs, where one AID corresponds to the management frame, and the other four AIDs correspond to the four ACs. It should be noted that a correspondence between the four AIDs in the second indication information and the four ACs is not limited in this embodiment of this application. For example, when the four ACs are AC_VO, AC_VI, AC_BK, and AC_BE, and the four AIDs are an AID 0, an AID 1, an AID 2, and an AID 3, the correspondence between the four ACs and the four AIDs may be shown in Table 3 or Table 4.

TABLE 4

Correspondence between four AIDs and four ACs

| AID | AC |
|---|---|
| AID 0 | AC_VI |
| AID 1 | AC_VO |
| AID 2 | AC_BE |
| AID 3 | AC_BK |

It can be learned from Table 3 that the correspondence between the four AIDs and the four ACs may be that sizes of the AIDs one-to-one correspond to priorities of the ACs. It can be learned from Table 4 that the correspondence between the four AIDs and the four ACs may alternatively be irrelevant to sizes of the AIDs and priorities of the ACs. It should be further noted that in Table 3 and Table 4, the consecutive four AIDs are merely used as an example, but do not constitute a limitation on this embodiment of this application. In another feasible implementation, when the second indication information indicates a plurality of AIDs, the plurality of AIDs may be consecutive or inconsecutive. In other words, the second MLD may randomly select a plurality of AIDs from available AID space and allocate the plurality of AIDs to the first MLD. The at least one AID corresponding to the at least one data type supported by the first MLD is indicated by using the second indication information, so that an AID can be more flexibly allocated to the first MLD.

In an implementation, the first MLD may support a plurality of data types. The second indication information may indicate a first association identifier, and the first association identifier corresponds to a first data type in the plurality of data types. The first MLD may determine, based on the first association identifier corresponding to the first data type, an association identifier corresponding to a data type in the plurality of data types other than the first data type.

For example, data types include a management frame and an AC. It is assumed that the first association identifier indicated by the second indication information is an AID 0, and the AID 0 corresponds to the management frame supported by the first MLD. The first MLD may determine, based on the supported management frame and priorities of various ACs, that AC_VO, AC_VI, AC_BK, and AC_BE respectively correspond to an AID 0+1, an AID 0+2, an AID 0+3, and an AID 0+4. That is, four ACs supported by the first MLD respectively correspond to four consecutive AIDs following the AID 0 indicated by the second indication information. Alternatively, AC_VO, AC_VI, AC_BE, and AC_BK may respectively correspond to an AID 0+2, an AID 0+4, an AID 0+6, and an AID 0+8. That is, AIDs corresponding to various data types supported by the first MLD may be inconsecutive.

It should be noted that, in the foregoing example, that the first association identifier indicated by the second indication information is the AID 0 and the AID 0 corresponds to the management frame is merely used as an example, but does not constitute a limitation on this embodiment of this application. For example, the first association identifier indicated by the second indication information may be an AID 2, and an AID 2 corresponds to AC_VI in the four ACs supported by the first MLD. In this case, the first MLD may determine, based on priorities of various supported data types, that the management frame, AC_VO, AC_BK, and AC_BE respectively correspond to an AID 2+1, an AID 2+2, an AID 2+3, and an AID 2+4. Alternatively, AC_VO corresponds to an AID 2−1, the management frame corresponds to an AID 2−2, and AC_BK and AC_BE respectively correspond to an AID 2+1 and an AID 2+2. When an AID indicated by the second indication information corresponds to one data type in data types supported by the first MLD, the first MLD may determine, based on the AID, an AID corresponding to another supported data type. An AID is indicated in the second indication information. This can effectively reduce signaling overheads.

In an implementation, when the second indication information indicates at least two AIDs, one AID in the at least two AIDs may correspond to the management frame, and the remaining AID corresponds to the service type supported by the first MLD. The AID corresponding to the management frame and AIDs corresponding to a part of service types supported by the first MLD are indicated by using the second indication information, so that signaling overheads can be effectively reduced, and a manner in which the first MLD determines the AID corresponding to the management frame and an AID corresponding to each supported service type can be improved.

Figure 3B:
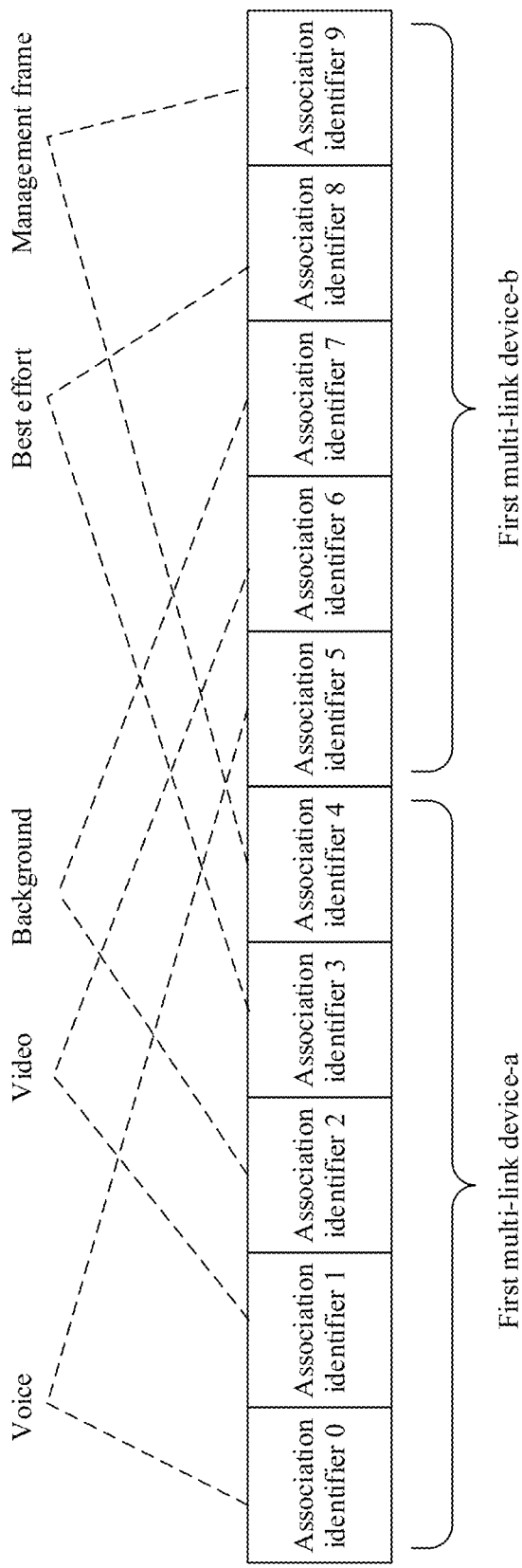
FIG. 3b is a schematic diagram of management frames supported by a first MLD-a and a first MLD-b and an AID corresponding to each AC according to an embodiment of this application.

It should be noted that the second MLD may send the second indication information to each of a plurality of first MLDs, to allocate a different AID to each first MLD. In other words, different first MLDs have different AIDs. For example, when two first MLDs (a first MLD-a and a first MLD-b) each support a management frame and four ACs (AC_VO (voice), AC_VI (video), AC_BE (best effort), and AC_BK (background)), a schematic diagram of management frames supported by the first MLD-a and the first MLD-b and an AID corresponding to each AC may be shown in FIG. 3b. It can be learned from FIG. 3b that AIDs of the first MLD-a are an AID 0 to an AID 4, and AIDs of the first MLD-b are an AID 5 to an AID 8. That is, the AIDs of the first MLD-a are different from the AIDs of the first MLD-b.

In an implementation, a quantity of AIDs allocated by the second MLD to the first MLD may be the same as a quantity of data types supported by the first MLD. When a data type supported by the first MLD is added, the second MLD allocates a new AID to the data type newly supported by the first MLD. In this way, allocation of an unnecessary AID can be avoided.

In an implementation, the second MLD may allocate one AID to one or more data types supported by a same first MLD. For example, when data types supported by the first MLD are a management frame, AC_VO, AC_VI, AC_BE, and AC_BK, the second MLD may allocate one AID to the management frame, AC_VO, and AC_VI, and allocate another AID to AC_BE and AC_BK. Alternatively, the second MLD may allocate one AID to the management frame, allocate one AID to AC_VO, and allocate another AID to AC_VI, AC_BE, and AC_BK. Alternatively, the second MLD may allocate one different AID to each of the management frame, AC_VO, and AC_VI, and allocate another AID to AC_BE and AC_BK. A same AID is allocated to a plurality of data types, so that a quantity of AIDs allocated to the first MLD may be less than a quantity of data types supported by the first MLD. In this way, AIDs can be effectively reduced.

When a same AID is allocated to a plurality of data types, if a value of a bit corresponding to the AID in the TIM field is 1, it may indicate that bufferable data of a part or all of data types corresponding to the AID is buffered in the second MLD. If the value of the bit corresponding to the AID in the TIM field is 0, it may indicate that bufferable data of any data type corresponding to the AID is not buffered in the second MLD.

In an implementation, after determining the buffer status of the bufferable data that corresponds to the at least one supported data type and that is in the second MLD, the first MLD may determine an operating status of at least one station in a plurality of stations in the first MLD based on the buffer status of the bufferable data that corresponds to the at least one data type and that is in the second MLD. In an implementation, the first MLD may determine the operating status of the at least one station in the plurality of stations in the first MLD based on at least one of current battery level information or service requirement information of the first MLD and based on the buffer status of the bufferable data that corresponds to the at least one data type and that is in the second MLD. For a performing process, refer to the specific description of step S203 in FIG. 2. Details are not described herein again.

According to this embodiment of this application, the buffer status of the bufferable data that corresponds to the at least one data type and that is in the second MLD may be determined based on the first indication information and the correspondence between the association identifier of the first MLD and the supported data type. Further, a more appropriate operating status is determined for the station based on the data type of the bufferable data. This helps reduce power consumption.

Figure 4A:
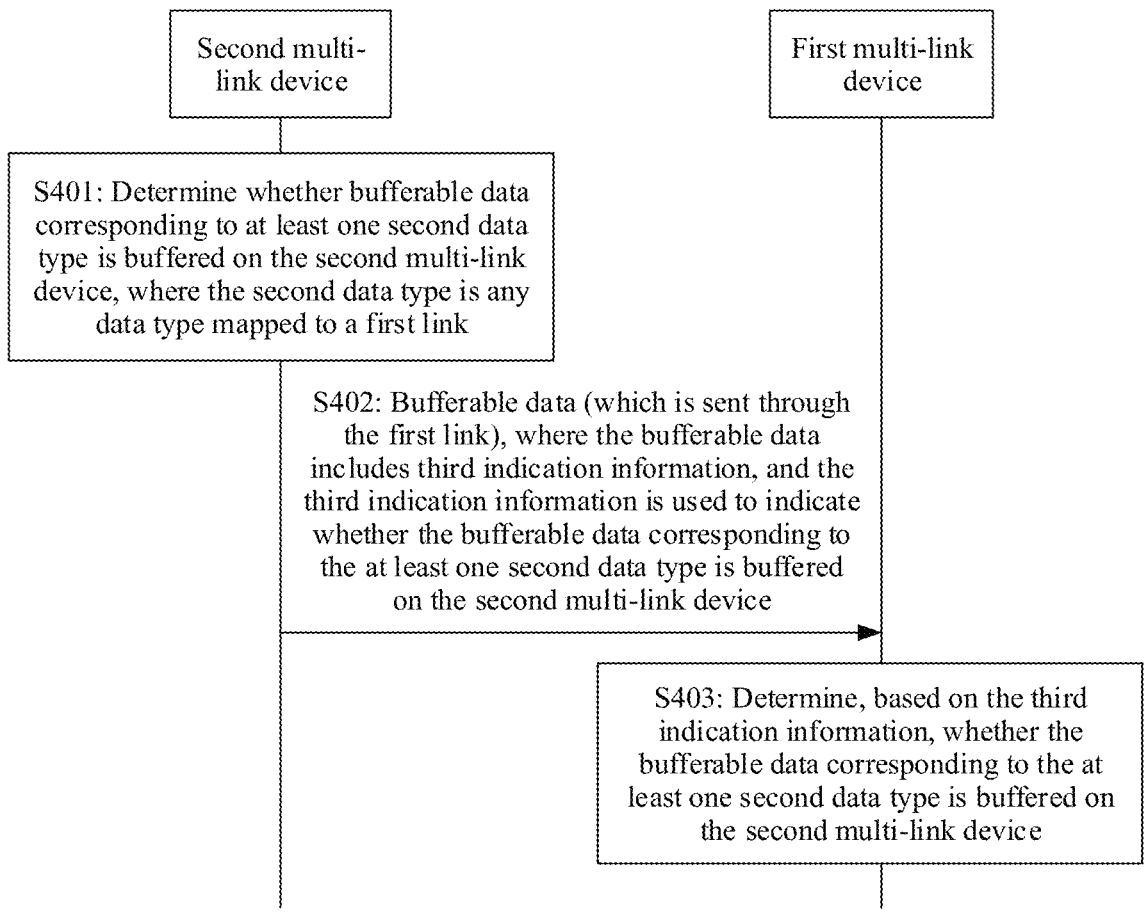
FIG. 4a is a schematic flowchart of still another method for determining a data buffer status according to an embodiment of this application.

FIG. 4a is a schematic flowchart of another method for determining a data buffer status according to an embodiment of this application. The method describes in detail how a second MLD determines whether bufferable data corresponding to at least one second data type is buffered, and how a first MLD determines, based on third indication information from the second MLD, whether the bufferable data corresponding to the at least one second data type is buffered in the second MLD. Step S401 and step S402 are performed by the second MLD or a chip in the second MLD, and step S403 is performed by the first MLD or a chip in the first MLD. An example in which the second MLD and the first MLD perform the method for determining a data buffer status is used for description in the following. The method may include but is not limited to the following steps.

Step S401: The second multi-link device MLD determines whether bufferable data corresponding to at least one second data type is buffered in the second MLD, where the second data type is any data type mapped to a first link.

In this embodiment of this application, one or more data types may be mapped to one link, one data type may be mapped to one or more links, and bufferable data corresponding to each data type mapped to a link may be transmitted through the link. If the bufferable data corresponding to the at least one second data type is buffered in the second MLD, it may indicate that the bufferable data in the second MLD may be transmitted to the first MLD over the first link. If bufferable data corresponding to any second data type is not buffered in the second MLD, it may indicate that bufferable data corresponding to each data type mapped to the first link is sent completely. In other words, bufferable data in the second MLD is not transmitted to the first MLD over the first link. The second MLD may determine, by determining whether the bufferable data corresponding to the at least one second data type is buffered in the second MLD, whether bufferable data may be transmitted to the first MLD over the first link. The first link is a link between the first MLD and the second MLD.

Step S402: The second MLD sends bufferable data to the first MLD over the first link, where the bufferable data includes third indication information, and the third indication information is used to indicate whether the bufferable data corresponding to the at least one second data type is buffered in the second MLD.

In this embodiment of this application, the bufferable data transmitted over the first link may carry the third indication information, to indicate whether bufferable data may be transmitted to the first MLD over the first link. It should be noted that, that the second MLD determines whether bufferable data corresponding to at least one second data type is buffered in the second MLD means: in addition to the bufferable data to which the third indication information belongs, whether the bufferable data corresponding to the at least one second data type is buffered in the second MLD.

For example, a data type a and a data type b are mapped to a link 1. When the second MLD sends bufferable data to the first MLD through the link 1, if bufferable data corresponding to the data type a or bufferable data corresponding to the data type b is buffered in the second MLD, it may indicate that bufferable data may be transmitted to the first MLD through the link 1. If neither bufferable data corresponding to the data type a nor bufferable data corresponding to the data type b is buffered in the second MLD, it may indicate that no bufferable data is transmitted to the first MLD through the link 1.

It should be further noted that each piece of bufferable data sent by the second MLD to the first MLD over the first link carries third indication information, and the third indication information carried in each piece of bufferable data is used to indicate whether the bufferable data corresponding to the at least one second data type is buffered in the second MLD.

A MAC frame structure of the bufferable data includes a frame control (Frame Control) field, the Frame Control field includes a More Data subfield, and a length of the More Data subfield is 1 bit. In this embodiment of this application, the third indication information may be the More Data subfield in the bufferable data. Specifically, when the second MLD sends the bufferable data to the first MLD over the first link, if the bufferable data corresponding to the at least one second data type is buffered in the second MLD, a value of the More Data subfield in the bufferable data may be 1. If the bufferable data corresponding to the any second data type is not buffered in the second MLD, a value of the More Data subfield in the bufferable data may be 0. It should be noted that, that the third indication information is the More Data subfield in the bufferable data is merely used as an example, but does not constitute a limitation on this embodiment of this application. In another feasible implementation, the third indication information may be another field in the MAC frame structure of the bufferable data.

Step S403: The first MLD determines, based on the third indication information, whether the bufferable data corresponding to the at least one second data type is buffered in the second MLD.

Specifically, after receiving the bufferable data from the second MLD over the first link, the first MLD may determine, based on the third indication information in the bufferable data, whether the bufferable data corresponding to the at least one second data type is buffered in the second MLD. When the third indication information is the More Data subfield in the bufferable data, if the value of the More Data subfield in the bufferable data is 1, the first MLD may determine that the bufferable data corresponding to the at least one second data type is buffered in the second MLD. If the value of the More Data subfield in the bufferable data is 0, the first MLD may determine that the bufferable data corresponding to the any second data type is not buffered in the second MLD. For example, when data types mapped to the first link include a management frame and AC_VO, if the value of the More Data subfield in the bufferable data received by the first MLD over the first link is 1, it indicates that at least one type of bufferable data in bufferable data corresponding to the management frame and bufferable data corresponding to AC_VO is subsequently transmitted to the first MLD over the first link. If the value of the More Data subfield in the bufferable data received by the first MLD over the first link is 0, it indicates that neither bufferable data corresponding to the management frame nor bufferable data corresponding to AC_VO is subsequently transmitted to the first MLD over the first link.

In an implementation, the first MLD may have a plurality of stations. After determining whether the bufferable data corresponding to the at least one second data type is buffered in the second MLD, the first MLD may determine an operating status of a station corresponding to the first link in the plurality of stations in the first MLD based on whether the bufferable data corresponding to the at least one second data type is buffered in the second MLD.

In an implementation, if the bufferable data corresponding to the at least one second data type is buffered in the second MLD, that is, the value of the More Data subfield is 1, the first MLD may determine the operating status of the station corresponding to the first link as an active state; if the bufferable data corresponding to the any second data type is not buffered in the second MLD, that is, the value of the More Data subfield is 0, the first MLD may determine the operating status of the station corresponding to the first link as an active state or a doze state.

In the conventional technology, the second MLD may include a plurality of buffer areas, one buffer area corresponds to one link, and bufferable data buffered in different buffer areas is transmitted to the first MLD through different links. The More Data subfield in the bufferable data is used to indicate whether there is bufferable data buffered in a buffer area corresponding to a link for transmitting the bufferable data. If no bufferable data is buffered in the buffer area corresponding to the link (for example, a link 1) for transmitting the bufferable data, the value of the More Data subfield in the bufferable data is 0. Correspondingly, the first MLD may determine an operating status of a station corresponding to the link 1 as the doze state. However, the first MLD cannot receive bufferable data through the link 2 if a case such as link congestion or interference occurs on another link (for example, a link 2). Because the link 1 is in the doze state, the bufferable data originally to be transmitted through the link 2 cannot be scheduled to the link 1 for transmission.

However, in this embodiment of this application, if a data type of the bufferable data originally to be transmitted through the link 2 is also mapped to the link 1 (that is, the first link), before bufferable data corresponding to the data type is sent completely, the first MLD does not determine the operating status of the station corresponding to the link 1 as the doze state. That is, the link 1 is not in the doze state. Therefore, the second MLD may schedule the bufferable data corresponding to the data type (including the bufferable data originally to be transmitted through the link 2) to the link 1 for transmission. According to this embodiment of this application, a more appropriate operating status is determined for the station, and the bufferable data in the second MLD is successfully sent to the first MLD.

In another implementation, the first MLD may determine an operating status of a station corresponding to the first link in the plurality of stations in the first MLD based on at least one of current battery level information or service requirement information of the first MLD and based on whether the bufferable data corresponding to the at least one second data type is buffered in the second MLD. For a performing process, refer to the specific description of step S203 in FIG. 2. Details are not described herein again.

In an implementation, when the third indication information indicates that the bufferable data corresponding to the at least one second data type is buffered in the second MLD, the second MLD may send fourth indication information to the first MLD, where the fourth indication information is used to indicate that the bufferable data corresponding to the any second data type is not buffered in the second MLD. After receiving the fourth indication information, the first MLD may determine that the bufferable data corresponding to the any second data type is not buffered in the second MLD. That is, after receiving the fourth indication information, the first MLD may determine that no bufferable data is subsequently transmitted over the first link.

Figure 4B:
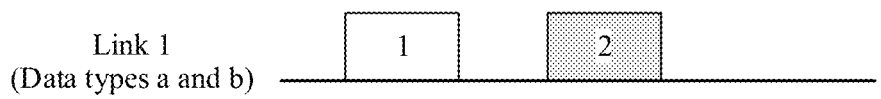
FIG. 4b is a schematic diagram of a scenario in which a second MLD sends bufferable data to a first MLD according to an embodiment of this application.
Figure 4B:
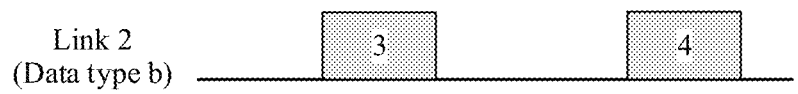
Figure 4B:
Figure 4B:

A schematic diagram of a scenario in which the second MLD sends bufferable data to the first MLD shown in FIG. 4b is used as an example. The first MLD supports a data type a and a data type b, links between the first MLD and the second MLD include a link 1 and a link 2, the data type a and the data type b are mapped to the link 1, and the data type b is mapped to the link 2. In FIG. 4b, a white filled square indicates bufferable data corresponding to the data type a, a gray filled square indicates bufferable data corresponding to the data type b, and a number in the square is used to uniquely identify one piece of bufferable data. In FIG. 4b, the last piece of bufferable data to be transmitted on the link 1 is bufferable data 2, and the last piece of bufferable data to be transmitted on the link 2 is bufferable data 4. It can be learned from FIG. 4b that, when the second MLD sends the bufferable data 2 to the first MLD through the link 1, because the bufferable data 4 is buffered in the second MLD, and the data type b to which the bufferable data 4 belongs is mapped to the link 1, the second MLD may set a value of a More Data subfield in the bufferable data 2 to 1.

Because the data type b is mapped to the link 1 and the link 2, the bufferable data 4 can be transmitted through the link 1 or the link 2. If the second MLD subsequently sends the bufferable data 4 to the first MLD through the link 2, because both the bufferable data corresponding to the data type a mapped to the link 1 and the bufferable data corresponding to the data type b mapped to the link 1 are sent completely, the second MLD cannot send bufferable data to the first MLD over the first link, and cannot indicate, by using a More Data subfield in the bufferable data, that neither the bufferable data corresponding to the data type a nor the bufferable data corresponding to the data type b is buffered in the second MLD, either. In other words, that no bufferable data is subsequently transmitted to the first MLD through the link 1 cannot be indicated by using the More Data subfield in the bufferable data.

In this case, the foregoing problem can be resolved by sending the fourth indication information by the second MLD to the first MLD. The fourth indication information may indicate that bufferable data corresponding to any data type mapped to the link 1 is not buffered in the second MLD. To be specific, the fourth indication information may indicate that neither the bufferable data corresponding to the data type a nor the bufferable data corresponding to the data type b is buffered in the second MLD.

In an implementation, the fourth indication information may be a QoS Null frame, the QoS Null frame is a data frame that does not carry a payload (payload), and a value of a More Data subfield in the QoS Null frame is 0. The second MLD may send the QoS Null frame to the first MLD over the first link.

In an implementation, after receiving the fourth indication information from the second MLD, the first MLD may determine the operating status of the station corresponding to the first link as the doze state based on the fourth indication information. This helps reduce power consumption. In another implementation, the first MLD may determine the operating status of the station corresponding to the first link based on the fourth indication information and at least one of current battery level information or service requirement information. For example, after the first MLD receives the fourth indication information from the second MLD, if a current remaining battery level of the first MLD is relatively low and/or the first MLD is not in a charging mode, the operating status of the station corresponding to the first link may be determined as the doze state. If the current remaining battery level of the first MLD is relatively high or the first MLD is in the charging mode, the operating status of the station corresponding to the first link may be determined as the active state.

In an implementation, when the second MLD sends bufferable data (for example, bufferable data 1) to the first MLD over the first link, if bufferable data corresponding to at least one second data type is further buffered in the second MLD in addition to the bufferable data 1, the second MLD may set a value of a More Data subfield in the bufferable data 1 to 0. After receiving the bufferable data 1, the first MLD may set a station corresponding to the link 1 for transmitting the bufferable data 1 to the doze state. Correspondingly, the link 1 is also in the doze state. After receiving link status indication information that is used to indicate that the link 1 is in the active state and that is sent by the first MLD, the second MLD may send data through the link 1. Before receiving the link status indication information that is used to indicate that the link 1 is in the active state and that is sent by the first MLD, the second MLD may not send data through the link 1. In this way, when it is not determined that the link 1 is in the active state, the second MLD can be prevented from scheduling, to the link 1 for transmission, bufferable data originally to be transmitted through another link. This helps avoid unnecessary overheads. The link status indication information used to indicate that the link 1 is in the active state may be a power saving poll (PS-Poll) frame. The PS-Poll frame may be used to indicate that a link is in the active state.

It should be noted that, when determining that the first link is in the active state, the second MLD sends bufferable data to the first MLD over the first link (that is, step S402). The first MLD may send a PS-Poll frame to the second MLD, to indicate to the second MLD that the first link is in the active state. When determining that bufferable data that needs to be transmitted over the first link is buffered in the second MLD, the first MLD may determine an operating status of the first link as the active state, and send, to the second MLD, the PS-Poll frame used to indicate that the first link is in the active state. In an implementation, the second MLD may send a conventional-technology beacon frame to the first MLD, where a TIM field in the beacon frame is used to indicate a buffer status of bufferable data of each station in the first MLD in the second MLD. The first MLD may determine, based on the TIM field and a correspondence between a link and a station of the first MLD, whether bufferable data that needs to be transmitted over the first link is buffered in the second MLD.

In another implementation, the second MLD may send the first indication information in the embodiment shown in FIG. 3a to the first MLD. The first MLD may determine, based on the first indication information and a correspondence between an association identifier of the first MLD and a data type supported by the first MLD, a buffer status of bufferable data that corresponds to the at least one data type and that is in the second MLD. Further, the first MLD determines, based on the buffer status of the bufferable data that corresponds to the at least one data type and that is in the second MLD and a mapping relationship between a data type supported by the first MLD and a link, whether bufferable data that needs to be transmitted over the first link is buffered in the second MLD. For a performing process, refer to the embodiment shown in FIG. 5A and FIG. 5B.

According to this embodiment of this application, whether the bufferable data corresponding to the at least one second data type is buffered in the second MLD may be determined based on the third indication information. Further, based on whether the bufferable data corresponding to the at least one second data type is buffered in the second MLD, a more appropriate operating status is determined for the station, and the bufferable data in the second MLD is successfully sent to the first MLD.

Figure 5A:
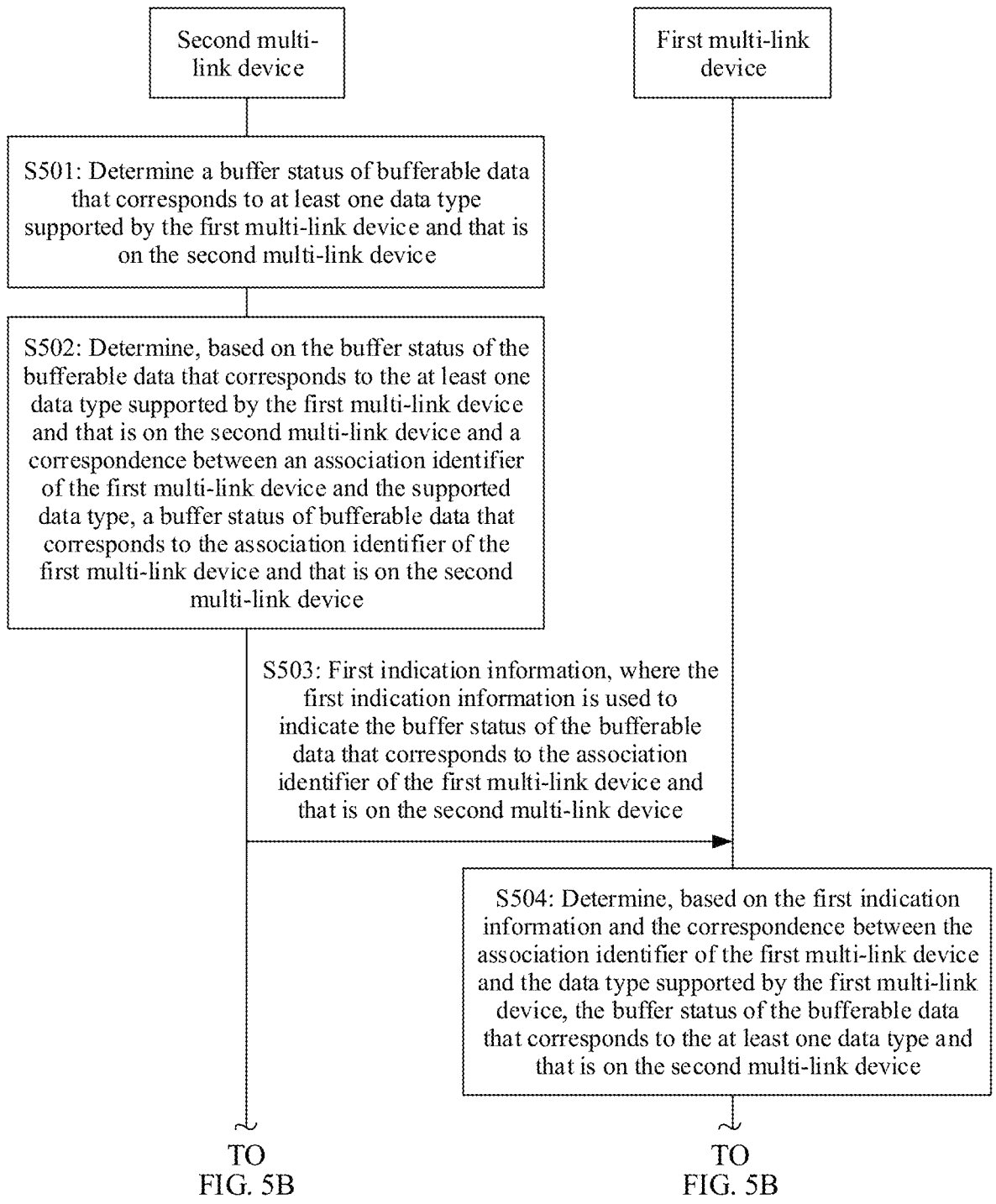
FIG. 5A and FIG. 5B are a schematic flowchart of still another method for determining a data buffer status according to an embodiment of this application.
Figure 5B:
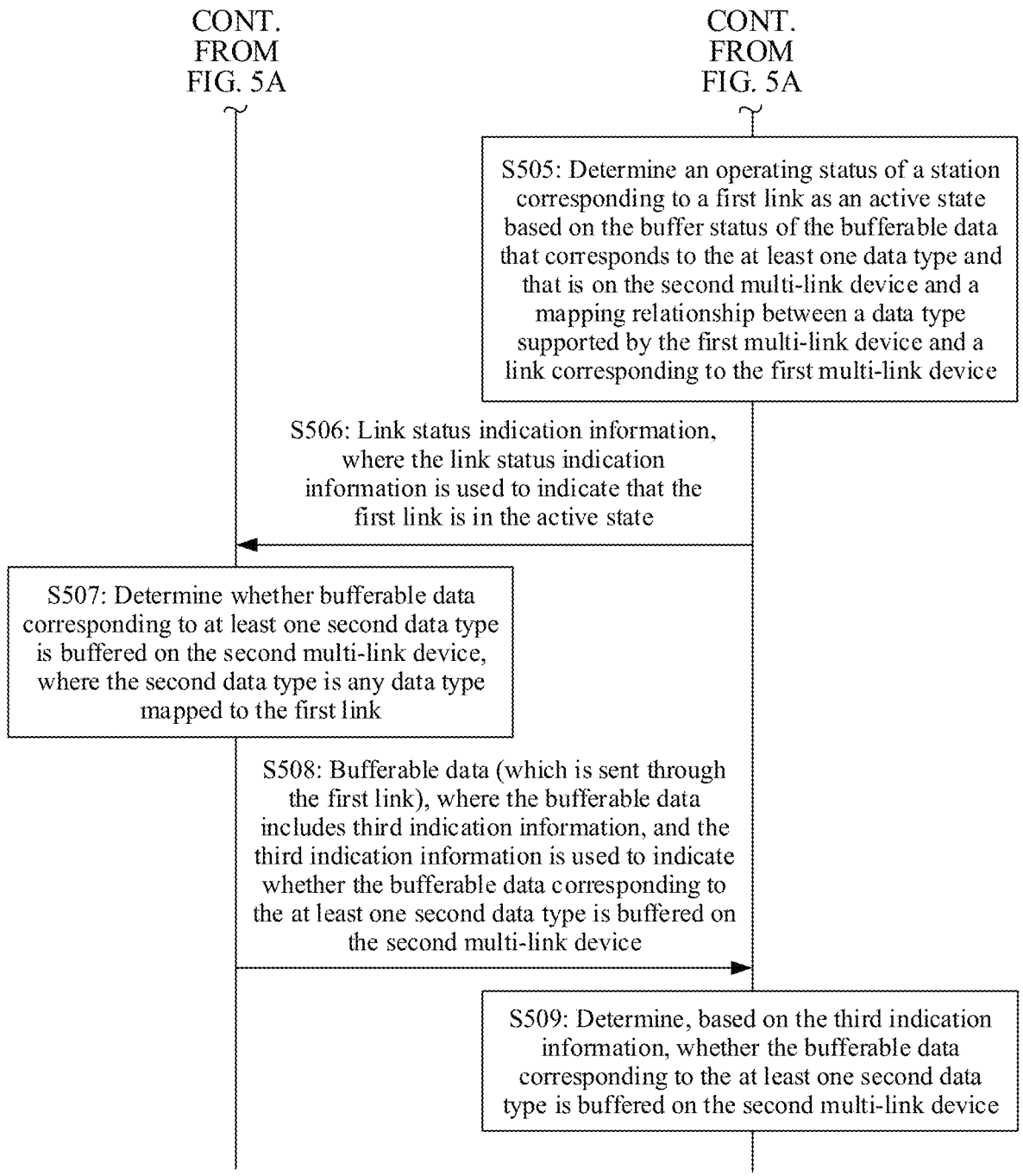

FIG. 5A and FIG. 5B are a schematic flowchart of still another method for determining a data buffer status according to an embodiment of this application. Step S501 to step S503, step S507, and step S508 are performed by a second MLD or a chip in the second MLD, and step S504 to step S506 and step S509 are performed by a first MLD or a chip in the first MLD. An example in which the second MLD and the first MLD perform the method for determining a data buffer status is used for description in the following. The method may include but is not limited to the following steps.

Step S501: The second MLD determines a buffer status of bufferable data that corresponds to at least one data type supported by the first MLD and that is in the second MLD.

Step S502: The second MLD determines, based on the buffer status of the bufferable data that corresponds to the at least one data type supported by the first MLD and that is in the second MLD and a correspondence between an association identifier of the first MLD and the supported data type, a buffer status of bufferable data that corresponds to the association identifier of the first MLD and that is in the second MLD.

Step S503: The second MLD sends first indication information to the first MLD, where the first indication information is used to indicate the buffer status of the bufferable data that corresponds to the association identifier of the first MLD and that is in the second MLD.

Step S504: The first MLD determines, based on the first indication information and the correspondence between the association identifier of the first MLD and the data type supported by the first MLD, the buffer status of the bufferable data that corresponds to the at least one data type and that is in the second MLD.

It should be noted that, for a process of performing step S501 to step S504, refer to the specific description of step S301 to step S304 respectively in FIG. 3a. Details are not described herein again.

Step S505: The first MLD determines an operating status of a station corresponding to a first link as an active state based on the buffer status of the bufferable data that corresponds to the at least one data type and that is in the second MLD and a mapping relationship between a data type supported by the first MLD and a link corresponding to the first MLD.

Specifically, the first MLD may determine, based on the buffer status of the bufferable data that corresponds to the at least one data type and that is in the second MLD and the mapping relationship between a data type supported by the first MLD and a link corresponding to the first MLD, a link to which the data type corresponding to the bufferable data is mapped. If the link to which the data type corresponding to the bufferable data is mapped includes the first link, the first MLD may determine the operating status of the station corresponding to the first link as the active state.

Step S506: The first MLD sends link status indication information to the second MLD, where the link status indication information is used to indicate that the first link is in the active state.

After determining the operating status of the station corresponding to the first link as the active state, the first MLD may determine an operating status of the first link as the active state. When the operating status of the first link is the active state, the first MLD sends the link status indication information to the second MLD. The link status indication information may be a PS-Poll frame. In an implementation, the link status indication information may be sent to the second MLD over the first link.

Step S507: The second MLD determines whether bufferable data corresponding to at least one second data type is buffered in the second MLD, where the second data type is any data type mapped to the first link.

After receiving the link status indication information, the second MLD may determine, based on the link status indication information, that the first link is in the active state. When determining that the first link is in the active state, the second MLD may send bufferable data that carries third indication information to the first MLD over the first link.

Step S508: The second MLD sends the bufferable data to the first MLD over the first link, where the bufferable data includes the third indication information, and the third indication information is used to indicate whether the bufferable data corresponding to the at least one second data type is buffered in the second MLD.

Step S509: The first MLD determines, based on the third indication information, whether the bufferable data corresponding to the at least one second data type is buffered in the second MLD.

It should be noted that, for a process of performing step S507 to step S509, refer to the specific description of step S401 to step S403 respectively in FIG. 4a. Details are not described herein again.

In this embodiment of this application, the first MLD may determine the operating status of the station corresponding to the first link as the active state based on the buffer status of the bufferable data that corresponds to the at least one data type and that is in the second MLD and the mapping relationship between a data type supported by the first MLD and a link corresponding to the first MLD. The second MLD may determine, based on the link status indication information from the first MLD, that the first link is in the active state. When determining that the first link is in the active state, the second MLD sends the bufferable data that carries the third indication information to the first MLD over the first link.

Figure 6A:
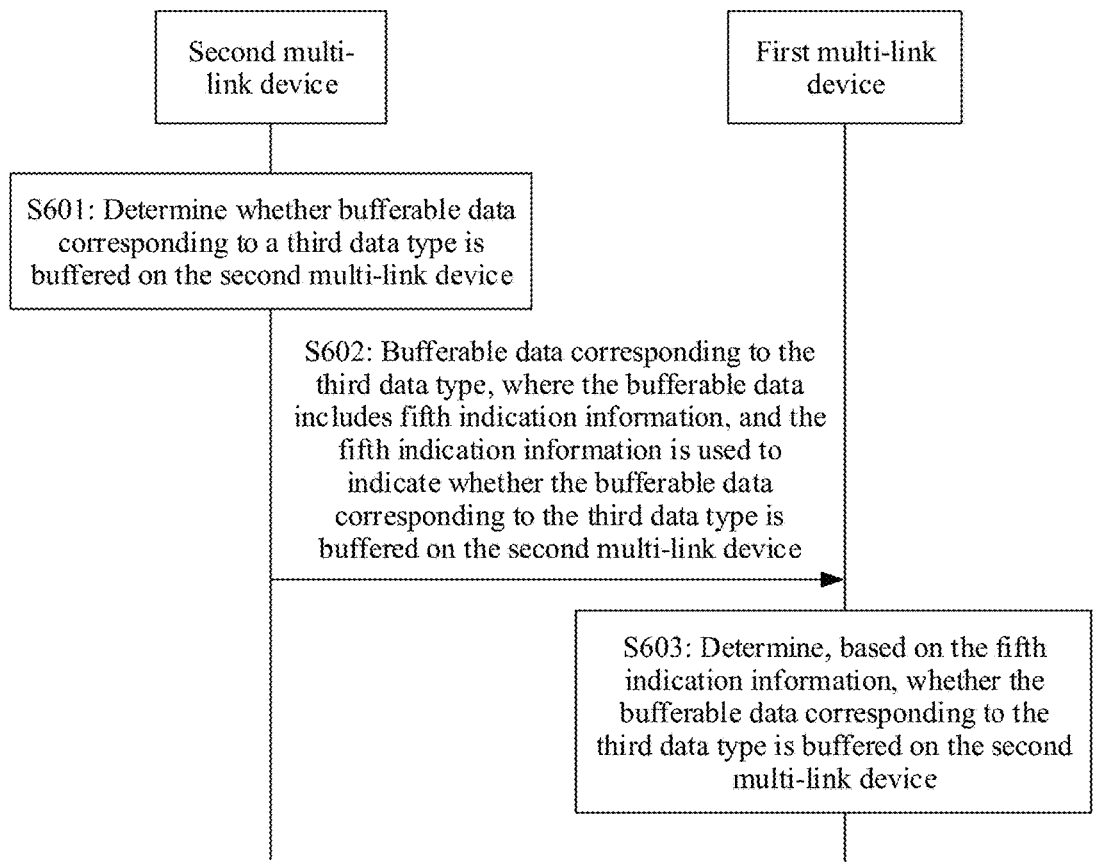
FIG. 6a is a schematic flowchart of still another method for determining a data buffer status according to an embodiment of this application.

FIG. 6a is a schematic flowchart of still another method for determining a data buffer status according to an embodiment of this application. The method describes in detail how a first MLD determines, based on fifth indication information, whether bufferable data corresponding to a third data type is buffered in a second MLD. Step S601 and step S602 are performed by the second MLD or a chip in the second MLD, and step S603 is performed by the first MLD or a chip in the first MLD. An example in which the second MLD and the first MLD perform the method for determining a data buffer status is used for description in the following. The method may include but is not limited to the following steps.

Step S601: The second multi-link device MLD determines whether bufferable data corresponding to a third data type is buffered in the second MLD.

In this embodiment of this application, one data type may be mapped to one or more links, and bufferable data that corresponds to a data type and that is buffered in the second MLD may be transmitted to the first MLD through any link to which the data type is mapped. For example, when the first MLD supports a data type a, links between the first MLD and the second MLD include a link 1, a link 2, and a link 3, and the data type a is mapped to the link 1, the link 2, and the link 3, bufferable data corresponding to the data type a may be transmitted to the first MLD through one or more links of the link 1, the link 2, and the link 3.

That the second MLD determines whether the bufferable data corresponding to the third data type is buffered in the second MLD is equivalent to determining whether the bufferable data that corresponds to the third data type and that is buffered in the second MLD is sent completely. If the bufferable data corresponding to the third data type is buffered in the second MLD, it indicates that the bufferable data corresponding to the third data type is not sent completely. If the bufferable data corresponding to the third data type is not buffered in the second MLD, it indicates that the bufferable data corresponding to the third data type is sent completely.

Step S602: The second MLD sends, to the first MLD, the bufferable data corresponding to the third data type, where the bufferable data includes fifth indication information, and the fifth indication information is used to indicate whether the bufferable data corresponding to the third data type is buffered in the second MLD.

In this embodiment of this application, the fifth indication information may be carried in the bufferable data corresponding to the third data type, to indicate whether the bufferable data corresponding to the third data type is buffered in the second MLD (that is, indicate whether the bufferable data corresponding to the third data type is sent completely). It should be noted that, that the second MLD determines whether the bufferable data corresponding to the third data type is buffered in the second MLD means: in addition to the bufferable data to which the fifth indication information belongs, whether the bufferable data corresponding to the third data type is buffered in the second MLD. It should be further noted that each piece of bufferable data sent by the second MLD to the first MLD carries fifth indication information, and the fifth indication information carried in each piece of bufferable data is used to indicate whether bufferable data corresponding to a data type to which the bufferable data belongs is buffered in the second MLD.

In an implementation, the fifth indication information may be a More Data subfield in the bufferable data. Specifically, when the second MLD sends the bufferable data (for example, bufferable data 1) corresponding to the third data type to the first MLD, if the bufferable data corresponding to the third data type is buffered in the second MLD, a value of a More Data subfield in the bufferable data 1 may be 1. If the bufferable data corresponding to the third data type is not buffered in the second MLD, the value of the More Data subfield in the bufferable data 1 may be 0. It should be noted that, that the fifth indication information is the More Data subfield in the bufferable data is merely used as an example, but does not constitute a limitation on this embodiment of this application. In another feasible implementation, the fifth indication information may be another field in a MAC frame structure of the bufferable data.

Step S603: The first MLD determines, based on the fifth indication information, whether the bufferable data corresponding to the third data type is buffered in the second MLD.

Specifically, after receiving, from the second MLD, the bufferable data corresponding to the third data type, the first MLD may determine, based on the fifth indication information in the bufferable data, whether the bufferable data corresponding to the third data type is buffered in the second MLD. When the fifth indication information is the More Data subfield in the bufferable data, if the value of the More Data subfield in the bufferable data is 1, the first MLD may determine that the bufferable data corresponding to the third data type is buffered in the second MLD. If the value of the More Data subfield in the bufferable data is 0, the first MLD may determine that the bufferable data corresponding to the third data type is not buffered in the second MLD.

In an implementation, the first MLD may have a plurality of stations. After determining whether the bufferable data corresponding to the third data type is buffered in the second MLD, the first MLD may determine an operating status of a station corresponding to a second link in the plurality of stations in the first MLD based on whether the bufferable data corresponding to the third data type is buffered in the second MLD. The third data type is mapped to the second link. For example, if the bufferable data corresponding to the third data type is buffered in the second MLD, that is, the bufferable data corresponding to the third data type is not sent completely, the first MLD may determine the operating status of the station corresponding to the second link as an active state, so that bufferable data that corresponds to the third data type and that is not sent completely can be transmitted to the first MLD over the second link. There may be one or more second links.

In another implementation, the first MLD may determine an operating status of a station corresponding to a second link in the plurality of stations in the first MLD based on at least one of current battery level information or service requirement information of the first MLD and based on whether the bufferable data corresponding to the third data type is buffered in the second MLD. For a performing process, refer to the specific description of step S203 in FIG. 2. Details are not described herein again.

In still another implementation, after determining whether the bufferable data corresponding to the third data type is buffered in the second MLD, the first MLD may determine whether a data type other than the third data type is mapped to the second link; and determine an operating status of a station corresponding to a second link in the plurality of stations in the first MLD based on whether the bufferable data corresponding to the third data type is buffered in the second MLD and whether the data type other than the third data type is mapped to the second link. Specifically, if the bufferable data corresponding to the third data type is not buffered in the second MLD, but the data type other than the third data type is mapped to the second link, that is, bufferable data corresponding to the data type other than the third data type mapped to the second link may be transmitted over the second link, the first MLD may determine the operating status of the station corresponding to the second link as the active state. If the bufferable data corresponding to the third data type is not buffered in the second MLD, and no data type other than the third data type is mapped to the second link, that is, no bufferable data is subsequently transmitted over the second link, the first MLD may determine the operating status of the station corresponding to the second link as a doze state. In this way, a more appropriate operating status is determined for the station in the first MLD, and power consumption is reduced.

Figure 6B:
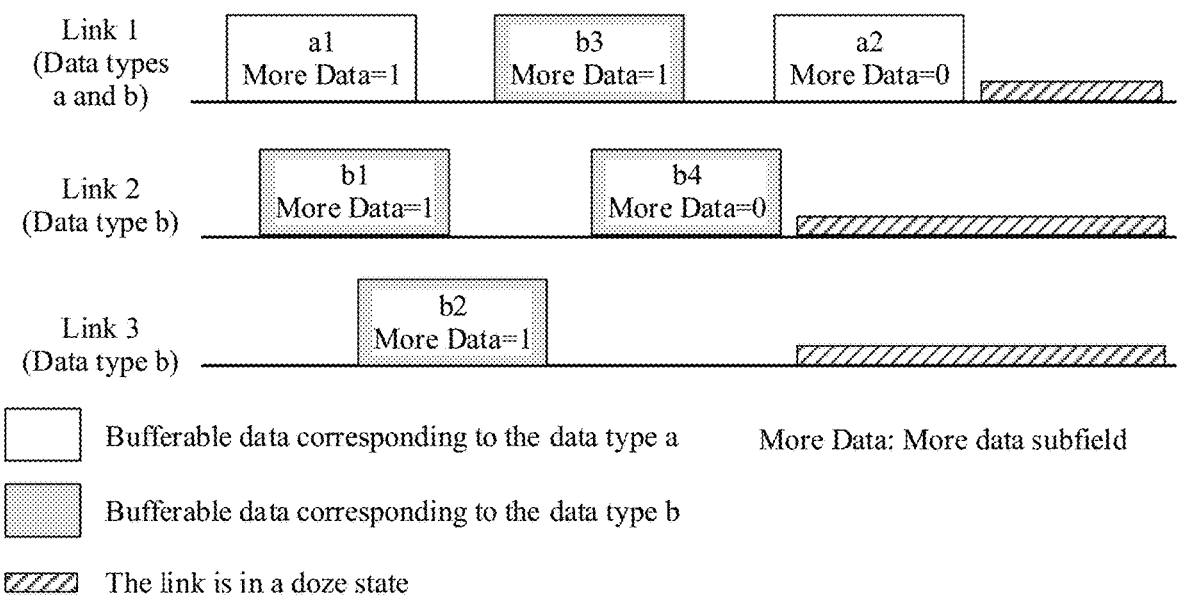
FIG. 6b is a schematic diagram of a scenario in which an operating status of a link is determined according to an embodiment of this application.

A schematic diagram of a scenario for determining an operating status of a link shown in FIG. 6b is used as an example. The first MLD supports a data type a and a data type b, links between the first MLD and the second MLD include a link 1, a link 2, and a link 3, a data type a and a data type b are mapped to the link 1, the data type b is mapped to the link 2, and the data type b is mapped to the link 3. In FIG. 6b, a white filled square indicates bufferable data corresponding to the data type a, a gray filled square indicates bufferable data corresponding to the data type b, and a number in the square is used to uniquely identify one piece of bufferable data. In FIG. 6b, the last piece of bufferable data to be transmitted on the link 1 is bufferable data a2, the last piece of bufferable data to be transmitted on the link 2 is bufferable data b4, and the last piece of bufferable data to be transmitted on the link 3 is bufferable data b2.

It can be learned from FIG. 6b that the last piece of bufferable data (a2) that corresponds to the data type a and that is buffered in the second MLD is sent through the link 1, and the last piece of bufferable data (b4) that corresponds to the data type b and that is buffered in the second MLD is sent through the link 2. Therefore, when a value of a More Data subfield in the bufferable data a2 is 0, it indicates that before the second MLD sends the bufferable data a2, the bufferable data corresponding to the data type a is buffered in the second MLD, and after the second MLD sends the bufferable data a2, the bufferable data corresponding to the data type a is not buffered in the second MLD. When a value of a More Data subfield in the bufferable data b4 is 0, it indicates that before the second MLD sends the bufferable data b4, the bufferable data corresponding to the data type b is buffered in the second MLD, and after the second MLD sends the bufferable data b4, the bufferable data corresponding to the data type b is not buffered in the second MLD.

Only the data type b is mapped to the link 2 and the link 3, that is, the link 2 and the link 3 are used to transmit only the bufferable data corresponding to the data type b. Therefore, after receiving b4, the first MLD may determine both operating statuses of a station corresponding to the link 2 and a station corresponding to the link 3 as the doze state (that is, determine operating statuses of the link 2 and the link 3 as the doze state). This helps reduce power consumption. Further, after the first MLD receives a2, because both the last piece of bufferable data (that is, a2) corresponding to the data type a mapped to the link 1 and the last piece of bufferable data (that is, b4) corresponding to the data type b mapped to the link 1 are sent to the first MLD, the first MLD may determine an operating status of a station corresponding to the link 1 as the doze state (that is, determine an operating status of the link 1 as the doze state).

If a More Data subfield in bufferable data is used to indicate whether bufferable data to be sent to the first MLD is buffered in the second MLD, in FIG. 6b, the link 1, the link 2, and the link 3 can be switched to the doze state only after the first MLD receives the last piece of bufferable data (that is, a2) sent by the second MLD. In other words, when the bufferable data to be sent to the first MLD is still buffered in the second MLD, any one of the link 1, the link 2, and the link 3 cannot be switched to the doze state. Therefore, in comparison with that the More Data subfield in the bufferable data is used to indicate whether the bufferable data to be sent to the first MLD is buffered in the second MLD, according to this embodiment of this application, when the bufferable data to be sent to the first MLD is still buffered in the second MLD, a part of the links between the first MLD and the second MLD are enabled to be in the doze state. Correspondingly, a station corresponding to the link in the doze state in the first MLD is also in the doze state. In this way, power consumption is reduced.

The first MLD may learn, based on the fifth indication information in the bufferable data 1, whether the bufferable data corresponding to the third data type is buffered in the second MLD. However, the first MLD cannot learn a buffer status of bufferable data corresponding to another data type in the second MLD. In an implementation, the bufferable data corresponding to the third data type that is received by the first MLD from the second MLD may further include sixth indication information, where the sixth indication information may be used to indicate whether bufferable data corresponding to at least one fourth data type is buffered in the second MLD, and the fourth data type is any data type other than the third data type in data types supported by the first MLD. When the fifth indication information indicates that the bufferable data corresponding to the third data type is not buffered in the second MLD, that is, when the bufferable data corresponding to the third data type is sent completely, the sixth indication information may indicate whether bufferable data to be sent to the first MLD is buffered in the second MLD.

In an implementation, when the fifth indication information in the bufferable data corresponding to the third data type indicates that the bufferable data corresponding to the third data type is not buffered in the second MLD, the bufferable data corresponding to the third data type may further include sixth indication information. When the fifth indication information in the bufferable data corresponding to the third data type indicates that the bufferable data corresponding to the third data type is buffered in the second MLD, the bufferable data corresponding to the third data type may not include sixth indication information.

In an implementation, the sixth indication information may be a "more fragment (More Fragment)" subfield in the bufferable data. Specifically, when the second MLD sends, to the first MLD, the bufferable data (for example, the bufferable data 1) corresponding to the third data type, and the value of the More Data subfield in the bufferable data 1 is 0 (that is, the bufferable data corresponding to the third data type is sent completely), if the bufferable data corresponding to the at least one fourth data type is buffered in the second MLD, a value of a More Fragment subfield in the bufferable data 1 may be 1. If bufferable data corresponding to any fourth data type is not buffered in the second MLD, the value of the More Fragment subfield in the bufferable data 1 may be 0. It should be noted that, that the sixth indication information is the More Fragment subfield in the bufferable data is merely used as an example, but does not constitute a limitation on this embodiment of this application. In another feasible implementation, the sixth indication information may be another field in a MAC frame structure of the bufferable data. When the first MLD receives the bufferable data 1, and the values of the More Data subfield and the More Fragment subfield in the bufferable data 1 are both 0, it may indicate that bufferable data to be sent to the first MLD is not buffered in the second MLD. In this case, the first MLD may switch all links between the first MLD and the second MLD to the doze state, to reduce power consumption. For example, when data types supported by the first MLD include a management frame and AC_VO, if a value of a More Data subfield in bufferable data that corresponds to AC_VO and that is received by the first MLD is 0, and a value of a More Fragment subfield in the bufferable data that corresponds to AC_VO and that is received by the first MLD is 0, it indicates that both the bufferable data corresponding to AC_VO and bufferable data corresponding to the management frame are sent completely.

In an implementation, a priority of the fourth data type may be higher than a priority of the third data type. In this case, the sixth indication information is used to indicate whether bufferable data corresponding to a data type having a higher priority than the priority of the third data type is buffered in the second MLD. When a priority of only one data type (for example, a data type 1) in the data types supported by the first MLD is higher than the priority of the third data type, the sixth indication information may indirectly indicate whether bufferable data corresponding to the data type 1 is buffered in the second MLD. When priorities of at least two data types in the data types supported by the first MLD are higher than the priority of the third data type, if the sixth indication information indicates that bufferable data corresponding to a data type having a higher priority than the third data type is not buffered in the second MLD, it may indicate that bufferable data corresponding to the at least two data types is not buffered in the second MLD. It can be learned that the second MLD may indicate a more detailed buffer status to the first MLD by using the sixth indication information, so that a more appropriate operating status is determined for the station in the first MLD, and power consumption is reduced.

In an implementation, the second MLD may determine that bufferable data corresponding to a fifth data type is not buffered in the second MLD, where the fifth data type is any one of data types supported by the first MLD; and send seventh indication information to the first MLD, where the seventh indication information is used to indicate that the bufferable data corresponding to the fifth data type is not buffered in the second MLD. After receiving the seventh indication information, the first MLD may determine, based on the seventh indication information, that the bufferable data corresponding to the fifth data type is not buffered in the second MLD.

When bufferable data corresponding to one or more data types (for example, a data type c) supported by the first MLD is not buffered in the second MLD, the second MLD cannot send the bufferable data corresponding to the data type c to the second MLD, and cannot indicate, by using a More Data subfield in the bufferable data corresponding to the data type c, that the bufferable data corresponding to the data type c is not buffered in the second MLD, either. In other words, the first MLD cannot learn that the bufferable data corresponding to the data type c is not buffered in the second MLD. Consequently, the first MLD cannot determine whether a station corresponding to a link to which the data type c is mapped can be switched to the doze state. In this case, if the seventh indication information received by the first MLD may indicate that the bufferable data corresponding to the data type c is not buffered in the second MLD, the foregoing problem can be resolved.

Figure 6C:
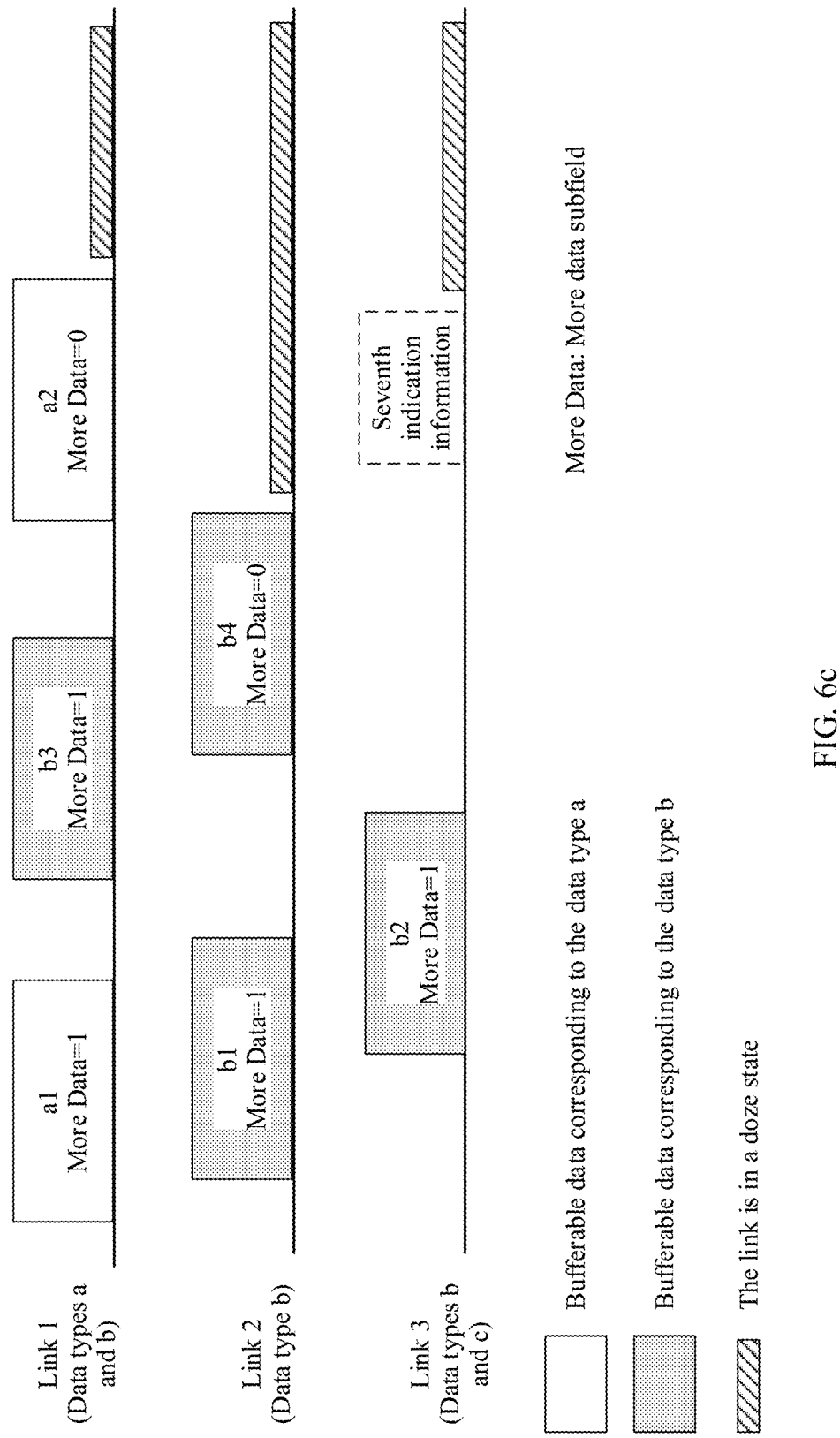
FIG. 6c is a schematic diagram of another scenario in which an operating status of a link is determined according to an embodiment of this application.

A schematic diagram of a scenario for determining an operating status of a link shown in FIG. 6c is used as an example. In comparison with FIG. 6b, the data type c supported by the first MLD is added in FIG. 6c, and the data type c is mapped to the link 3. It can be learned from FIG. 6c that the last piece of bufferable data that corresponds to the data type b and that is buffered in the second MLD is b4. Only the data type b is mapped to the link 2, and the data type c is mapped to the link 3 in addition to the data type b. Therefore, after receiving b4, the first MLD may determine the operating status of the station corresponding to the link 2 as the doze state, but cannot determine whether the operating status of the station corresponding to the link 3 can be determined as the doze state. In an implementation, after the first MLD receives b4, if the first MLD receives the seventh indication information used to indicate that the bufferable data corresponding to the data type c is not buffered in the second MLD, the first MLD can determine the operating status of the station corresponding to the link 3 as the doze state after the first MLD receives the seventh indication information. It should be noted that in FIG. 6c, that the second MLD sends the seventh indication information after b4 is merely used as an example, but does not constitute a limitation on this application. Alternatively, the second MLD may send the seventh indication information before b4, or send b4 and the seventh indication information at the same time.

In an implementation, the seventh indication information may be a QoS Null frame, the QoS Null frame is a data frame that does not carry a payload (payload), and a value of a More Data subfield in the QoS Null frame is 0. In this embodiment of this application, the fifth data type indicated by the QoS Null frame may be determined based on a data type indication field in the QoS Null frame. For example, if a TID indicated by the data type indication field in the QoS Null frame is included in a TID 8 to a TID 15, it may be determined that the fifth data type indicated by the QoS Null frame is a management frame. If the TID indicated by the data type indication field in the QoS Null frame is a TID 1, it may be determined that the fifth data type indicated by the QoS Null frame is the TID 1. It should be noted that in FIG. 6c, that the second MLD sends the QoS Null frame to the first MLD through the link 3 is merely used as an example, but does not constitute a limitation on this application. The second MLD may send the QoS Null frame to the first MLD through any link between the first MLD and the second MLD.

In an implementation, the second MLD determines that bufferable data corresponding to any data type mapped to a fourth link is not buffered in the second MLD, and sends eighth indication information to the first MLD through the fourth link, where the eighth indication information is used to indicate that the bufferable data corresponding to the any data type mapped to the fourth link is not buffered in the second MLD. After receiving the eighth indication information, the first MLD may determine, based on the eighth indication information, that the bufferable data corresponding to the any data type mapped to the fourth link is not buffered in the second MLD. For a performing process, refer to a specific description in the embodiment shown in FIG. 8. Details are not described herein.

Figure 6D:
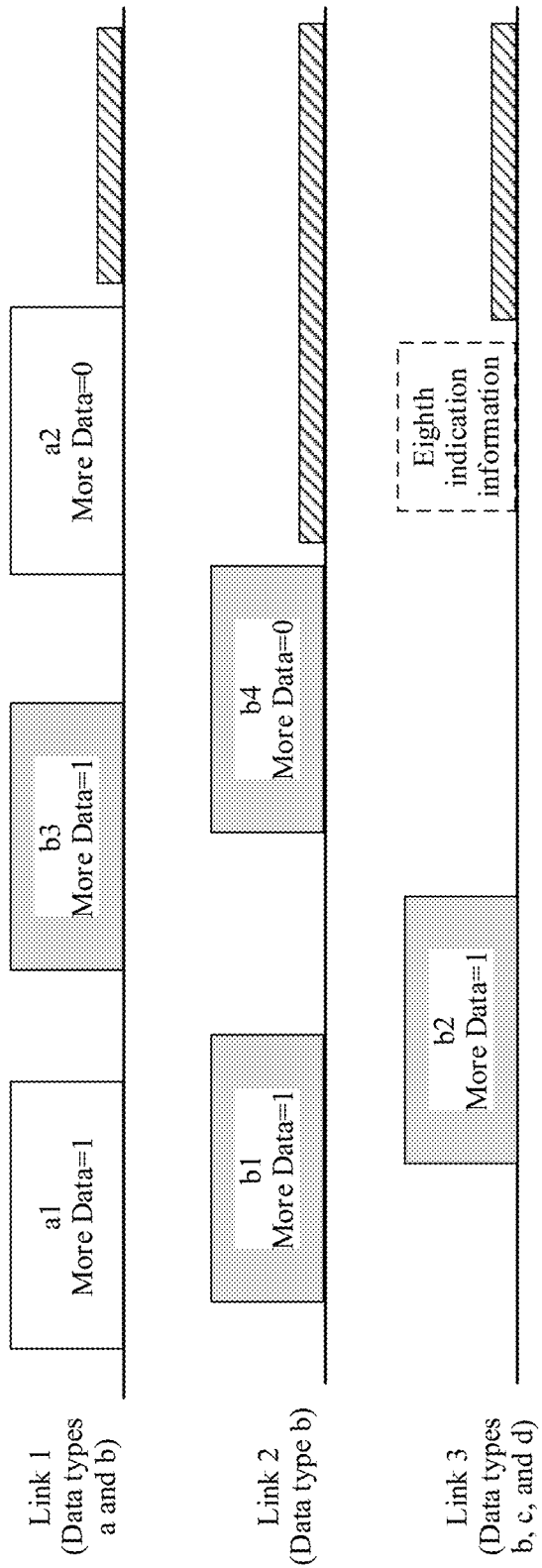
FIG. 6d is a schematic diagram of still another scenario in which an operating status of a link is determined according to an embodiment of this application.

A schematic diagram of a scenario for determining an operating status of a link shown in FIG. 6d is used as an example. In comparison with FIG. 6b, data types c and d supported by the first MLD are added in FIG. 6d, and both the data types c and d are mapped to the link 3. It can be learned from FIG. 6d that the last piece of bufferable data that corresponds to the data type b and that is buffered in the second MLD is b4. Only the data type b is mapped to the link 2, and the data types c and d are mapped to the link 3 in addition to the data type b. Therefore, after receiving b4, the first MLD may determine the operating status of the station corresponding to the link 2 as the doze state, but cannot determine whether the operating status of the station corresponding to the link 3 can be determined as the doze state. In an implementation, after the first MLD receives b4, if the first MLD receives, through the link 3, the eighth indication information used to indicate that bufferable data corresponding to any data type mapped to the link 3 (that is, the fourth link) is not buffered in the second MLD, the first MLD can determine the operating status of the station corresponding to the link 3 as the doze state after the first MLD receives the eighth indication information.

It should be noted that the second MLD may send, to the first MLD through any link in links to which the third data type is mapped, the bufferable data corresponding to the third data type. When determining that at least one link in the links to which the third data type is mapped is in the active state, the second MLD needs to send, to the first MLD through the link (for example, the link 1) to which the third data type is mapped and that is in the active state, the bufferable data corresponding to the third data type (that is, step S602). The first MLD may send a PS-Poll frame to the second MLD, to indicate to the second MLD that the link 1 is in the active state. When determining that bufferable data corresponding to the third data type mapped to the link 1 is buffered in the second MLD, the first MLD may determine the operating status of the link 1 as the active state, and send, to the second MLD, the PS-Poll frame used to indicate that the link 1 is in the active state. In an implementation, the second MLD may send the first indication information in the embodiment shown in FIG. 3a to the first MLD. The first MLD may determine, based on the first indication information and a correspondence between an association identifier of the first MLD and a data type supported by the first MLD, that the bufferable data corresponding to the third data type mapped to the link 1 is buffered in the second MLD.

According to this embodiment of this application, it can be determined, based on the fifth indication information in the bufferable data corresponding to the third data type, whether the bufferable data corresponding to the third data type is buffered in the second MLD. Further, based on whether the bufferable data corresponding to the third data type is buffered in the second MLD, a more appropriate operating status is determined for the station in the first MLD, and power consumption is reduced.

Figure 7:
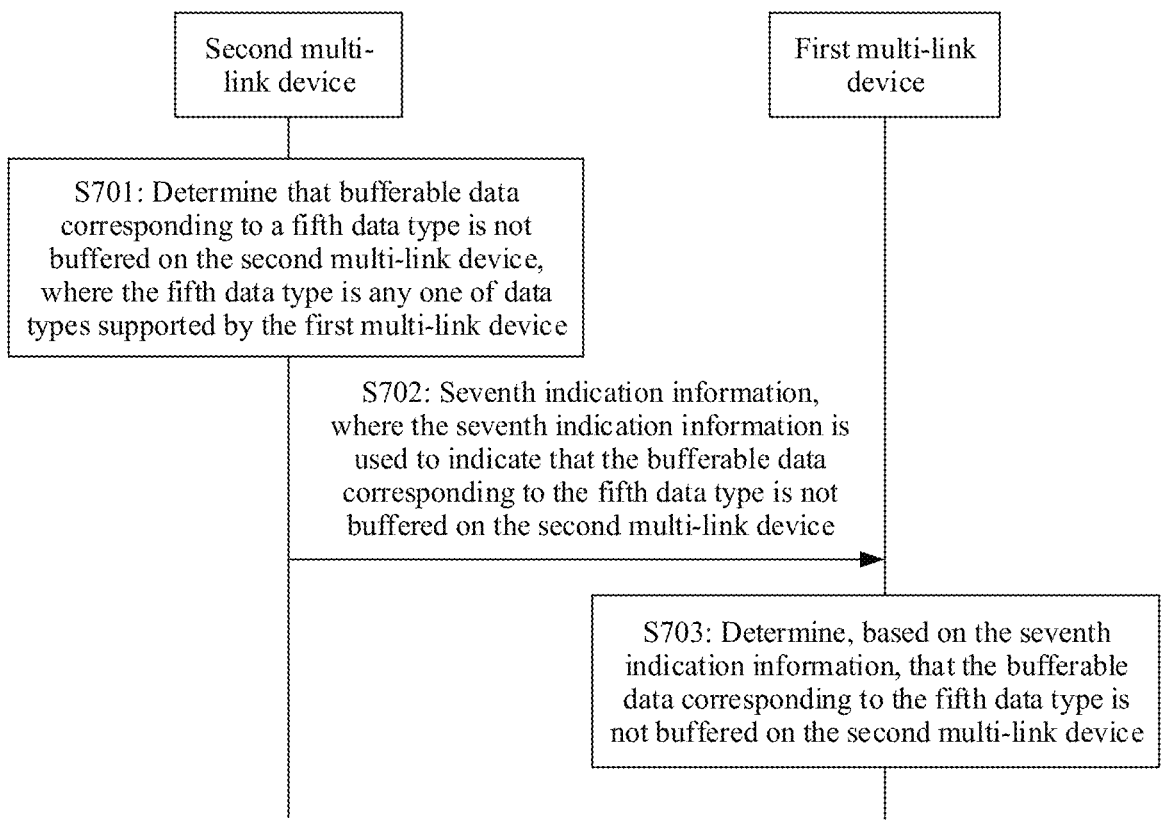
FIG. 7 is a schematic flowchart of still another method for determining a data buffer status according to an embodiment of this application.

FIG. 7 is a schematic flowchart of still another method for determining a data buffer status according to an embodiment of this application. Step S701 and step S702 are performed by a second MLD or a chip in the second MLD, and step S703 is performed by a first MLD or a chip in the first MLD. An example in which the second MLD and the first MLD perform the method for determining a data buffer status is used for description in the following. The method may include but is not limited to the following steps.

Step S701: The second MLD determines that bufferable data corresponding to a fifth data type is not buffered in the second MLD, where the fifth data type is any one of data types supported by the first MLD.

Step S702: The second MLD sends seventh indication information to the first MLD, where the seventh indication information is used to indicate that the bufferable data corresponding to the fifth data type is not buffered in the second MLD.

Step S703: The first MLD determines, based on the seventh indication information, that the bufferable data corresponding to the fifth data type is not buffered in the second MLD.

It should be noted that, for a process of performing step S701 to step S703, refer to the specific description of step S603 in FIG. 6a. Details are not described herein again.

In an implementation, the first MLD may have a plurality of stations. After determining that the bufferable data corresponding to the fifth data type is not buffered in the second MLD, the first MLD may determine an operating status of a station corresponding to a third link in the plurality of stations in the first MLD based on that the bufferable data corresponding to the fifth data type is not buffered in the second MLD, where the fifth data type is mapped to the third link. For example, the first MLD may determine the operating status of the station corresponding to the third link as a doze state based on that the bufferable data corresponding to the fifth data type is not buffered in the second MLD.

In an implementation, the first MLD may determine the operating status of the station corresponding to the third link in the plurality of stations in the first MLD based on one or more pieces of related information and based on that the bufferable data corresponding to the fifth data type is not buffered in the second MLD. The related information may include but is not limited to: current battery level information of the first MLD, service requirement information of the first MLD, whether a data type other than the fifth data type is mapped to the third link, a priority of the fifth data type, and a priority of the data type other than the fifth data type mapped to the third link (in a case in which there is the data type that is other than the fifth data type and that is mapped to the third link).

According to this embodiment of this application, it can be determined, based on the seventh indication information, that the bufferable data corresponding to the fifth data type is not buffered in the second MLD.

Figure 8:
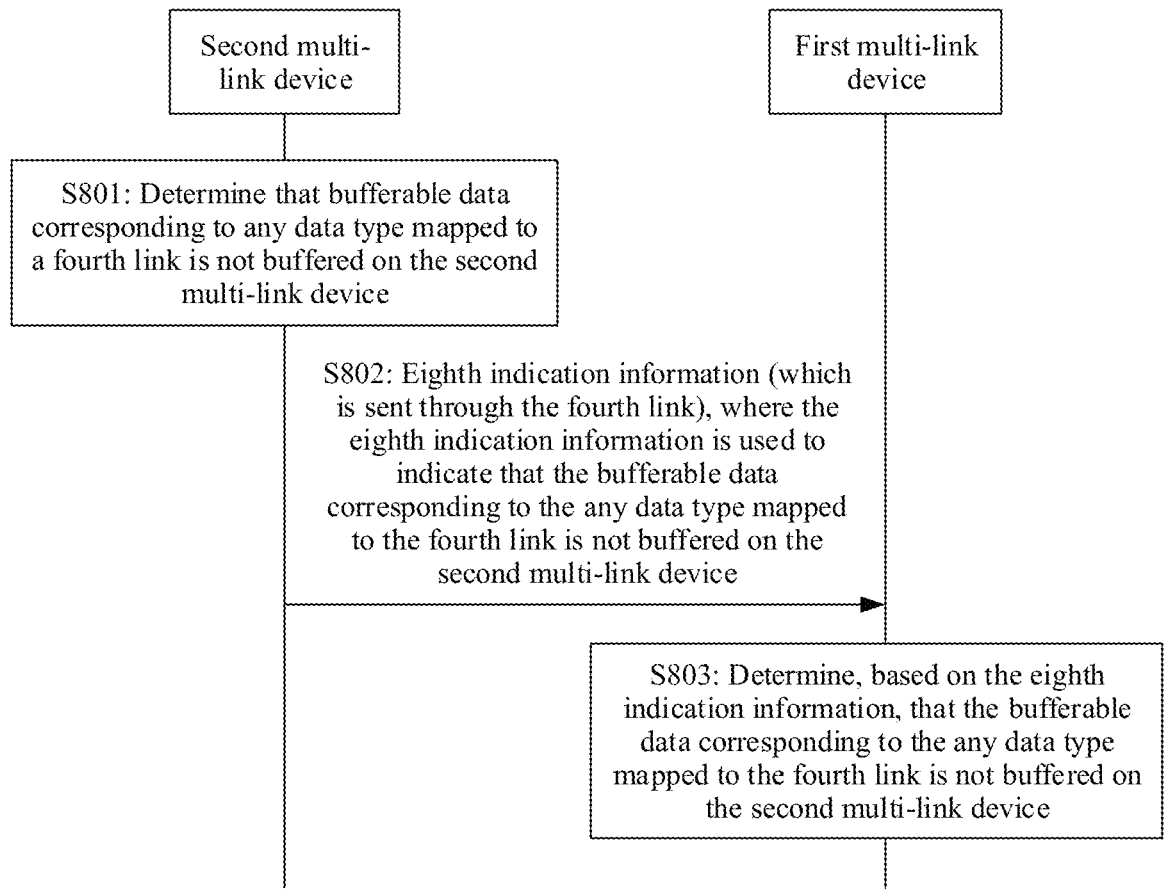
FIG. 8 is a schematic flowchart of still another method for determining a data buffer status according to an embodiment of this application.

FIG. 8 is a schematic flowchart of still another method for determining a data buffer status according to an embodiment of this application. Step S801 and step S802 are performed by a second MLD or a chip in the second MLD, and step S803 is performed by a first MLD or a chip in the first MLD. An example in which the second MLD and the first MLD perform the method for determining a data buffer status is used for description in the following. The method may include but is not limited to the following steps.

Step S801: The second MLD determines that bufferable data corresponding to any data type mapped to a fourth link is not buffered in the second MLD.

If the bufferable data corresponding to the any data type mapped to the fourth link is not buffered in the second MLD, it may indicate that the second MLD does not send data to the first MLD through the fourth link subsequently. For example, when the fourth link is a link 1, and a data type a and a data type b are mapped to the link 1, if neither bufferable data corresponding to the data type a nor bufferable data corresponding to the data type b is buffered in the second MLD, it may be determined that bufferable data corresponding to any data type mapped to the link 1 (that is, the fourth link) is not buffered in the second MLD.

Step S802: The second MLD sends eighth indication information to the first MLD through the fourth link, where the eighth indication information is used to indicate that the bufferable data corresponding to the any data type mapped to the fourth link is not buffered in the second MLD.

In this embodiment of this application, the eighth indication information may be a QoS Null frame, the QoS Null frame is a data frame that does not carry a payload (payload), and a value of a More Data subfield in the QoS Null frame is 0. When the QoS Null frame is transmitted to the first MLD through the link 1, it may indicate that the bufferable data corresponding to the any data type mapped to the link 1 (which is used to transmit the QoS Null frame) is not buffered in the second MLD.

Step S803: The first MLD determines, based on the eighth indication information, that the bufferable data corresponding to the any data type mapped to the fourth link is not buffered in the second MLD.

Specifically, after receiving the eighth indication information from the second MLD through the fourth link, the first MLD may determine, based on the eighth indication information, that the bufferable data corresponding to the any data type mapped to the fourth link is not buffered in the second MLD.

In an implementation, the first MLD may have a plurality of stations. After determining that the bufferable data corresponding to the any data type mapped to the fourth link is not buffered in the second MLD, the first MLD may determine an operating status of a station corresponding to the fourth link in the plurality of stations in the first MLD based on that the bufferable data corresponding to the any data type mapped to the fourth link is not buffered in the second MLD. For example, the first MLD may determine the operating status of the station corresponding to the fourth link as a doze state based on that the bufferable data corresponding to the any data type mapped to the fourth link is not buffered in the second MLD.

In an implementation, the first MLD may determine the operating status of the station corresponding to the fourth link based on one or more of current battery level information or service requirement information of the first MLD and based on that the bufferable data corresponding to the any data type mapped to the fourth link is not buffered in the second MLD.

According to this embodiment of this application, it can be determined, based on the eighth indication information, that the bufferable data corresponding to the any data type mapped to the fourth link is not buffered in the second MLD.

Figure 9A:
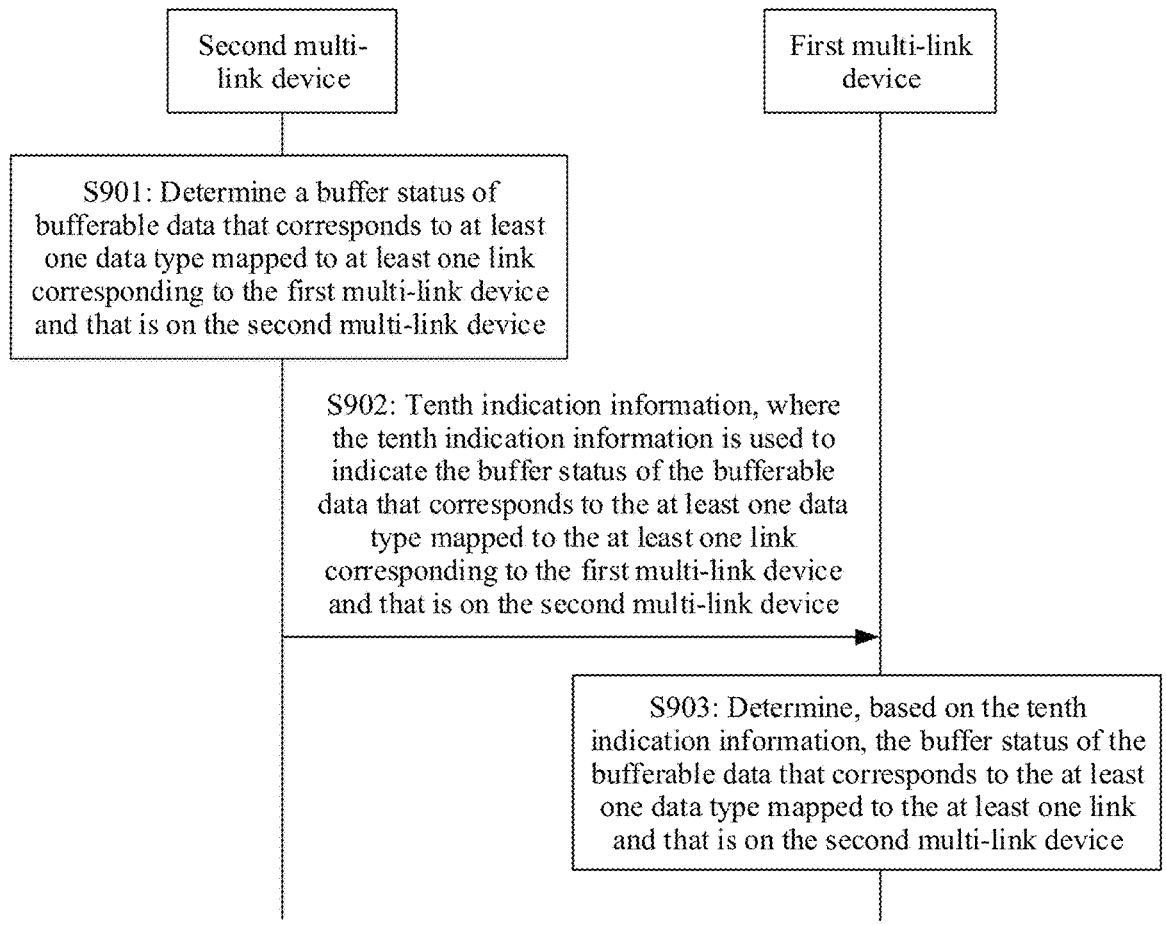
FIG. 9a is a schematic flowchart of still another method for determining a data buffer status according to an embodiment of this application.

FIG. 9a is a schematic flowchart of still another method for determining a data buffer status according to an embodiment of this application. The method describes in detail how a first MLD determines, based on tenth indication information, a buffer status of bufferable data that corresponds to at least one data type mapped to at least one link and that is in a second MLD. Step S901 and step S902 are performed by the second MLD or a chip in the second MLD, and step S903 is performed by the first MLD or a chip in the first MLD. An example in which the second MLD and the first MLD perform the method for determining a data buffer status is used for description in the following. The method may include but is not limited to the following steps.

Step S901: The second MLD determines a buffer status of bufferable data that corresponds to at least one data type mapped to at least one link corresponding to the first MLD and that is in the second MLD.

In this embodiment of this application, the second MLD may include a plurality of buffer areas, and each buffer area may be used to buffer bufferable data corresponding to one or more links (between the second MLD and the first MLD). If a buffer area r is used to buffer bufferable data corresponding to a link 1, it may indicate that the bufferable data in the buffer area r is to be transmitted to the first MLD through the link 1. If the buffer area r is used to buffer the bufferable data corresponding to the link 1 and bufferable data corresponding to a link 2, it may indicate that the bufferable data in the buffer area r may be transmitted to the first MLD through at least one link of the link 1 and the link 2. Therefore, the second MLD can determine, by detecting whether bufferable data exists in each buffer area in the second MLD, whether bufferable data of a link corresponding to each buffer area exists in the second MLD. One or more data types may be mapped to one link. Further, the second MLD may determine a buffer status, in each buffer area, of a data type mapped to a link corresponding to the buffer area.

For example, a data type is a TID. When one buffer area is used to buffer bufferable data corresponding to one link, and the first MLD supports eight TIDs, the second MLD may determine a buffer status of each TID in each buffer area.

Step S902: The second MLD sends tenth indication information to the first MLD, where the tenth indication information is used to indicate the buffer status of the bufferable data that corresponds to the at least one data type mapped to the at least one link corresponding to the first MLD and that is in the second MLD.

The tenth indication information may be a bit occupied by a control type b in an EHT A-control field in a MAC frame. For a description of the EHT A-control field, refer to the embodiment shown in FIG. 2. Details are not described herein again. The control type b is a newly added control type.

When data types include a management frame and a TID, the control type b may be referred to as "more data per TID per link". A quantity of bits occupied by "More Data Per TID Per link" may be 9*L. L is a quantity of links between the first MLD and the second MLD. In this case, the "More Data Per TID Per link" subfield may include L "per link (per link) structures", one "per link structure" may correspond to one link, each per link structure may include 9 bits, and one bit in the per link structure corresponds to one data type.

Specifically, one bit may correspond to a management frame, and each bit in the other eight bits corresponds to one TID on a link. When a value of a bit in a per link structure corresponding to the link 1 is 1, it may indicate that bufferable data of a data type (for example, a management frame or a TID) corresponding to the bit is buffered in the second MLD, and the bufferable data is to be sent to the first MLD through the link 1. When a value of a bit in a per link structure corresponding to the link 1 is 0, it may indicate that bufferable data of a data type (for example, a management frame or a TID) that is to be sent through the link 1 and that corresponds to the bit is not buffered in the second MLD.

Step S903: The first MLD determines, based on the tenth indication information, the buffer status of the bufferable data that corresponds to the at least one data type mapped to the at least one link and that is in the second MLD.

Figure 9B:
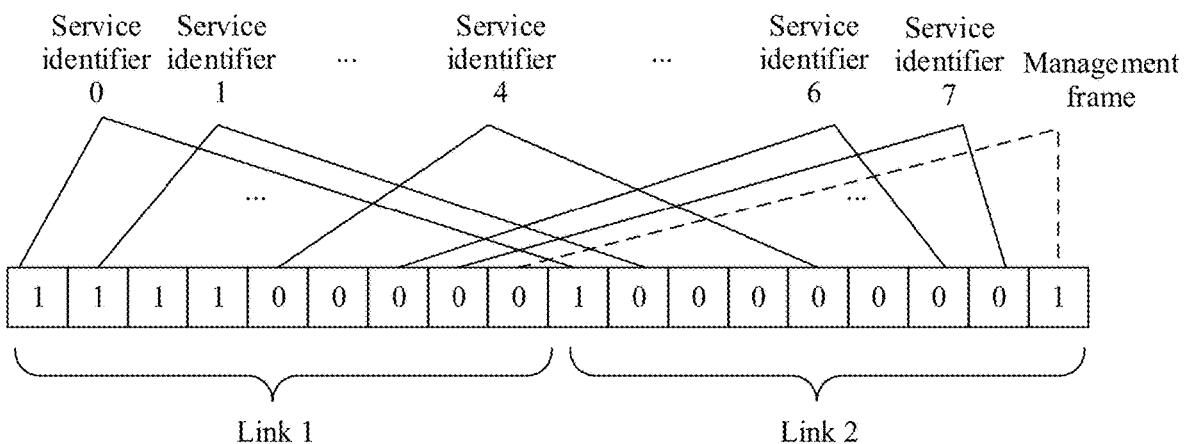
FIG. 9b is a schematic diagram of a More Data Per TID Per link subfield according to an embodiment of this application.

In an implementation, the tenth indication information may be a bit occupied by the More Data Per TID Per link subfield. In an implementation, when the first MLD allocates a different buffer area to each link, and one bit in the per link structure corresponds to one data type, after receiving the tenth indication information from the second MLD, the first MLD may determine, based on the tenth indication information, a buffer status of bufferable data that corresponds to each data type mapped to each link and that is in the second MLD. For example, when links between the first MLD and the second MLD include the link 1 and the link 2, a schematic diagram of the More Data Per TID Per link subfield may be shown in FIG. 9b. As shown in FIG. 9b, the More Data Per TID Per link subfield includes two per link structures (a link 1 and a link 2), and a small square in the figure represents one bit. Each bit in a per link structure corresponding to the link 1 corresponds to one data type, and different bits correspond to different data types. In FIG. 9b, 9 bits in the per link structure corresponding to the link 1 (or the link 2) respectively correspond to a T1D 0 to a TID 7 and a management frame. In the per link structure corresponding to the link 1, values of the first four bits are 1, and values of the last four bits are 0. This may indicate that bufferable data corresponding to a TID 0 to a TID 3 is buffered in a buffer area corresponding to the link 1 in the second MLD, but bufferable data corresponding to a TID 4 to a TID 7 and a management frame is not buffered in the buffer area corresponding to the link 1 in the second MLD. In the per link structure corresponding to the link 2, values of the first bit and the last bit are 1, and values of other bits are 0. This may indicate that bufferable data corresponding to a TID 0 and a management frame is buffered in a buffer area corresponding to the link 2 in the second MLD, but bufferable data corresponding to a TID 1 to a TID 7 is not buffered in the buffer area corresponding to the link 2 in the second MLD.

It should be noted that, that one per link structure includes 9 bits are merely used as an example, and in another feasible implementation, one per link structure may include one or more bits. For example, a quantity of bits included in a per link structure may be the same as a quantity of data types mapped to a link corresponding to the per link structure. When a data type is an AC, a quantity of bits included in the per link structure may be the same as a quantity of ACs corresponding to a TID mapped to the link corresponding to the per link structure.

It should be further noted that, that one bit in the per link structure corresponds to one data type (a management frame, a TID, or an AC) is merely used as an example, and one bit in the per link structure may correspond to one or more data types (a management frame, a TID, or an AC).

In an implementation, when the first MLD allocates a different buffer area to each link, and a bit in the per link structure may correspond to at least two types, after receiving the tenth indication information from the second MLD, the first MLD may determine, based on the tenth indication information, a buffer status of bufferable data that corresponds to the at least one of the at least two types mapped to each link and that is in the second MLD. For example, when the first bit in the per link structure corresponding to the link 1 corresponds to a TID 1 and a TID 2, and a value of the first bit is 1, it may indicate that bufferable data corresponding to at least one TID of the TID 1 and the TID 2 is buffered in the buffer area corresponding to the link 1 in the second MLD. When the value of the first bit is 0, it may indicate that neither bufferable data corresponding to the TID 1 nor bufferable data corresponding to the TID 2 is buffered in the buffer area corresponding to the link 1 in the second MLD.

In an implementation, when the first MLD may allocate a same buffer area to at least two links, and one bit in the per link structure corresponds to one data type, after receiving the tenth indication information from the second MLD, the first MLD may determine, based on the tenth indication information, a buffer status of bufferable data that corresponds to at least one of the at least two links and that is in the second MLD. For example, when the buffer area r in the second MLD corresponds to the link 1 and the link 2, and the first bits in the per link structures corresponding to the link 1 and the link 2 correspond to the TID 1, if values of the first bits are 1, it may indicate that the bufferable data corresponding to the TID 1 is buffered in the buffer area r, and the bufferable data may be sent to the first MLD through the link 1 and/or the link 2. If the values of the first bits are 0, it may indicate that the bufferable data corresponding to the TID 1 is not buffered in the buffer area r, and neither the link 1 nor the link 2 is used to transmit the bufferable data corresponding to the TID 1.

In an implementation, when the first MLD may allocate a same buffer area to at least two links, and a bit in the per link structure corresponds to at least two data types, after receiving the tenth indication information from the second MLD, the first MLD may determine, based on the tenth indication information, a buffer status of bufferable data that corresponds to the at least two data types mapped to the at least two links and that is in the second MLD.

In an implementation, the first MLD may have a plurality of stations. The first MLD may determine an operating status of at least one station in the plurality of stations in the first MLD based on the buffer status of the bufferable data that corresponds to the at least one data type mapped to the at least one link and that is in the second MLD. Specifically, the first MLD may determine an operating status of each station in the first MLD based on a buffer status of bufferable data that corresponds to each data type mapped to each link and that is in the second MLD. For example, the first MLD may determine operating statuses of the link 1 and the link 2 as the active state if the bufferable data corresponding to the TID 0 to the TID 3 is buffered in the buffer area corresponding to the link 1 in the second MLD, and the bufferable data corresponding to the TID 1 and the TID 7 is buffered in the buffer area corresponding to the link 2 in the second MLD, that is, when both the bufferable data corresponding to the link 1 and the bufferable data corresponding to the link 2 are buffered in the second MLD. In this way, the bufferable data corresponding to the TID 0 to the TID 3 may be received over the first link, and the bufferable data corresponding to the TID 1 and the TID 7 may be received through the link 2.

In an implementation, the first MLD may determine the operating status of the at least one station in the plurality of stations in the first MLD based on one or more of current battery level information or service requirement information of the first MLD and based on the buffer status of the bufferable data that corresponds to the at least one data type mapped to the at least one link and that is in the second MLD.

In this embodiment of this application, the buffer status of the bufferable data that corresponds to the at least one data type mapped to the at least one link and that is in the second MLD may be determined based on the tenth indication information. In this way, the buffer status of the bufferable data in the second MLD may be determined in more detail. This helps determine a more appropriate operating status for the station in the first MLD.

In the foregoing embodiments provided in this application, the methods provided in the embodiments of this application are separately described from perspectives of the first MLD and the second MLD. To implement functions in the methods provided in the foregoing embodiments of this application, the first MLD and the second MLD each may include a hardware structure and a software module, to implement the foregoing functions in a form of the hardware structure, the software module, or a combination of the hardware structure and the software module. A function in the foregoing functions may be performed in a manner of the hardware structure, the software module, or a combination of the hardware structure and the software module.

Figure 10:
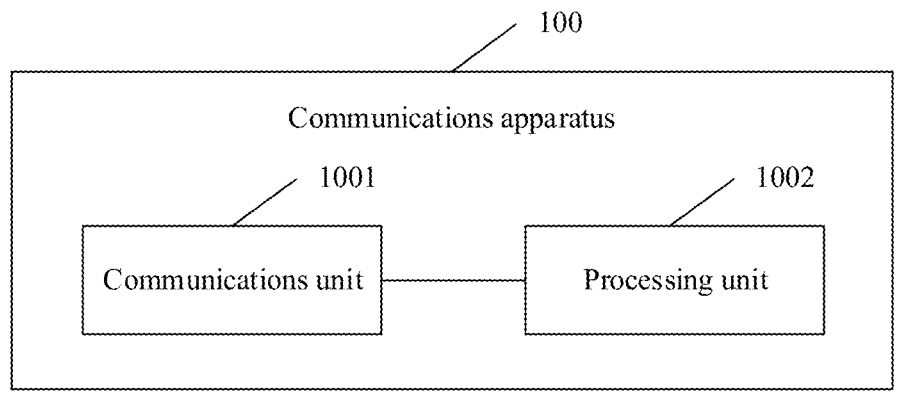
FIG. 10 is a schematic diagram of a structure of a communications apparatus according to an embodiment of this application.

FIG. 10 is a schematic diagram of a structure of a communications apparatus 100 according to an embodiment of this application. The communications apparatus 100 shown in FIG. 10 may include a communications unit 1001 and a processing unit 1002. The communications unit 1001 may include a sending unit and/or a receiving unit. The sending unit is configured to implement a sending function, the receiving unit is configured to implement a receiving function, and the communications unit 1001 may implement a sending function and/or a receiving function. The communications unit may also be described as a transceiver unit.

The communications apparatus 100 may be a first MLD, or may be an apparatus in the first MLD, or may be an apparatus that can be used together with the first MLD. When the communications apparatus 100 is the first MLD, the communications apparatus 100 may be the first MLD in the embodiments shown in any one of FIG. 2 to FIG. 9a.

The communications apparatus 100 is the first MLD in the embodiment shown in FIG. 3a or FIG. 5A and FIG. 5B.

The communications unit 1001 is configured to receive first indication information from a second MLD, where the first indication information is used to indicate a buffer status of bufferable data that corresponds to an association identifier of the communications apparatus 100 and that is in the second MLD.

The processing unit 1002 is configured to determine, based on the first indication information and a correspondence between the association identifier of the first MLD and a data type supported by the first MLD, a buffer status of bufferable data that corresponds to the at least one data type and that is in the second MLD.

In an implementation, the communications apparatus 100 has a plurality of stations. The communications unit 1001 may be further configured to determine an operating status of at least one station in the plurality of stations based on the buffer status of the bufferable data that corresponds to the at least one data type and that is in the second MLD, where the operating status is an active state or a doze state.

In an implementation, the communications unit 1001 is further configured to receive second indication information from the second MLD, where the second indication information is used to determine the correspondence between the association identifier and the data type.

In an implementation, the second indication information indicates at least one association identifier, and the at least one association identifier corresponds to the at least one data type.

In an implementation, the communications apparatus 100 may support a plurality of data types. The second indication information indicates a first association identifier, and the first association identifier corresponds to a first data type in the plurality of data types. The processing unit 1002 is further configured to determine, based on the first association identifier corresponding to the first data type, an association identifier corresponding to a data type in the plurality of data types other than the first data type.

The communications apparatus 100 is the first MLD in the embodiment shown in FIG. 4a or FIG. 5A and FIG. 5B.

The communications unit 1001 is configured to receive bufferable data from a second MLD over a first link, where the bufferable data includes third indication information, the third indication information is used to indicate whether bufferable data corresponding to at least one second data type is buffered in the second MLD, and the second data type is any data type mapped to the first link.

The processing unit 1002 is configured to determine, based on the third indication information, whether the bufferable data corresponding to the at least one second data type is buffered in the second MLD.

In an implementation, the communications apparatus 100 has a plurality of stations. The processing unit 1002 is further configured to determine an operating status of a station corresponding to the first link in the plurality of stations based on whether the bufferable data corresponding to the at least one second data type is buffered in the second MLD, where the operating status is an active state or a doze state.

In an implementation, when the processing unit 1002 is configured to determine the operating status of the station corresponding to the first link in the plurality of stations based on whether the bufferable data corresponding to the at least one second data type is buffered in the second MLD, the processing unit 1002 is specifically configured to: if the bufferable data corresponding to the at least one second data type is buffered in the second MLD, determine the operating status of the station corresponding to the first link in the plurality of stations as the active state; or if bufferable data corresponding to any second data type is not buffered in the second MLD, determine the operating status of the station corresponding to the first link in the plurality of stations as the active state or the doze state.

In an implementation, the third indication information indicates that the bufferable data corresponding to the at least one second data type is buffered in the second MLD. The communications unit 1001 is further configured to receive fourth indication information from the second MLD, where the fourth indication information is used to indicate that the bufferable data corresponding to the any second data type is not buffered in the second MLD.

The communications apparatus 100 is the first MLD in the embodiment shown in FIG. 6a.

The communications unit 1001 is configured to receive, from a second MLD, bufferable data corresponding to a third data type, where the bufferable data includes fifth indication information, and the fifth indication information is used to indicate whether the bufferable data corresponding to the third data type is buffered in the second MLD.

The processing unit 1002 is configured to determine, based on the fifth indication information, whether the bufferable data corresponding to the third data type is buffered in the second MLD.

In an implementation, the communications apparatus 100 has a plurality of stations. The processing unit 1002 may be further configured to determine an operating status of a station corresponding to a second link in the plurality of stations based on whether the bufferable data corresponding to the third data type is buffered in the second MLD, where the third data type is mapped to the second link, and the operating status is an active state or a doze state.

In an implementation, the processing unit 1002 may be further configured to determine whether a data type other than the third data type is mapped to the second link.

When the processing unit 1002 is configured to determine the operating status of the station corresponding to the second link in the plurality of stations based on whether the bufferable data corresponding to the third data type is buffered in the second MLD, the processing unit 1002 is specifically configured to determine the operating status of the station corresponding to the second link in the plurality of stations based on whether the bufferable data corresponding to the third data type is buffered in the second MLD and whether the data type other than the third data type is mapped to the second link.

In an implementation, the fifth indication information indicates that the bufferable data corresponding to the third data type is not buffered in the second MLD. The bufferable data corresponding to the third data type that is received by the communications unit 1001 from the second MLD further includes sixth indication information, where the sixth indication information is used to indicate whether bufferable data corresponding to at least one fourth data type is buffered in the second MLD, and the fourth data type is any data type other than the third data type in data types supported by the communications apparatus 100.

In an implementation, a priority of the fourth data type may be higher than a priority of the third data type.

The communications apparatus 100 is the first MLD in the embodiment shown in FIG. 7.

The communications unit 1001 is configured to receive seventh indication information from a second MLD, where the seventh indication information is used to indicate that bufferable data corresponding to a fifth data type is not buffered in the second MLD, and the fifth data type is any one of data types supported by the communications apparatus 100.

The processing unit 1002 is configured to determine, based on the seventh indication information, that the bufferable data corresponding to the fifth data type is not buffered in the second MLD.

In an implementation, the communications apparatus 100 has a plurality of stations. The processing unit 1002 is further configured to determine an operating status of a station corresponding to a third link in the plurality of stations based on that the bufferable data corresponding to the fifth data type is not buffered in the second MLD, where the fifth data type is mapped to the third link, and the operating status is an active state or a doze state.

The communications apparatus 100 is the first MLD in the embodiment shown in FIG. 8.

The communications unit 1001 is configured to receive eighth indication information from a second MLD through a fourth link, where the eighth indication information is used to indicate that bufferable data corresponding to any data type mapped to the fourth link is not buffered in the second MLD.

The processing unit 1002 is configured to determine, based on the eighth indication information, that the bufferable data corresponding to the any data type mapped to the fourth link is not buffered in the second MLD.

In an implementation, the communications apparatus 100 has a plurality of stations. The processing unit 1002 is further configured to determine an operating status of a station corresponding to the fourth link in the plurality of stations based on that the bufferable data corresponding to the any data type mapped to the fourth link is not buffered in the second MLD, where the operating status is an active state or a doze state.

The communications apparatus 100 is the first MLD in the embodiment shown in FIG. 2.

The communications unit 1001 is configured to receive ninth indication information from a second MLD, where the ninth indication information is used to indicate a buffer status of bufferable data that corresponds to at least one data type supported by the communications apparatus and that is in the second MLD.

The processing unit 1002 is configured to determine, based on the ninth indication information, the buffer status of the bufferable data that corresponds to the at least one data type and that is in the second MLD.

In an implementation, the communications apparatus 100 has a plurality of stations. The processing unit 1002 is further configured to determine an operating status of at least one station in the plurality of stations based on the buffer status of the bufferable data that corresponds to the at least one data type and that is in the second MLD, where the operating status is an active state or a doze state.

The communications apparatus 100 is the first MLD in the embodiment shown in FIG. 9*a*.

The communications unit 1001 is configured to receive tenth indication information from a second MLD, where the tenth indication information is used to indicate a buffer status of bufferable data that corresponds to at least one data type mapped to at least one link corresponding to the communications apparatus and that is in the second MLD.

The processing unit 1002 is configured to determine, based on the tenth indication information, the buffer status of the bufferable data that corresponds to the at least one data type mapped to the at least one link and that is in the second MLD.

In an implementation, the communications apparatus 100 has a plurality of stations. The processing unit 1002 is further configured to determine an operating status of at least one station in the plurality of stations based on the buffer status of the bufferable data that corresponds to the at least one data type mapped to the at least one link and that is in the second MLD, where the operating status is an active state or a doze state.

Figure 11:
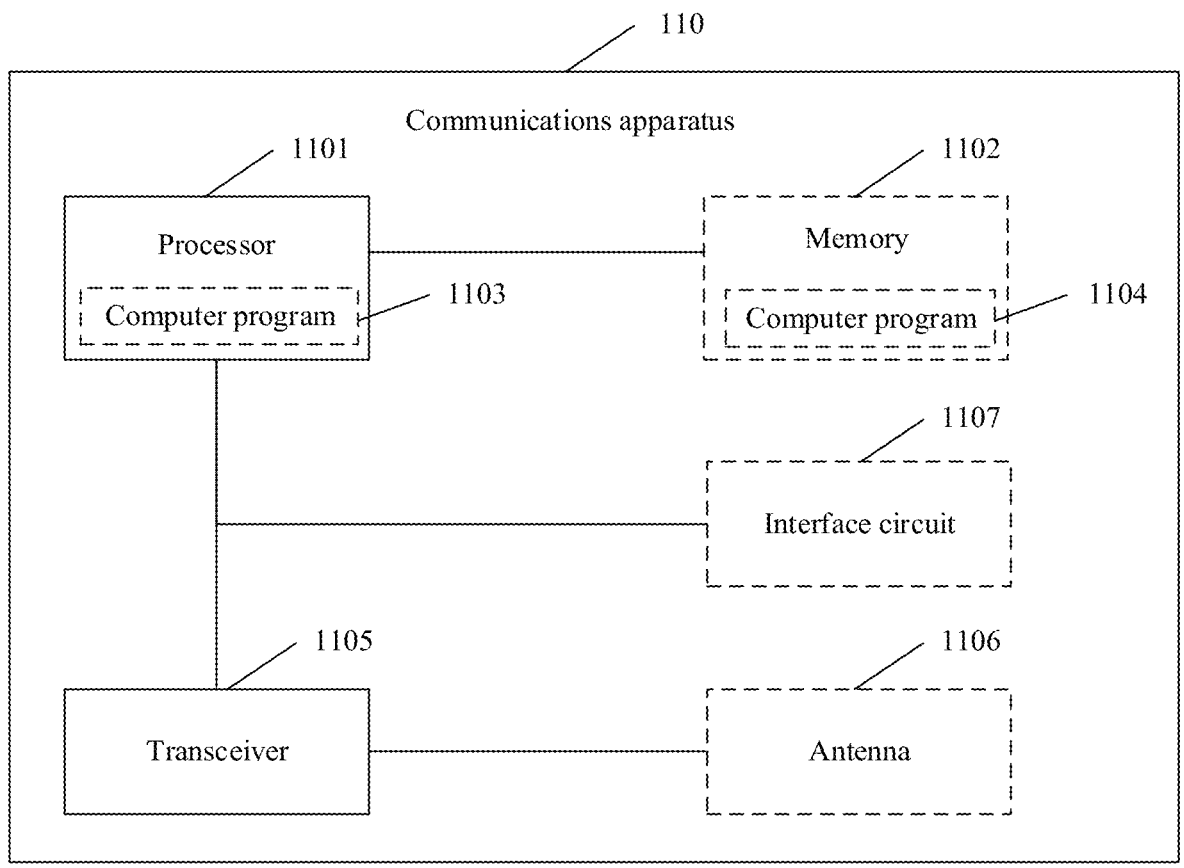
FIG. 11 is a schematic diagram of a structure of another communications apparatus according to an embodiment of this application.

FIG. 11 is a schematic diagram of a structure of another communications apparatus 110 according to an embodiment of this application. The communications apparatus 110 may be a first MLD, or may be a chip, a chip system, a processor, or the like that supports the first MLD in implementing the foregoing methods. The apparatus may be configured to implement the methods described in the foregoing method embodiments. For details, refer to the descriptions in the foregoing method embodiments.

The communications apparatus 110 may include one or more processors 1101. The processor 1101 may be a general-purpose processor, a dedicated processor, or the like. For example, the processor 1101 may be a baseband processor or a central processing unit. The baseband processor may be configured to process a communications protocol and communication data, and the central processing unit may be configured to control a communications apparatus (for example, a base station, a baseband chip, a terminal, a terminal chip, a DU, or a CU) to execute a computer program, to process data of the computer program.

The communications apparatus 110 may further include a transceiver 1105. The transceiver 1105 may be referred to as a transceiver unit, a transceiver, a transceiver circuit, or the like, and is configured to implement a transceiving function. The transceiver 1105 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function. Optionally, the communications apparatus 110 may further include an antenna 1106.

Optionally, the communications apparatus 110 may include one or more memories 1102, and the memory 1102 may store a computer program 1104. The computer program may be run on the communications apparatus 110, so that the communications apparatus 110 performs the methods described in the foregoing method embodiments. Optionally, the memory 1102 may further store data. The communications apparatus 110 and the memory 1102 may be separately disposed, or may be integrated.

The processor 1101 is configured to perform step S203 in FIG. 2, step S304 in FIG. 3a, step S403 in FIG. 4a, step S504, step S505, and step S509 in FIG. 5A and FIG. 5B, step S603 in FIG. 6a, step S703 in FIG. 7, step S803 in FIG. 8, or step S903 in FIG. 9a.

The transceiver 1105 is configured to: receive indication information from a second MLD in the embodiment shown in FIG. 2; receive first indication information from a second MLD in the embodiment shown in FIG. 3a; receive bufferable data from a second MLD in the embodiment shown in FIG. 4a; receive first indication information and bufferable data from a second MLD and send link status indication information to the second MLD in the embodiment shown in FIG. 5A and FIG. 5B; receive bufferable data corresponding to a third data type from a second MLD in the embodiment shown in FIG. 6a; receive seventh indication information from a second MLD in the embodiment shown in FIG. 7; receive eighth indication information from a second MLD in the embodiment shown in FIG. 8; and receive tenth indication information from a second MLD in the embodiment shown in FIG. 9a.

In an implementation, the processor 1101 may include a transceiver configured to implement a receiving function and a sending function. For example, the transceiver may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In an implementation, the processor 1101 may store a computer program 1103, and the computer program 1103 is run on the processor 1101, so that the communications apparatus 110 performs the methods described in the foregoing method embodiments. The computer program 1103 may be fixed in the processor 1101, and in this case, the processor 1101 may be implemented by hardware.

In an implementation, the communications apparatus 110 may include a circuit, and the circuit may implement a sending, receiving, or communication function in the foregoing method embodiments. The processor and the transceiver described in this application may be implemented in an integrated circuit (IC), an analog IC, a radio frequency integrated circuit RFIC, a mixed-signal IC, an application-specific integrated circuit (ASIC), or a printed circuit board (PCB), an electronic device, and the like. The processor and the transceiver may alternatively be manufactured by using various IC process technologies, for example, a complementary metal oxide semiconductor (CMOS), an n-type metal oxide semiconductor (nNMOS), a p-type metal oxide semiconductor (PMOS), a bipolar junction transistor (BJT), a bipolar CMOS (BiCMOS), silicon germanium (SiGe), and gallium arsenide (GaAs).

The communications apparatus described in the foregoing embodiment may be a first MLD. However, a scope of the communications apparatus described in this application is not limited thereto, and a structure of the communications apparatus may not be limited by FIG. 11. The communications apparatus may be an independent device or a part of a large device. For example, the communications apparatus may be:

(1) an independent integrated circuit IC, a chip, or a chip system or subsystem;
(2) a set including one or more ICs, where optionally, the IC set may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others, or the like.

Figure 12:
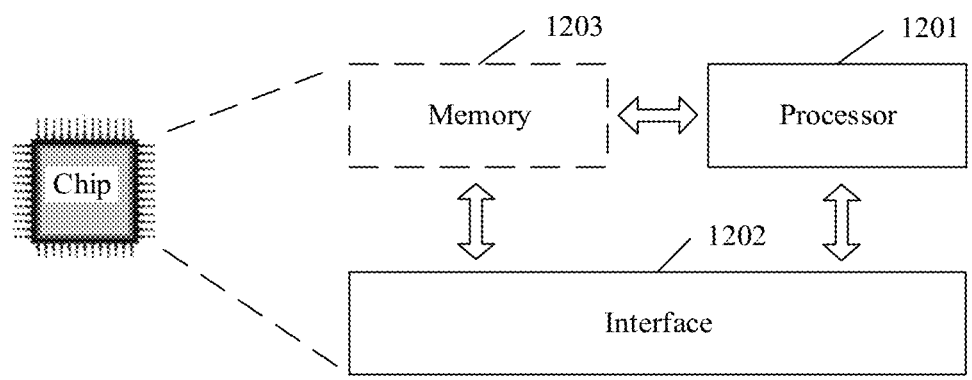
FIG. 12 is a schematic diagram of a structure of a chip according to an embodiment of this application.

For a case in which the communications apparatus may be a chip or a chip system, refer to a schematic diagram of a structure of a chip shown in FIG. 12. The chip shown in FIG. 12 includes a processor 1201 and an interface 1202. There may be one or more processors 1201, and there may be a plurality of interfaces 1202.

For a case in which the chip is configured to implement a function of the first MLD in the embodiment shown in FIG. 3a or FIG. 5A and FIG. 5B:

the interface 1202 is configured to receive first indication information from a second MLD, where the first indication information is used to indicate a buffer status of bufferable data that corresponds to an association identifier of the first MLD and that is in the second MLD; and the processor 1201 is configured to determine, based on the first indication information and a correspondence between the association identifier of the first MLD and a data type supported by the first MLD, a buffer status of bufferable data that corresponds to the at least one data type and that is in the second MLD.

In an implementation, the first MLD has a plurality of stations. The processor 1201 may be further configured to determine an operating status of at least one station in the plurality of stations based on the buffer status of the bufferable data that corresponds to the at least one data type and that is in the second MLD, where the operating status is an active state or a doze state.

In an implementation, the interface 1202 is further configured to receive second indication information from the second MLD, where the second indication information is used to determine the correspondence between the association identifier and the data type.

In an implementation, the second indication information indicates at least one association identifier, and the at least one association identifier corresponds to the at least one data type.

In an implementation, the first MLD may support a plurality of data types. The second indication information indicates a first association identifier, and the first association identifier corresponds to a first data type in the plurality of data types. The processor 1201 is further configured to determine, based on the first association identifier corresponding to the first data type, an association identifier corresponding to a data type in the plurality of data types other than the first data type.

For a case in which the chip is configured to implement a function of the first MLD in the embodiment shown in FIG. 4a or FIG. 5A and FIG. 5B:
the interface 1202 is configured to receive bufferable data from a second MLD over a first link, where the bufferable data includes third indication information, the third indication information is used to indicate whether bufferable data corresponding to at least one second data type is buffered in the second MLD, and the second data type is any data type mapped to the first link; and
the processor 1201 is configured to determine, based on the third indication information, whether the bufferable data corresponding to the at least one second data type is buffered in the second MLD.

In an implementation, the first MLD has a plurality of stations. The processor 1201 is further configured to determine an operating status of a station corresponding to the first link in the plurality of stations based on whether the bufferable data corresponding to the at least one second data type is buffered in the second MLD, where the operating status is an active state or a doze state.

In an implementation, when the processor 1201 is configured to determine the operating status of the station corresponding to the first link in the plurality of stations based on whether the bufferable data corresponding to the at least one second data type is buffered in the second MLD, the processor 1201 is specifically configured to: if the bufferable data corresponding to the at least one second data type is buffered in the second MLD, determine the operating status of the station corresponding to the first link in the plurality of stations as the active state; or if bufferable data corresponding to any second data type is not buffered in the second MLD, determine the operating status of the station corresponding to the first link in the plurality of stations as the active state or the doze state.

In an implementation, the third indication information indicates that the bufferable data corresponding to the at least one second data type is buffered in the second MLD. The interface 1202 is further configured to receive fourth indication information from the second MLD, where the fourth indication information is used to indicate that the bufferable data corresponding to the any second data type is not buffered in the second MLD.

For a case in which the chip is configured to implement a function of the first MLD in the embodiment shown in FIG. 6a:
the interface 1202 is configured to receive, from a second MLD, bufferable data corresponding to a third data type, where the bufferable data includes fifth indication information, and the fifth indication information is used to indicate whether the bufferable data corresponding to the third data type is buffered in the second MLD; and
the processor 1201 is configured to determine, based on the fifth indication information, whether the bufferable data corresponding to the third data type is buffered in the second MLD.

In an implementation, the first MLD has a plurality of stations. The processor 1201 may be further configured to determine an operating status of a station corresponding to a second link in the plurality of stations based on whether the bufferable data corresponding to the third data type is buffered in the second MLD, where the third data type is mapped to the second link, and the operating status is an active state or a doze state.

In an implementation, the processor 1201 may be further configured to determine whether a data type other than the third data type is mapped to the second link. When the processor 1201 is configured to determine the operating status of the station corresponding to the second link in the plurality of stations based on whether the bufferable data corresponding to the third data type is buffered in the second MLD, the processor 1201 is specifically configured to determine the operating status of the station corresponding to the second link in the plurality of stations based on whether the bufferable data corresponding to the third data type is buffered in the second MLD and whether the data type other than the third data type is mapped to the second link.

In an implementation, the fifth indication information indicates that the bufferable data corresponding to the third data type is not buffered in the second MLD. The bufferable data corresponding to the third data type that is received by the interface 1202 from the second MLD further includes sixth indication information, where the sixth indication information is used to indicate whether bufferable data corresponding to at least one fourth data type is buffered in the second MLD, and the fourth data type is any data type other than the third data type in data types supported by the first MLD.

In an implementation, a priority of the fourth data type may be higher than a priority of the third data type.

For a case in which the chip is configured to implement a function of the first MLD in the embodiment shown in FIG. 7:
the interface 1202 is configured to receive seventh indication information from a second MLD, where the seventh indication information is used to indicate that bufferable data corresponding to a fifth data type is not buffered in the second MLD, and the fifth data type is any one of data types supported by the first MLD; and
the processor 1201 is configured to determine, based on the seventh indication information, that the bufferable data corresponding to the fifth data type is not buffered in the second MLD.

In an implementation, the first MLD has a plurality of stations. The processor 1201 is further configured to determine an operating status of a station corresponding to a third link in the plurality of stations based on that the bufferable data corresponding to the fifth data type is not buffered in the second MLD, where the fifth data type is mapped to the third link, and the operating status is an active state or a doze state.

For a case in which the chip is configured to implement a function of the first MLD in the embodiment shown in FIG. 8:

the interface 1202 is configured to receive eighth indication information from a second MLD through a fourth link, where the eighth indication information is used to indicate that bufferable data corresponding to any data type mapped to the fourth link is not buffered in the second MLD; and the processor 1201 is configured to determine, based on the eighth indication information, that the bufferable data corresponding to the any data type mapped to the fourth link is not buffered in the second MLD.

In an implementation, the first MLD has a plurality of stations. The processor 1201 is further configured to determine an operating status of a station corresponding to the fourth link in the plurality of stations based on that the bufferable data corresponding to the any data type mapped to the fourth link is not buffered in the second MLD, where the operating status is an active state or a doze state.

For a case in which the chip is configured to implement a function of the first MLD in the embodiment shown in FIG. 2:

the interface 1202 is configured to receive ninth indication information from a second MLD, where the ninth indication information is used to indicate a buffer status of bufferable data that corresponds to at least one data type supported by the first MLD and that is in the second MLD; and the processor 1201 is configured to determine, based on the ninth indication information, the buffer status of the bufferable data that corresponds to the at least one data type and that is in the second MLD.

In an implementation, the processor 1201 is further configured to determine an operating status of at least one station in a plurality of stations based on the buffer status of the bufferable data that corresponds to the at least one data type and that is in the second MLD, where the operating status is an active state or a doze state.

For a case in which the chip is configured to implement a function of the first MLD in the embodiment shown in FIG. 9a:

the interface 1202 is configured to receive tenth indication information from a second MLD, where the tenth indication information is used to indicate a buffer status of bufferable data that corresponds to at least one data type mapped to at least one link corresponding to the first MLD and that is in the second MLD; and the processor 1201 is configured to determine, based on the tenth indication information, the buffer status of the bufferable data that corresponds to the at least one data type mapped to the at least one link and that is in the second MLD.

In an implementation, the first MLD has a plurality of stations. The processor 1201 is further configured to determine an operating status of at least one station in the plurality of stations based on the buffer status of the bufferable data that corresponds to the at least one data type mapped to the at least one link and that is in the second MLD, where the operating status is an active state or a doze state.

Optionally, the chip further includes a memory 1203, and the memory 1203 is configured to store a necessary computer program and data.

Figure 13:
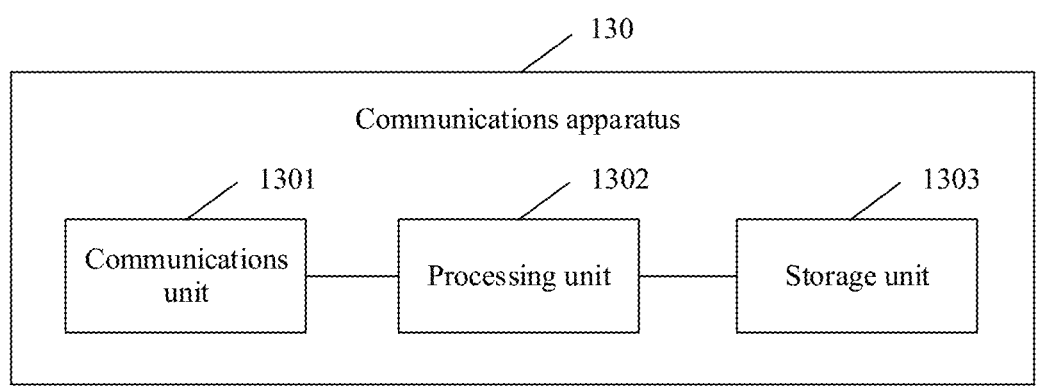
FIG. 13 is a schematic diagram of a structure of still another communications apparatus according to an embodiment of this application.

FIG. 13 is a schematic diagram of a structure of still another communications apparatus 130 according to an embodiment of this application. The communications apparatus 130 shown in FIG. 13 may include a communications unit 1301, a processing unit 1302, and a storage unit 1303.

The communications unit 1301 may include a sending unit and/or a receiving unit. The sending unit is configured to implement a sending function, the receiving unit is configured to implement a receiving function, and the communications unit 1301 may implement a sending function and/or a receiving function. The communications unit may also be described as a transceiver unit.

The communications apparatus 130 may be a second MLD, or may be an apparatus in the second MLD, or may be an apparatus that can be used together with the second MLD. When the communications apparatus 130 is the second MLD, the communications apparatus 130 may be the second MLD in the embodiments shown in any one of the FIG. 2 to FIG. 9a.

The communications apparatus 130 is the second MLD in the embodiment shown in FIG. 3a or FIG. 5A and FIG. 5B.

The processing unit 1302 is configured to: determine a buffer status of bufferable data that corresponds to at least one data type supported by a first MLD and that is in the storage unit 1303; and determine, based on the buffer status of the bufferable data that corresponds to the at least one data type and that is in the storage unit 1303 and a correspondence between an association identifier of the first MLD and the supported data type, a buffer status of bufferable data that corresponds to the association identifier and that is in the storage unit 1303.

The communications unit 1301 is configured to send first indication information to the first MLD, where the first indication information is used to indicate the buffer status of the bufferable data that corresponds to the association identifier of the first MLD and that is in the storage unit 1303.

In an implementation, the communications unit 1301 is further configured to send second indication information to the first MLD, where the second indication information is used to determine the correspondence between the association identifier of the first MLD and the data type supported by the first MLD.

In an implementation, the second indication information indicates at least one association identifier, and the at least one association identifier corresponds to the at least one data type.

In an implementation, the first MLD supports a plurality of data types. The second indication information indicates a first association identifier, and the first association identifier corresponds to a first data type in the plurality of data types.

The communications apparatus 130 is the second MLD in the embodiment shown in FIG. 4a or FIG. 5A and FIG. 5B.

The processing unit 1302 is configured to determine whether bufferable data corresponding to at least one second data type is buffered in the storage unit 1303, where the second data type is any data type mapped to a first link.

The communications unit 1301 is configured to send bufferable data to a first MLD over the first link, where the bufferable data includes third indication information, and the third indication information is used to indicate whether the bufferable data corresponding to the at least one second data type is buffered in the storage unit 1303.

In an implementation, the third indication information indicates that the bufferable data corresponding to the at least one second data type is buffered in the storage unit 1303. The communications unit 1301 is further configured to send fourth indication information to the first MLD, where the fourth indication information is used to indicate that bufferable data corresponding to any second data type is not buffered in the storage unit 1303.

The communications apparatus 130 is the second MLD in the embodiment shown in FIG. 6a.

The processing unit 1302 is configured to determine whether bufferable data corresponding to a third data type is buffered in the storage unit 1303.

The communications unit 1301 is configured to send, to a first MLD, the bufferable data corresponding to the third data type, where the bufferable data includes fifth indication information, and the fifth indication information is used to indicate whether the bufferable data corresponding to the third data type is buffered in the storage unit 1303.

In an implementation, the fifth indication information indicates that the bufferable data corresponding to the third data type is not buffered in the storage unit 1303. The bufferable data corresponding to the third data type that is sent by the communications unit 1301 to the first MLD further includes sixth indication information, where the sixth indication information is used to indicate whether bufferable data corresponding to at least one fourth data type is buffered in the storage unit 1303, and the fourth data type is any data type other than the third data type in data types supported by the first MLD.

In an implementation, a priority of the fourth data type may be higher than a priority of the third data type.

The communications apparatus 130 is the second MLD in the embodiment shown in FIG. 7.

The processing unit 1302 is configured to determine that bufferable data corresponding to a fifth data type is not buffered in the storage unit 1303, where the fifth data type is any one of data types supported by a first MLD.

The communications unit 1301 is configured to send seventh indication information to the first MLD, where the seventh indication information is used to indicate that the bufferable data corresponding to the fifth data type is not buffered in the storage unit 1303.

The communications apparatus 130 is the second MLD in the embodiment shown in FIG. 8.

The processing unit 1302 is configured to determine that bufferable data corresponding to any data type mapped to a fourth link is not buffered in the storage unit 1303.

The communications unit 1301 is configured to send eighth indication information to a first MLD through the fourth link, where the eighth indication information is used to indicate that the bufferable data corresponding to the any data type mapped to the fourth link is not buffered in the storage unit 1303.

The communications apparatus 130 is the second MLD in the embodiment shown in FIG. 2.

The processing unit 1302 is configured to determine a buffer status of bufferable data that corresponds to at least one data type supported by a first MLD and that is in the storage unit 1303.

The communications unit 1301 is configured to send ninth indication information to the first MLD, where the ninth indication information is used to indicate the buffer status of the bufferable data that corresponds to the at least one data type supported by the first MLD and that is in the storage unit 1303.

The communications apparatus 130 is the second MLD in the embodiment shown in FIG. 9a.

The processing unit 1302 is configured to determine a buffer status of bufferable data that corresponds to at least one data type mapped to at least one link corresponding to a first MLD and that is in the storage unit 1303.

The communications unit 1301 is configured to send tenth indication information to the first MLD, where the tenth indication information is used to indicate the buffer status of the bufferable data that corresponds to the at least one data type mapped to the at least one link corresponding to the first MLD and that is in the storage unit 1303.

Figure 14:
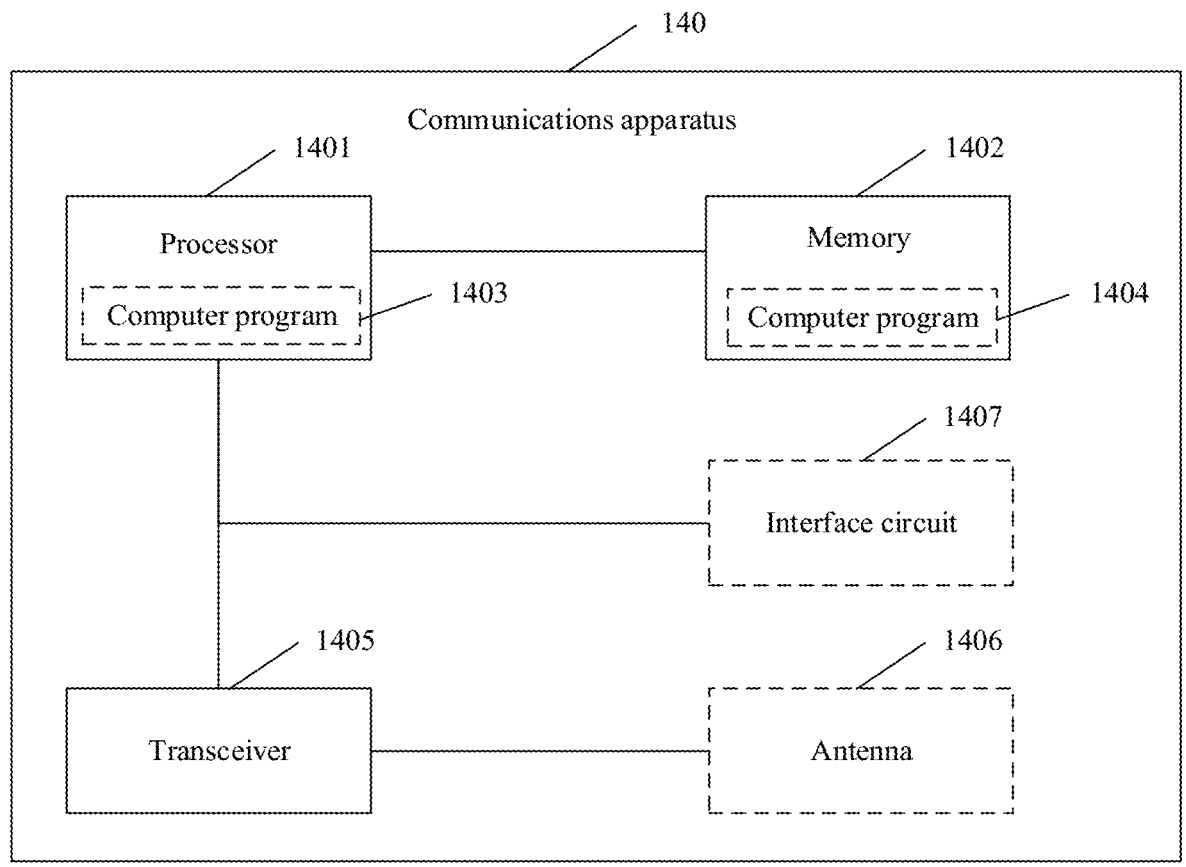
FIG. 14 is a schematic diagram of a structure of still another communications apparatus according to an embodiment of this application.

FIG. 14 is a schematic diagram of a structure of still another communications apparatus 140 according to an embodiment of this application. The communications apparatus 140 may be a second MLD, or may be a chip, a chip system, a processor, or the like that supports the second MLD in implementing the foregoing methods. The apparatus may be configured to implement the methods described in the foregoing method embodiments. For details, refer to the descriptions in the foregoing method embodiments.

The communications apparatus 140 may include one or more processors 1401. The processor 1401 may be a general-purpose processor, a dedicated processor, or the like. For example, the processor 1401 may be a baseband processor or a central processing unit. The baseband processor may be configured to process a communications protocol and communication data, and the central processing unit may be configured to control a communications apparatus (for example, a base station, a baseband chip, a terminal, a terminal chip, a DU, or a CU) to execute a computer program, to process data of the computer program.

The communications apparatus 140 may further include a transceiver 1405. The transceiver 1405 may be referred to as a transceiver unit, a transceiver, a transceiver circuit, or the like, and is configured to implement a transceiving function. The transceiver 1405 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function. Optionally, the communications apparatus 140 may further include an antenna 1406.

The communications apparatus 140 may further include one or more memories 1402, and the memory 1402 may store a computer program 1404. The computer program may be run on the communications apparatus 140, so that the communications apparatus 140 performs the methods described in the foregoing method embodiments. Optionally, the memory 1402 may further store data. The communications apparatus 140 and the memory 1402 may be separately disposed, or may be integrated.

The processor 1401 is configured to perform step S201 in FIG. 2, step S301 and step S302 in FIG. 3a, step S401 in FIG. 4a, step S501, step S502, and step S507 in FIG. 5A and FIG. 5B, step S601 in FIG. 6a, step S701 in FIG. 7, step S801 in FIG. 8, or step S901 in FIG. 9a.

The transceiver 1405 is configured to perform step S202 in FIG. 2, step S303 in FIG. 3a, step S402 in FIG. 4a, step S503 and step S508 in FIG. 5A and FIG. 5B, step S602 in FIG. 6a, step S702 in FIG. 7, step S802 in FIG. 8, or step S902 in FIG. 9a.

In an implementation, the processor 1401 may include a transceiver configured to implement a receiving function and a sending function. For example, the transceiver may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In an implementation, the processor 1401 may store a computer program 1403, and the computer program 1403 is run on the processor 1401, so that the communications apparatus 140 performs the methods described in the foregoing method embodiments. The computer program 1403 may be fixed in the processor 1401, and in this case, the processor 1401 may be implemented by hardware.

In an implementation, the communications apparatus 140 may include a circuit, and the circuit may implement a sending, receiving, or communication function in the foregoing method embodiments. The processor and the transceiver described in this application may be implemented in an integrated circuit (IC), an analog IC, a radio frequency integrated circuit RFIC, a mixed-signal IC, an application-specific integrated circuit (ASIC), or a printed circuit board (PCB), an electronic device, and the like. The processor and the transceiver may alternatively be manufactured by using various IC process technologies, for example, a complementary metal oxide semiconductor (CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The communications apparatus described in the foregoing embodiment may be a second MLD. However, a scope of the communications apparatus described in this application is not limited thereto, and a structure of the communications apparatus may not be limited by FIG. 14. The communications apparatus may be an independent device or a part of a large device. For example, the communications apparatus may be:

(1) an independent integrated circuit IC, a chip, or a chip system or subsystem;

(2) a set including one or more ICs, where optionally, the IC set may further include a storage component configured to store data and a computer program;

(3) an ASIC, for example, a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) others, or the like.

Figure 15:
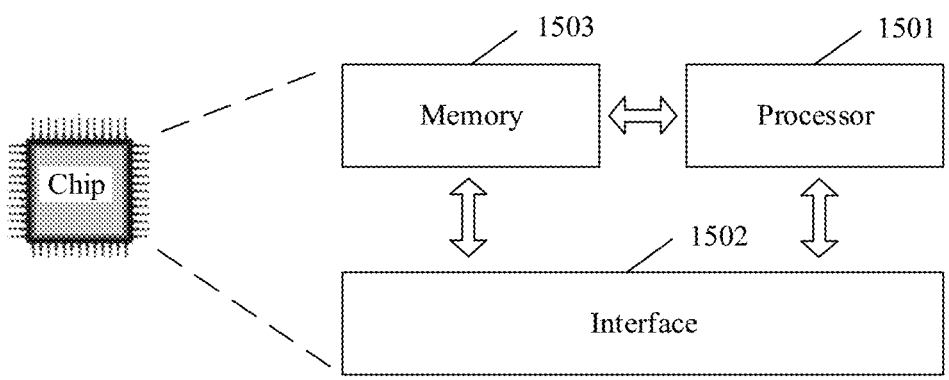
FIG. 15 is a schematic diagram of a structure of another chip according to an embodiment of this application.

For a case in which the communications apparatus may be a chip or a chip system, refer to a schematic diagram of a structure of a chip shown in FIG. 15. The chip shown in FIG. 15 includes a processor 1501, an interface 1502, and a memory 1503. There may be one or more processors 1501, there may be a plurality of interfaces 1502, and there may be one or more memories 1503. The memory 1503 is configured to store bufferable data, and a necessary computer program and data.

For a case in which the chip is configured to implement a function of the second MLD in the embodiment shown in FIG. 3a or FIG. 5A and FIG. 5B:

the processor 1501 is configured to: determine a buffer status of bufferable data that corresponds to at least one data type supported by a first MLD and that is in the memory 1503; and determine, based on the buffer status of the bufferable data that corresponds to the at least one data type and that is in the memory 1503 and a correspondence between an association identifier of the first MLD and the supported data type, a buffer status of bufferable data that corresponds to the association identifier and that is in the memory 1503; and the interface 1502 is configured to send first indication information to the first MLD, where the first indication information is used to indicate the buffer status of the bufferable data that corresponds to the association identifier of the first MLD and that is in the memory 1503.

In an implementation, the interface 1502 is further configured to send second indication information to the first MLD, where the second indication information is used to determine the correspondence between the association identifier of the first MLD and the data type supported by the first MLD.

In an implementation, the second indication information indicates at least one association identifier, and the at least one association identifier corresponds to the at least one data type.

In an implementation, the first MLD supports a plurality of data types. The second indication information indicates a first association identifier, and the first association identifier corresponds to a first data type in the plurality of data types.

For a case in which the chip is configured to implement a function of the second MLD in the embodiment shown in FIG. 4a or FIG. 5A and FIG. 5B:

the processor 1501 is configured to determine whether bufferable data corresponding to at least one second data type is buffered in the memory 1503, where the second data type is any data type mapped to a first link; and the interface 1502 is configured to send bufferable data to a first MLD over the first link, where the bufferable data includes third indication information, and the third indication information is used to indicate whether the bufferable data corresponding to the at least one second data type is buffered in the memory 1503.

In an implementation, the third indication information indicates that the bufferable data corresponding to the at least one second data type is buffered in the memory 1503. The interface 1502 is further configured to send fourth indication information to the first MLD, where the fourth indication information is used to indicate that bufferable data corresponding to any second data type is not buffered in the memory 1503.

For a case in which the chip is configured to implement a function of the second MLD in the embodiment shown in FIG. 6a:

the processor 1501 is configured to determine whether bufferable data corresponding to a third data type is buffered in the memory 1503; and the interface 1502 is configured to send, to a first MLD, the bufferable data corresponding to the third data type, where the bufferable data includes fifth indication information, and the fifth indication information is used to indicate whether the bufferable data corresponding to the third data type is buffered in the memory 1503.

In an implementation, the fifth indication information indicates that the bufferable data corresponding to the third data type is not buffered in the memory 1503. The bufferable data corresponding to the third data type that is sent by the interface 1502 to the first MLD further includes sixth indication information, where the sixth indication information is used to indicate whether bufferable data corresponding to at least one fourth data type is buffered in the memory 1503, and the fourth data type is any data type other than the third data type in data types supported by the first MLD.

In an implementation, a priority of the fourth data type may be higher than a priority of the third data type.

For a case in which the chip is configured to implement a function of the second MLD in the embodiment shown in FIG. 7:

the processor 1501 is configured to determine that bufferable data corresponding to a fifth data type is not buffered in the memory 1503, where the fifth data type is any one of data types supported by a first MLD; and the interface 1502 is configured to send seventh indication information to the first MLD, where the seventh indication information is used to indicate that the bufferable data corresponding to the fifth data type is not buffered in the memory 1503.

For a case in which the chip is configured to implement a function of the second MLD in the embodiment shown in FIG. 8:

the processor 1501 is configured to determine that bufferable data corresponding to any data type mapped to a fourth link is not buffered in the memory 1503; and the interface 1502 is configured to send eighth indication information to a first MLD through the fourth link, where the eighth indication information is used to indicate that the bufferable data corresponding to the any data type mapped to the fourth link is not buffered in the memory 1503.

For a case in which the chip is configured to implement a function of the second MLD in the embodiment shown in FIG. 2:

the processor 1501 is configured to determine a buffer status of bufferable data that corresponds to at least one data type supported by a first MLD and that is in the memory 1503; and the interface 1502 is configured to send ninth indication information to the first MLD, where the ninth indication information is used to indicate the buffer status of the bufferable data that corresponds to the at least one data type supported by the first MLD and that is in the memory 1503.

For a case in which the chip is configured to implement a function of the second MLD in the embodiment shown in FIG. 9*a*:

the processor 1501 is configured to determine a buffer status of bufferable data that corresponds to at least one data type mapped to at least one link corresponding to a first MLD and that is in the memory 1503; and the interface 1502 is configured to send tenth indication information to the first MLD, where the tenth indication information is used to indicate the buffer status of the bufferable data that corresponds to the at least one data type mapped to the at least one link corresponding to the first MLD and that is in the memory 1503.

A person skilled in the art may further understand that various illustrative logical blocks and steps that are listed in the embodiments of this application may be implemented by electronic hardware, computer software, or a combination thereof. Whether the functions are implemented by hardware or software depends on a particular application and a design requirement of the entire system. A person skilled in the art may use various methods to implement the described functions for each particular application, but it should not be considered that the implementation goes beyond the scope of the embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, a function of any one of the foregoing method embodiments is implemented.

All or a part of the foregoing embodiments may be implemented by software, hardware, firmware, or any combination thereof. When the software is used to implement the embodiments, all or a part of the embodiments may be implemented in a form of a computer program product. The computer program product includes one or more computer programs. When the computer program is loaded and executed on a computer, the procedures or functions according to the embodiments of this application are all or partially generated. The computer may be a general-purpose computer, a dedicated computer, a computer network, or another programmable apparatus. The computer program may be stored in a computer-readable storage medium or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (solid-state disk, SSD)), or the like.

A person of ordinary skill in the art may understand that various numerals such as first and second in this application are merely distinguished for convenient description, but are not used to limit a scope of the embodiments of this application, and also indicate a sequence.

"The at least one" in this application may alternatively be described as one or more, and "the plurality of" means two, three, four, or more. This is not limited in this application. In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communications apparatus, and values or representation manners of the parameters may alternatively be other values or representation manners that can be understood by the communications apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, with reference to the units and algorithm steps described in the examples of the embodiments disclosed in this specification, the embodiments of this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a data buffer status, wherein the method comprises:
    determining, by a second multi-link device (MLD), whether the second MLD will have more bufferable data, corresponding to any second data type mapped to a first link between the second MLD and a first MLD, buffered in the second MLD after sending first bufferable data; and
    sending, by the second MLD, first bufferable data to the first MLD over the first link, wherein the first bufferable data comprises a first field, and the first field indicates whether more bufferable data corresponding to the any second data type is buffered in the second MLD, wherein the first field is only one bit.

2. The method according to claim 1, wherein the first bufferable data further comprises an indication that indicates whether more bufferable data corresponding to a management frame is buffered in the second MLD.

3. The method according to claim 1, wherein the first field is a more data (More Data) subfield; and
    a value of the More Data subfield is 1, indicating that more bufferable data corresponding to the any second data type is buffered in the second MLD; or
    a value of the More Data subfield is 0, indicating that more bufferable data corresponding to any one of the any second data type is not buffered in the second MLD.

4. The method according to claim 1, wherein the method further comprises:
    sending, by the second MLD, bufferable data to the first MLD after receiving a PS-Poll frame from the first MLD.

5. The method according to claim 1, wherein the method further comprises:
    sending a fourth indication information to the first MLD, wherein the fourth indication information indicates that no bufferable data corresponding to any one of the any second data type is buffered in the second MLD.

6. The method according to claim 5, wherein the fourth indication information is a quality of service null value (QOS Null) frame, where the QoS null frame is a data frame that does not carry a payload, and a value of the More Data subfield in the QoS null frame is 0.

7. A chip system, comprising at least one memory, at least one processor, and an interface, wherein
    the processor is configured to determine whether the second MLD will have more bufferable data, corresponding to any second data type mapped to a first link between the second MLD and a first MLD, buffered in the memory after sending first bufferable data; and
    the interface is configured to send first bufferable data to the first MLD over the first link, wherein the first bufferable data comprises a first field, and the first field indicates whether more bufferable data corresponding to the any second data type is buffered in the memory, wherein the first field is only one bit.

8. The communications apparatus according to claim 7, wherein the first bufferable data further comprises an indication that indicates whether more bufferable data corresponding to a management frame is buffered in the second MLD.

9. The communications apparatus according to claim 7, wherein the first field is a more data (More Data) subfield; and
    a value of the More Data subfield is 1, indicating that more bufferable data corresponding to the any second data type is buffered in the second MLD; or
    the value of the More Data subfield is 0, indicating that more bufferable data corresponding to any one of the any second data type is not buffered in the second MLD.

10. The communications apparatus according to claim 7, wherein the interface is further configured to receive a PS-Poll frame from the first MLD.

11. The communications apparatus according to claim 10, wherein the interface is further configured to send the bufferable data to the first MLD after receiving the PS-Poll frame from the first MLD.

12. The communications apparatus according to claim 7, wherein the interface is further configured to send a fourth indication information to the first MLD, wherein the fourth indication information indicates that no bufferable data corresponding to any one of the any second data type is buffered in the second MLD.

13. A communications apparatus, wherein the apparatus comprises a transceiver, a processor, and a memory, wherein
    the processor is configured to determine whether the second MLD will have more bufferable data, corresponding to any second data type mapped to a first link between the second MLD and a first MLD, buffered in the memory after sending first bufferable data; and
    the transceiver is configured to send bufferable data to a first MLD over the first link, wherein the first bufferable data comprises a first field, and the first field indicates whether more bufferable data corresponding to the any second data type is buffered in the memory, wherein the first field is only one bit.

14. The communications apparatus according to claim 13, wherein the first bufferable data further comprises an indication that indicates whether more bufferable data corresponding to a management frame is buffered in the second MLD.

15. The communications apparatus according to claim 13, wherein the first field is a more data (More Data) subfield; and
- a value of the More Data subfield is 1, indicating that more bufferable data corresponding to the any second data type is buffered in the second MLD; or
- the value of the More Data subfield is 0, indicating that more bufferable data corresponding to any one of the any second data type is not buffered in the second MLD.

16. The communications apparatus according to claim 13, wherein the transceiver is further configured to receive a PS-Poll frame from the first MLD.

17. The communications apparatus according to claim 16, wherein the transceiver is further configured to send the bufferable data to the first MLD after receiving the PS-Poll frame from the first MLD.

18. The communications apparatus according to claim 13, wherein the transceiver is further configured to send a fourth indication information to the first MLD, wherein the fourth indication information indicates that no bufferable data corresponding to any one of the any second data type is buffered in the second MLD.

\* \* \* \* \*